United States Patent
Gill et al.

(10) Patent No.: US 11,278,151 B2
(45) Date of Patent: Mar. 22, 2022

(54) COOKING DEVICE AND COMPONENTS THEREOF

(71) Applicant: SharkNinja Operating LLC, Needham, MA (US)

(72) Inventors: Aaron Michael Gill, Boston, MA (US); Ross Richardson, Dover, MA (US); Naomi Kalia Williams Zabel, Oakland, CA (US); Da Deng, Newton, MA (US); Mete Gursel, Istanbul (TR); Andrew John Roy Tattersfield, London (GB); Niall Christopher Denham, London (GB); Roger Neil Jackson, Cornwall (GB); Ronan Patrick Leahy, London (GB); Evan James White, Brookline, MA (US); Thomas Guerin, Boston, MA (US); Chris Martin, Concord, MA (US); Nathaniel R. Lavins, Somerville, MA (US); Mackenzie Lee Swanhart, Boston, MA (US); Samuel Andrew Ferguson, Medford, MA (US); Scott James Stewart, Boston, MA (US)

(73) Assignee: Sharkninja Operating LLC, Needham, MA (US)

( * ) Notice: Subject to any disclaimer, the term of this patent is extended or adjusted under 35 U.S.C. 154(b) by 259 days.

(21) Appl. No.: 16/059,876

(22) Filed: Aug. 9, 2018

(65) Prior Publication Data
US 2019/0045973 A1    Feb. 14, 2019

Related U.S. Application Data

(60) Provisional application No. 62/543,082, filed on Aug. 9, 2017.

(51) Int. Cl.
*A47J 37/06*    (2006.01)
*A23L 5/10*    (2016.01)
(Continued)

(52) U.S. Cl.
CPC ............. *A47J 37/0641* (2013.01); *A23L 5/17* (2016.08); *A47J 27/04* (2013.01); *A47J 27/08* (2013.01);
(Continued)

(58) Field of Classification Search
CPC ........ A47J 37/0641; A47J 27/04; A47J 27/08; A47J 27/0802; A23L 5/17
(Continued)

(56) References Cited

U.S. PATENT DOCUMENTS

| 472,002 A | 3/1892 | Ross et al. |
|---|---|---|
| 1,254,384 A | 1/1918 | Albro |

(Continued)

FOREIGN PATENT DOCUMENTS

| CN | 1139304 | 1/1997 |
|---|---|---|
| CN | 2253170 Y | 4/1997 |

(Continued)

OTHER PUBLICATIONS

U.S. Appl. No. 16/402,023, filed May 2, 2019; Final Office Action dated Oct. 28, 2019; 1-27 pages.
(Continued)

*Primary Examiner* — Reginald Alexander
(74) *Attorney, Agent, or Firm* — Mintz Levin Cohn Ferris Glovsky and Popeo, PC; Lisa Adams

(57) ABSTRACT

Disclosed herein is a cooking system for cooking food, the system including a housing having a hollow interior, a lid movable relative to the housing, at least one heating element associated with one of the housing and the lid, wherein the cooking system is operable in a plurality of modes including a conductive cooking mode and a convective cooking mode, wherein in the conductive cooking mode the cooking system
(Continued)

is operable as a conductive cooker and in the convective cooking mode the cooking system is operable as a convection cooker.

10 Claims, 30 Drawing Sheets

(51) Int. Cl.
*A47J 27/04* (2006.01)
*A47J 27/08* (2006.01)
*A47J 39/00* (2006.01)
*A47J 36/12* (2006.01)
*A47J 37/12* (2006.01)

(52) U.S. Cl.
CPC ......... *A47J 27/0802* (2013.01); *A47J 39/003* (2013.01); *A47J 36/12* (2013.01); *A47J 37/0623* (2013.01); *A47J 37/1266* (2013.01)

(58) Field of Classification Search
USPC ................... 99/476, 474; 219/401; 126/21 A
See application file for complete search history.

(56) References Cited

U.S. PATENT DOCUMENTS

| | | |
|---|---|---|
| 2,055,972 A | 9/1934 | Fritsche |
| 1,986,088 A | 1/1935 | Wild |
| 2,313,968 A | 10/1937 | Reich |
| 2,378,950 A | 10/1937 | Reich |
| 2,188,757 A | 8/1938 | Moon |
| 2,253,833 A | 12/1939 | Volks |
| 2,235,911 A | 3/1941 | Wilcox |
| 2,429,282 A | 10/1947 | Ness |
| 2,430,582 A | 11/1947 | Reich |
| 2,462,287 A | 2/1949 | Richeson et al. |
| 2,532,639 A | 12/1950 | Payne |
| 2,622,591 A | 12/1952 | Bramberry |
| 2,952,764 A | 9/1960 | Minami |
| 3,076,405 A | 2/1963 | Lang |
| 3,122,134 A | 2/1964 | Reeves |
| 3,514,301 A | 5/1970 | Berger |
| 3,529,582 A | 9/1970 | Hurko et al. |
| 3,610,885 A | 10/1971 | Zingg |
| 3,821,454 A | 6/1974 | Lobel |
| 3,828,760 A | 8/1974 | Farber et al. |
| 4,071,739 A | 1/1978 | Jenn et al. |
| 4,106,486 A | 8/1978 | Lee |
| 4,148,250 A | 4/1979 | Miki et al. |
| 4,162,741 A | 7/1979 | Walker et al. |
| 4,210,072 A | 7/1980 | Pedrini |
| 4,268,741 A | 5/1981 | O'Brien |
| 4,313,051 A | 1/1982 | Aoshima |
| 4,315,138 A | 2/1982 | Miwa |
| 4,374,318 A | 2/1983 | Gilliom |
| 4,410,030 A | 10/1983 | Skala |
| 4,430,557 A | 2/1984 | Eichelberger et al. |
| 4,484,063 A | 11/1984 | Whittenburg et al. |
| 4,509,412 A | 4/1985 | Whittenburg et al. |
| 4,528,975 A | 7/1985 | Wang |
| 4,591,698 A | 5/1986 | Chang |
| 4,622,231 A | 11/1986 | Swartley |
| 4,625,097 A | 11/1986 | Miwa |
| 4,670,282 A | 6/1987 | Onishi et al. |
| 4,728,762 A | 3/1988 | Roth et al. |
| 4,771,162 A | 9/1988 | Schatz |
| 4,829,158 A | 5/1989 | Burnham |
| 4,848,217 A | 7/1989 | Koziol |
| 4,889,972 A | 12/1989 | Chang |
| 4,920,251 A | 4/1990 | Whitenack et al. |
| 4,995,313 A | 2/1991 | Delau et al. |
| 5,000,085 A | 3/1991 | Archer |
| 5,012,071 A | 4/1991 | Henke |
| 5,029,519 A | 7/1991 | Boyen |
| 5,031,519 A | 7/1991 | Toida et al. |
| 5,036,179 A | 7/1991 | Westerberg et al. |
| 5,048,400 A | 9/1991 | Ueda et al. |
| 5,067,396 A | 11/1991 | Sorensen et al. |
| 5,092,229 A | 3/1992 | Chen |
| 5,105,725 A | 4/1992 | Haglund |
| 5,205,274 A | 4/1993 | Smith et al. |
| 5,251,542 A | 10/1993 | Itoh |
| 5,280,749 A | 1/1994 | Smit |
| 5,329,919 A | 7/1994 | Chang |
| 5,355,777 A | 10/1994 | Chen et al. |
| 5,416,950 A | 5/1995 | Dornbush et al. |
| 5,445,061 A | 8/1995 | Barradas |
| 5,466,912 A | 11/1995 | Dornbush et al. |
| 5,485,780 A | 1/1996 | Koether et al. |
| 5,513,558 A | 5/1996 | Erickson et al. |
| 5,526,734 A * | 6/1996 | Harrison ............. A47J 37/0641 126/21 A |
| 5,549,039 A | 8/1996 | Ito et al. |
| 5,567,458 A | 10/1996 | Wu |
| 5,588,352 A | 12/1996 | Harrison |
| 5,590,583 A | 1/1997 | Harrison |
| 5,615,607 A | 4/1997 | Delaquis et al. |
| 5,619,983 A | 4/1997 | Smith |
| 5,632,403 A | 5/1997 | Deng |
| 5,649,476 A | 7/1997 | Montagnino et al. |
| 5,676,044 A | 10/1997 | Lara, Jr. |
| 5,699,722 A | 12/1997 | Erickson et al. |
| 5,740,721 A | 4/1998 | Bizard et al. |
| 5,768,976 A | 6/1998 | Suk |
| 5,839,357 A | 11/1998 | Ha et al. |
| 5,896,808 A | 4/1999 | Graur |
| 5,932,130 A | 8/1999 | Taino |
| 5,967,021 A | 10/1999 | Yung |
| 5,970,858 A | 10/1999 | Boehm et al. |
| 6,006,939 A | 12/1999 | Wai |
| 6,014,986 A | 1/2000 | Baumgarten |
| 6,016,797 A | 1/2000 | Nowicke, Jr. |
| 6,019,029 A | 2/2000 | Chan |
| 6,023,050 A | 2/2000 | Violi |
| 6,060,698 A | 5/2000 | Petrides et al. |
| 6,066,837 A | 5/2000 | McCormick et al. |
| 6,067,896 A | 5/2000 | Elorza |
| 6,070,518 A | 6/2000 | Kao |
| 6,082,249 A | 7/2000 | Su |
| 6,083,543 A | 7/2000 | Kim et al. |
| 6,097,016 A | 8/2000 | Hirata et al. |
| 6,104,004 A | 8/2000 | Ragland et al. |
| 6,105,808 A | 8/2000 | Mendonca |
| 6,116,151 A | 9/2000 | Fickert et al. |
| 6,125,737 A | 10/2000 | Chang |
| 6,135,012 A | 10/2000 | Kao |
| 6,135,013 A | 10/2000 | Barrena |
| 6,158,606 A | 12/2000 | Oliver |
| 6,173,643 B1 | 1/2001 | Qian et al. |
| 6,178,876 B1 | 1/2001 | Kao |
| 6,191,393 B1 | 2/2001 | Park |
| 6,201,217 B1 | 3/2001 | Moon et al. |
| 6,242,025 B1 | 6/2001 | Lesky et al. |
| 6,252,206 B1 | 6/2001 | Leukhardt, III et al. |
| 6,255,630 B1 | 7/2001 | Barnes et al. |
| 6,257,124 B1 | 7/2001 | Chen |
| 6,262,396 B1 | 7/2001 | Witt et al. |
| 6,267,046 B1 | 7/2001 | Wanat |
| 6,268,592 B1 | 7/2001 | Hu et al. |
| 6,269,737 B1 | 8/2001 | Rigney et al. |
| 6,271,504 B1 | 8/2001 | Barritt |
| 6,283,014 B1 | 9/2001 | Ng et al. |
| 6,283,015 B1 | 9/2001 | Kwon et al. |
| 6,320,166 B1 | 11/2001 | Park |
| 6,355,914 B1 | 3/2002 | Stockley |
| 6,384,381 B2 | 5/2002 | Witt et al. |
| 6,393,969 B1 | 5/2002 | Kim |
| D458,078 S | 6/2002 | Lin |
| 6,399,925 B1 | 6/2002 | Pickering et al. |
| 6,414,254 B1 | 7/2002 | McNair |
| 6,425,320 B1 | 7/2002 | Chameroy et al. |
| 6,450,085 B1 | 9/2002 | Riesselman |
| 6,450,361 B1 | 9/2002 | Mendelson et al. |

(56) References Cited

U.S. PATENT DOCUMENTS

| | | |
|---|---|---|
| 6,455,085 B1 | 9/2002 | Duta |
| 6,467,645 B2 | 10/2002 | Park |
| 6,486,453 B1 | 11/2002 | Bales et al. |
| 6,494,337 B1 | 12/2002 | Moroni |
| 6,505,545 B2 | 1/2003 | Kennedy et al. |
| 6,509,550 B1 | 1/2003 | Li |
| 6,513,420 B1 | 2/2003 | Park |
| 6,515,262 B1 | 2/2003 | Li |
| 6,523,459 B1 | 2/2003 | Chameroy et al. |
| 6,528,772 B1 | 3/2003 | Graves et al. |
| 6,540,097 B1 | 4/2003 | Beck et al. |
| 6,545,252 B2 | 4/2003 | Wang |
| 6,552,309 B1 | 4/2003 | Kish et al. |
| 6,559,427 B1 | 5/2003 | Barnes et al. |
| 6,565,903 B2 | 5/2003 | Ng et al. |
| 6,568,314 B1 | 5/2003 | Stepanova |
| 6,573,483 B1 | 6/2003 | Decobert et al. |
| 6,602,530 B1 | 8/2003 | Weber et al. |
| 6,603,099 B2 | 8/2003 | Gouthiere |
| 6,604,453 B2 | 8/2003 | Niese |
| 6,615,706 B1 | 9/2003 | Wu |
| 6,615,708 B1 | 9/2003 | Lin |
| 6,631,824 B2 | 10/2003 | Park |
| 6,669,047 B2 | 10/2003 | Wooderson et al. |
| 6,648,162 B1 | 11/2003 | Wooderson et al. |
| 6,617,554 B2 | 12/2003 | Moon et al. |
| 6,657,167 B2 | 12/2003 | Loveless |
| 6,695,319 B1 | 2/2004 | Anota et al. |
| D487,212 S | 3/2004 | Park |
| 6,698,337 B1 | 3/2004 | Park |
| 6,703,061 B2 | 3/2004 | Kennedy et al. |
| 6,705,209 B2 | 3/2004 | Yang et al. |
| 6,723,963 B2 | 4/2004 | Ronda |
| 6,730,881 B1 | 5/2004 | Arntz et al. |
| 6,730,882 B2 | 5/2004 | Atkinson |
| 6,730,889 B1 | 5/2004 | Jones-Lawlor |
| 6,736,131 B2 | 5/2004 | Yamamoto et al. |
| 6,740,855 B1 | 5/2004 | Decobert et al. |
| 6,742,445 B2 | 6/2004 | Backus et al. |
| 6,747,250 B1 | 6/2004 | Cha |
| 6,755,319 B2 | 6/2004 | Park |
| 6,758,132 B1 | 7/2004 | Kuo et al. |
| 6,777,651 B1 | 8/2004 | Boyer |
| 6,782,805 B2 | 8/2004 | Backus et al. |
| 6,782,806 B2 | 8/2004 | Backus et al. |
| 6,802,429 B1 | 10/2004 | Wildman |
| 6,809,297 B2 | 10/2004 | Moon et al. |
| 6,812,433 B1 | 11/2004 | Barritt |
| 6,815,644 B1 | 11/2004 | Muegge et al. |
| 6,831,254 B2 | 12/2004 | Barritt |
| 6,833,534 B2 | 12/2004 | Bellassai et al. |
| 6,837,150 B2 | 1/2005 | Backus et al. |
| 6,841,762 B2 | 1/2005 | Suzuki |
| 6,845,707 B1 | 1/2005 | Xu et al. |
| 6,846,504 B1 | 1/2005 | Yarnell |
| 6,851,351 B2 | 2/2005 | Payen et al. |
| 6,872,921 B1 | 3/2005 | Decobert et al. |
| 6,874,408 B2 | 4/2005 | Backus et al. |
| 6,877,633 B2 | 4/2005 | Niese |
| 6,903,310 B1 | 6/2005 | Lee |
| 6,917,017 B2 | 7/2005 | Moon et al. |
| 6,930,286 B2 | 8/2005 | Kim |
| 6,933,477 B2 | 8/2005 | Becker et al. |
| 6,935,223 B2 | 8/2005 | Kobayashi |
| 6,936,795 B1 | 8/2005 | Moon et al. |
| 6,936,801 B1 | 8/2005 | Head |
| 6,941,857 B2 | 9/2005 | McLemore |
| 6,972,397 B2 | 12/2005 | Ha |
| 7,009,147 B1 | 3/2006 | Schulte |
| 7,012,220 B2 | 3/2006 | Boyer et al. |
| 7,012,221 B2 | 3/2006 | Li |
| 7,021,203 B2 | 4/2006 | Backus et al. |
| 7,021,204 B2 | 4/2006 | Backus et al. |
| 7,024,104 B2 | 4/2006 | Moore, Jr. et al. |
| 7,045,745 B2 | 5/2006 | Kim |
| 7,053,337 B2 | 5/2006 | Ragan et al. |
| 7,060,941 B1 | 6/2006 | Embury et al. |
| 7,060,943 B2 | 6/2006 | Hwang |
| 7,081,601 B2 | 7/2006 | Boyer et al. |
| 7,082,871 B2 | 8/2006 | Schultz |
| 7,086,326 B2 | 8/2006 | Yokoyama |
| 7,087,873 B2 | 8/2006 | Hayakawa et al. |
| 7,091,454 B2 | 8/2006 | Cho et al. |
| 7,105,780 B2 | 9/2006 | De'Longhi |
| 7,126,088 B2 | 10/2006 | Horton et al. |
| 7,148,451 B2 | 12/2006 | Miyake et al. |
| 7,154,069 B1 | 12/2006 | Gordon |
| 7,156,087 B1 | 1/2007 | Churchill et al. |
| 7,157,675 B2 | 1/2007 | Imura |
| 7,166,822 B1 | 1/2007 | Chang et al. |
| 7,171,923 B2 | 2/2007 | Hayakawa et al. |
| 7,208,701 B2 | 4/2007 | Fraccon et al. |
| 7,208,702 B2 | 4/2007 | Choi |
| 7,238,921 B2 | 7/2007 | Beesley et al. |
| 7,250,587 B2 | 7/2007 | Ely et al. |
| 7,250,588 B2 | 7/2007 | Ely et al. |
| 7,261,101 B2 | 8/2007 | Kim |
| 7,276,677 B1 | 10/2007 | Shelton |
| 7,285,751 B2 | 10/2007 | Li et al. |
| 7,304,271 B2 | 12/2007 | Cho et al. |
| 7,317,173 B2 | 1/2008 | Bartelick et al. |
| 7,322,279 B2 | 1/2008 | Cartigny et al. |
| 7,322,280 B2 | 1/2008 | Seurat Guiochet et al. |
| 7,325,481 B2 | 2/2008 | Helm |
| 7,368,688 B2 | 5/2008 | Kim et al. |
| 7,373,874 B2 | 5/2008 | Seurat Guiochet et al. |
| 7,377,208 B2 | 5/2008 | Ho et al. |
| 7,389,721 B2 | 6/2008 | Wanat |
| 7,411,159 B2 | 8/2008 | Oosterling |
| 7,412,922 B2 | 8/2008 | McLemore |
| 7,418,960 B2 | 9/2008 | Saksena |
| 7,451,691 B2 | 11/2008 | Robertson |
| 7,451,692 B2 | 11/2008 | Baraille et al. |
| 7,468,495 B2 | 12/2008 | Carbone et al. |
| 7,523,696 B2 | 4/2009 | Seurat Guiochet et al. |
| 7,530,302 B2 | 5/2009 | Stephanou |
| 7,537,004 B2 | 5/2009 | Reay |
| 7,565,862 B2 | 7/2009 | Cartigny et al. |
| 7,605,349 B2 | 10/2009 | Gaynor et al. |
| D604,098 S | 11/2009 | Hamlin |
| 7,619,186 B2 | 11/2009 | Cavada et al. |
| 7,624,674 B2 | 12/2009 | Chameroy et al. |
| 7,637,206 B2 | 12/2009 | Seurat Guiochet et al. |
| 7,669,521 B2 | 3/2010 | Cartigny et al. |
| 7,669,591 B2 | 3/2010 | Fossati et al. |
| 7,677,160 B2 | 3/2010 | Tippmann, Sr. et al. |
| 7,703,385 B2 | 4/2010 | Seurat Guiochet et al. |
| 7,718,928 B2 | 5/2010 | He et al. |
| 7,726,508 B2 | 6/2010 | Hasegawa |
| 7,745,763 B2 | 6/2010 | Fraccon et al. |
| 7,759,615 B2 | 7/2010 | Ando et al. |
| 7,762,420 B2 | 7/2010 | Auwarter et al. |
| 7,766,003 B2 | 8/2010 | Kim |
| 7,775,390 B2 | 8/2010 | De Bastos Reis Portugal et al. |
| 7,800,022 B2 | 9/2010 | Kim |
| 7,810,488 B2 | 10/2010 | Manganiello et al. |
| 7,838,799 B2 | 11/2010 | Freedman |
| 7,856,875 B2 | 12/2010 | Jeon et al. |
| 7,875,836 B2 | 1/2011 | Imura et al. |
| 7,915,568 B2 | 3/2011 | Wang |
| D635,393 S | 4/2011 | Nakatani |
| 7,921,768 B2 | 4/2011 | Fernandez et al. |
| 7,935,914 B2 | 5/2011 | Imura |
| 7,943,888 B2 | 5/2011 | Barnes et al. |
| 7,964,824 B2 | 6/2011 | Moon |
| 7,980,171 B2 | 7/2011 | Groll |
| 8,006,684 B2 | 8/2011 | Lee et al. |
| 8,006,685 B2 | 8/2011 | Bolton et al. |
| 8,011,293 B2 | 9/2011 | McFadden et al. |
| 8,042,533 B2 | 10/2011 | Dobie et al. |
| 8,080,766 B2 | 12/2011 | Frock et al. |
| 8,096,436 B2 | 1/2012 | Rhetat et al. |
| 8,096,440 B2 | 1/2012 | Rhetat et al. |
| 8,152,083 B2 | 4/2012 | Bower et al. |

(56) References Cited

U.S. PATENT DOCUMENTS

| | | |
|---|---|---|
| 8,166,871 B2 | 5/2012 | Veltrop et al. |
| 8,205,543 B2 | 6/2012 | Rhetat et al. |
| 8,247,751 B2 | 8/2012 | Jagannathan |
| 8,258,435 B2 | 9/2012 | Bonuso et al. |
| 8,267,008 B2 | 9/2012 | Yasuhara |
| D669,730 S | 10/2012 | Mandil |
| 8,276,507 B1 | 10/2012 | Walker |
| 8,286,548 B2 | 10/2012 | Krishnan et al. |
| 8,299,404 B2 | 10/2012 | Van Der Weij |
| 8,302,800 B2 | 11/2012 | Hasegawa |
| 8,304,695 B2 | 11/2012 | Bonuso et al. |
| 8,330,083 B2 | 12/2012 | Moon et al. |
| 8,338,757 B2 | 12/2012 | Isoda et al. |
| 8,369,695 B2 | 2/2013 | Lee et al. |
| 8,378,265 B2 | 2/2013 | Greenwood et al. |
| 8,381,712 B1 | 2/2013 | Simms, II |
| 8,393,262 B1 | 3/2013 | Molayem |
| 8,420,983 B2 | 4/2013 | Ohashi et al. |
| 8,461,488 B2 | 6/2013 | Jeong et al. |
| 8,517,006 B2 | 8/2013 | Frock et al. |
| 8,517,205 B2 | 8/2013 | Thelen |
| 8,525,081 B2 | 9/2013 | Colburn et al. |
| 8,544,381 B2 | 10/2013 | Cartigny et al. |
| 8,546,731 B2 | 10/2013 | Pellerin et al. |
| 8,561,525 B2 | 10/2013 | Bauchot et al. |
| 8,578,293 B2 | 11/2013 | Breunig et al. |
| 8,581,137 B2 | 11/2013 | Egenter |
| 8,601,939 B2 | 12/2013 | Saksena et al. |
| 8,604,394 B2 | 12/2013 | Wu et al. |
| 8,618,447 B2 | 12/2013 | De'Longhi |
| 8,637,797 B2 | 1/2014 | Imura |
| D699,514 S | 2/2014 | Lovley, II et al. |
| 8,640,908 B2 | 2/2014 | Yang et al. |
| 8,674,270 B2 | 3/2014 | Anderson et al. |
| 8,689,680 B2 | 4/2014 | Park |
| 8,695,487 B2 | 4/2014 | Sakane et al. |
| 8,709,905 B2 | 4/2014 | Crayfourd |
| 8,714,391 B2 | 5/2014 | Milanesi |
| 8,726,792 B2 | 5/2014 | Shealy et al. |
| 8,733,574 B2 | 5/2014 | Heidrich et al. |
| D707,078 S | 6/2014 | Rivera et al. |
| 8,739,690 B2 | 6/2014 | Chameroy et al. |
| 8,747,933 B1 | 6/2014 | McGinn |
| 8,766,144 B2 | 7/2014 | McLoughlin et al. |
| 8,777,038 B2 | 7/2014 | Wen |
| 8,783,498 B2 | 7/2014 | Li |
| 8,783,947 B2 | 7/2014 | Ferron et al. |
| D710,647 S | 8/2014 | Mandil et al. |
| 8,800,803 B2 | 8/2014 | Stellwag |
| 8,808,772 B2 | 8/2014 | Lubrina et al. |
| 8,813,635 B2 | 8/2014 | Dragan |
| 8,813,989 B2 | 8/2014 | Hoffmann et al. |
| 8,820,220 B2 | 9/2014 | Thelen et al. |
| 8,847,129 B2 | 9/2014 | Kim et al. |
| 8,869,829 B2 | 10/2014 | Hasegawa |
| 8,887,939 B2 | 11/2014 | Chameroy et al. |
| D719,398 S | 12/2014 | Deters |
| D720,571 S | 1/2015 | Deters |
| 8,931,402 B2 | 1/2015 | Chameroy et al. |
| 8,931,659 B2 | 1/2015 | Rhetat et al. |
| 8,944,272 B2 | 2/2015 | Chameroy et al. |
| 8,944,273 B2 | 2/2015 | Chameroy et al. |
| 8,946,604 B2 | 2/2015 | Kaiser et al. |
| 8,960,081 B2 | 2/2015 | Beard et al. |
| 8,973,770 B2 | 3/2015 | He et al. |
| 8,985,372 B2 | 3/2015 | Yang et al. |
| 8,991,307 B2 | 3/2015 | Grozinger et al. |
| 8,993,934 B2 | 3/2015 | Giazzon et al. |
| D727,095 S | 4/2015 | Bak |
| 9,018,566 B2 | 4/2015 | Wang |
| 9,027,468 B2 | 5/2015 | Rhetat et al. |
| 9,035,223 B2 | 5/2015 | Noguchi et al. |
| 9,055,618 B2 | 6/2015 | Bunzel et al. |
| 9,057,526 B2 | 6/2015 | Barritt |
| 9,066,523 B2 | 6/2015 | Seitz et al. |
| 9,115,905 B2 | 8/2015 | Giazzon et al. |
| 9,119,501 B2 | 9/2015 | Xie |
| 9,125,513 B2 | 9/2015 | Kim |
| 9,127,849 B2 | 9/2015 | Kang et al. |
| 9,138,106 B2 | 9/2015 | Walker |
| 9,173,408 B2 | 11/2015 | Yamamoto et al. |
| 9,177,460 B2 | 11/2015 | Fissler |
| 9,182,126 B2 | 11/2015 | Cartwright et al. |
| 9,191,998 B2 | 11/2015 | Hegedis et al. |
| 9,220,362 B2 | 12/2015 | Eades et al. |
| 9,237,829 B2 | 1/2016 | Alet Vidal et al. |
| D749,906 S | 2/2016 | Lee |
| 9,247,842 B2 | 2/2016 | Cheung et al. |
| 9,271,595 B2 | 3/2016 | Lee |
| 9,295,354 B2 | 3/2016 | Sloot et al. |
| 9,295,355 B2 | 3/2016 | Kwag et al. |
| D754,469 S | 4/2016 | Deters |
| 9,301,644 B2 | 4/2016 | Payen et al. |
| 9,314,134 B2 | 4/2016 | Molnar |
| 9,320,381 B2 | 4/2016 | Chameroy et al. |
| 9,326,633 B2 | 5/2016 | Lin |
| 9,339,145 B1 | 5/2016 | Owczarzak |
| 9,341,382 B2 | 5/2016 | Kim |
| 9,345,358 B2 | 5/2016 | Zhang et al. |
| 9,351,495 B2 | 5/2016 | McFadden |
| 9,353,954 B2 | 5/2016 | Linnewiel |
| 9,375,021 B2 | 6/2016 | Raghavan et al. |
| 9,414,713 B2 | 8/2016 | Jinzhao |
| 9,433,036 B2 | 8/2016 | Kurtimoto et al. |
| 9,439,530 B2 | 9/2016 | Logan et al. |
| D769,058 S | 10/2016 | Lee |
| 9,456,713 B2 | 10/2016 | Backaert et al. |
| 9,470,423 B2 | 10/2016 | Jacob et al. |
| 9,474,412 B2 | 10/2016 | Fung et al. |
| D772,648 S | 11/2016 | Palermo |
| 9,480,364 B2 | 11/2016 | McKee et al. |
| D774,350 S | 12/2016 | Mandil |
| D774,356 S | 12/2016 | Maiorana et al. |
| 9,526,367 B2 | 12/2016 | Anota et al. |
| 9,545,168 B2 | 1/2017 | Gabara |
| 9,565,963 B2 | 2/2017 | Jeon et al. |
| 9,565,964 B2 | 2/2017 | Yang et al. |
| 9,585,509 B2 | 3/2017 | Wassmus et al. |
| 9,596,954 B2 | 3/2017 | Park |
| 9,615,408 B2 | 4/2017 | Metz et al. |
| 9,615,688 B2 | 4/2017 | Shibuya et al. |
| 9,615,691 B2 | 4/2017 | Xiao |
| 9,615,692 B2 | 4/2017 | Hoffmann et al. |
| 9,615,694 B2 | 4/2017 | Yoshidome |
| 9,629,499 B2 | 4/2017 | Kim |
| 9,629,500 B2 | 4/2017 | Chance |
| 9,636,618 B2 | 5/2017 | Fung et al. |
| 9,642,487 B1 | 5/2017 | McGinn |
| 9,648,975 B2 | 5/2017 | Imura |
| 9,648,985 B2 | 5/2017 | Huang et al. |
| 9,675,197 B2 | 6/2017 | Schobloch et al. |
| 9,681,770 B2 | 6/2017 | Backaert et al. |
| 9,681,773 B2 | 6/2017 | McKee et al. |
| 9,683,747 B2 | 6/2017 | Raghavan et al. |
| 9,700,172 B2 | 7/2017 | Tanaka et al. |
| 9,706,870 B2 | 7/2017 | Hoehn et al. |
| 9,706,871 B2 | 7/2017 | Matthijs |
| 9,717,363 B2 | 8/2017 | Pan |
| 9,717,364 B2 | 8/2017 | Sladecek |
| 9,737,936 B2 | 8/2017 | Linglin et al. |
| 9,743,794 B2 | 8/2017 | Shibuya et al. |
| 9,750,089 B2 | 8/2017 | Wiedemann et al. |
| 9,756,980 B1 | 9/2017 | Li et al. |
| 9,756,981 B2 | 9/2017 | Fung |
| 9,763,531 B2 | 9/2017 | Baraille et al. |
| D801,106 S | 10/2017 | Mirchandani et al. |
| 9,775,461 B2 | 10/2017 | Yang et al. |
| 9,788,678 B2 | 10/2017 | Abe et al. |
| 9,795,250 B2 | 10/2017 | Huang |
| 9,801,487 B2 | 10/2017 | Park et al. |
| 9,801,491 B2 | 10/2017 | Cohade et al. |
| 9,814,355 B2 | 11/2017 | Winter et al. |
| 9,841,261 B2 | 12/2017 | Raghavan et al. |
| 9,854,931 B2 | 1/2018 | Rocklinger et al. |

(56) References Cited

U.S. PATENT DOCUMENTS

| | | |
|---|---|---|
| 9,854,932 B2 | 1/2018 | Tiruvallur |
| 9,854,941 B2 | 1/2018 | Bonaccorso |
| 9,861,231 B2 | 1/2018 | Kim |
| 9,867,234 B2 | 1/2018 | Thomann et al. |
| 9,872,581 B2 | 1/2018 | Braden et al. |
| 9,872,582 B2 | 1/2018 | Song et al. |
| 9,877,610 B2 | 1/2018 | Bucher et al. |
| 9,883,768 B2 | 2/2018 | Starflinger |
| 9,888,811 B2 | 2/2018 | Zwanenburg et al. |
| 9,890,946 B2 | 2/2018 | Shibuya et al. |
| 9,895,028 B2 | 2/2018 | Gerard et al. |
| 9,900,936 B2 | 2/2018 | Imm et al. |
| 9,903,597 B2 | 2/2018 | Nishijima et al. |
| 9,907,435 B2 | 3/2018 | Kohler et al. |
| 9,909,764 B2 | 3/2018 | Bach |
| 9,924,825 B2 | 3/2018 | Zakowski et al. |
| 9,924,830 B1 | 3/2018 | Glucksman et al. |
| D815,491 S | 4/2018 | Hollinger |
| 9,930,990 B1 | 4/2018 | Gupta et al. |
| 9,936,837 B1 | 4/2018 | Granberry |
| D817,697 S | 5/2018 | Zhao |
| 9,961,721 B2 | 5/2018 | Guilleminot et al. |
| 9,961,929 B2 | 5/2018 | Olsson |
| 9,962,029 B2 | 5/2018 | Baraille et al. |
| 9,980,605 B2 | 5/2018 | De Haas et al. |
| 10,016,085 B2 | 7/2018 | Sapire |
| 10,021,889 B2 | 7/2018 | Vinett |
| 10,022,015 B2 | 7/2018 | Marco et al. |
| 10,022,021 B2 | 7/2018 | Sudhir |
| 10,034,578 B2 | 7/2018 | Ahmed |
| D824,717 S | 8/2018 | Allen |
| D826,638 S | 8/2018 | Zhang |
| 10,045,651 B2 | 8/2018 | Huang |
| 10,047,961 B2 | 8/2018 | Choi |
| 10,051,986 B2 | 8/2018 | Schultz et al. |
| 10,051,995 B2 | 8/2018 | Buckley et al. |
| 10,054,317 B2 | 8/2018 | Franzolin |
| 10,057,946 B2 | 8/2018 | Mills et al. |
| 10,058,210 B2 | 8/2018 | Palermo |
| 10,060,632 B2 | 8/2018 | Lim et al. |
| 10,064,518 B2 | 9/2018 | Xiao et al. |
| 10,076,206 B2 | 9/2018 | Chameroy et al. |
| D832,023 S | 10/2018 | Barberi et al. |
| D832,030 S | 10/2018 | Veldeman |
| 10,088,371 B2 | 10/2018 | Kaiser et al. |
| 10,092,128 B2 | 10/2018 | Seitz et al. |
| 10,094,576 B2 | 10/2018 | Kim et al. |
| 10,098,354 B2 | 10/2018 | Faraldi et al. |
| D833,204 S | 11/2018 | Lee |
| 10,117,546 B2 | 11/2018 | Le Grand |
| 10,119,708 B2 | 11/2018 | Bartelick et al. |
| 10,123,556 B2 | 11/2018 | Distaso et al. |
| 10,123,656 B2 | 11/2018 | Shanmugam |
| 10,125,978 B2 | 11/2018 | Shibuya et al. |
| 10,130,205 B2 | 11/2018 | Fung et al. |
| D834,889 S | 12/2018 | Moon et al. |
| 10,143,324 B2 | 12/2018 | Kataoka et al. |
| 10,143,327 B2 | 12/2018 | Freeman et al. |
| 10,154,750 B2 | 12/2018 | Allemand et al. |
| D838,548 S | 1/2019 | Schutte |
| 10,172,494 B2 | 1/2019 | Long |
| 10,178,924 B2 | 1/2019 | French et al. |
| 10,194,769 B2 | 2/2019 | Kodden |
| 10,208,964 B2 | 2/2019 | Cupp et al. |
| D842,649 S | 3/2019 | Mishan |
| 10,231,291 B2 | 3/2019 | Kim |
| 10,231,292 B2 | 3/2019 | Kim et al. |
| 10,231,565 B2 | 3/2019 | Song et al. |
| 10,231,574 B2 | 3/2019 | Strang |
| 10,244,883 B2 | 4/2019 | Chameroy et al. |
| 10,253,989 B2 | 4/2019 | Helm et al. |
| 10,258,049 B2 | 4/2019 | Engstrom |
| 10,260,755 B2 | 4/2019 | Bach |
| 10,260,758 B2 | 4/2019 | Colozzo et al. |
| 10,260,759 B2 | 4/2019 | Colozzo et al. |
| 10,271,686 B2 | 4/2019 | Roy |
| 10,274,206 B2 | 4/2019 | Chen |
| 10,278,241 B2 | 4/2019 | Shibuya et al. |
| 10,278,532 B2 | 5/2019 | Metz |
| 10,281,159 B2 | 5/2019 | Park et al. |
| 10,288,311 B2 | 5/2019 | Cho et al. |
| 10,295,192 B2 | 5/2019 | Yoshimura et al. |
| 10,299,621 B1 | 5/2019 | Bourgeois et al. |
| 10,327,587 B2 | 6/2019 | Liao |
| 10,330,323 B2 | 6/2019 | Kim et al. |
| 10,342,375 B2 | 7/2019 | Chen |
| 10,344,988 B2 | 7/2019 | Gattei |
| 10,349,775 B2 | 7/2019 | Lego et al. |
| 10,360,812 B2 | 7/2019 | Koennings et al. |
| 10,368,403 B2 | 7/2019 | Hayashi et al. |
| 10,368,681 B2 | 8/2019 | Kataoka et al. |
| 10,376,087 B2 | 8/2019 | Cornelissen |
| 10,398,249 B2 | 9/2019 | Becker et al. |
| 10,405,686 B2 | 9/2019 | Patel et al. |
| 10,413,109 B2 | 9/2019 | Krebs et al. |
| 10,448,778 B2 | 10/2019 | Watson et al. |
| 10,451,290 B2 | 10/2019 | Mayberry |
| 10,463,186 B2 | 11/2019 | Di Ronco et al. |
| 10,470,609 B2 | 11/2019 | Gerard et al. |
| 10,470,614 B2 | 11/2019 | Lang et al. |
| 10,492,637 B2 | 12/2019 | Abe et al. |
| 10,492,638 B2 | 12/2019 | Guegan et al. |
| 10,499,760 B2 | 12/2019 | Blond |
| 10,512,359 B2 | 12/2019 | Xu et al. |
| 10,517,306 B1 | 12/2019 | Meirav |
| 10,524,317 B2 | 12/2019 | Kondo et al. |
| 10,524,604 B2 | 1/2020 | Bjork et al. |
| 10,533,752 B2 | 1/2020 | Faraldi et al. |
| 10,561,273 B2 | 2/2020 | Patel et al. |
| 10,561,274 B2 | 2/2020 | Huang |
| 10,578,310 B2 | 3/2020 | Joo et al. |
| 10,588,445 B2 | 3/2020 | Gustavsson |
| 10,602,869 B2 | 3/2020 | Yu et al. |
| 10,638,868 B1 | 5/2020 | Straight |
| 10,638,869 B2 | 5/2020 | Kataoka et al. |
| 10,645,765 B2 | 5/2020 | Shibuya et al. |
| 10,667,639 B2 | 6/2020 | Mederer |
| 10,674,855 B2 | 6/2020 | Rosalia et al. |
| 10,674,864 B2 | 6/2020 | Trtic |
| 10,687,650 B2 | 6/2020 | Huang et al. |
| 10,690,352 B2 | 6/2020 | Smith et al. |
| 10,694,753 B2 | 6/2020 | Reese et al. |
| 10,694,882 B2 | 6/2020 | Huang |
| 10,694,891 B2 | 6/2020 | Huang |
| 10,729,282 B2 | 8/2020 | Bonaccorso |
| 2002/0179587 A1 | 12/2002 | Hui |
| 2002/0185012 A1 | 12/2002 | Yokoyama |
| 2003/0034027 A1 | 2/2003 | Yamamoto et al. |
| 2003/0127447 A1 | 7/2003 | Lin |
| 2004/0035845 A1 | 2/2004 | Moon et al. |
| 2004/0045446 A1 | 3/2004 | Park |
| 2004/0055474 A1 | 3/2004 | Lekic et al. |
| 2004/0112362 A1 | 6/2004 | Bruno et al. |
| 2004/0124197 A1 | 7/2004 | Hasegawa |
| 2004/0216731 A1 | 11/2004 | Personnettaz et al. |
| 2004/0222208 A1 | 11/2004 | Ko |
| 2004/0253348 A1 | 12/2004 | Woodward et al. |
| 2005/0011370 A1 | 1/2005 | Xu et al. |
| 2005/0034716 A1 | 2/2005 | Harbin |
| 2005/0089318 A1 | 4/2005 | Lai et al. |
| 2005/0223906 A1 | 10/2005 | Xu |
| 2005/0284305 A1 | 12/2005 | Angue |
| 2006/0005714 A1 | 1/2006 | Siegel et al. |
| 2006/0081235 A1 | 4/2006 | Lundh et al. |
| 2007/0045284 A1 | 3/2007 | Balk et al. |
| 2007/0095215 A1 | 5/2007 | Ho et al. |
| 2007/0125768 A1 | 6/2007 | Kim et al. |
| 2007/0158335 A1 | 7/2007 | Mansbery |
| 2007/0199557 A1 | 8/2007 | Von Kaenel, Jr. |
| 2007/0295221 A1 | 12/2007 | Seurat Guiochet et al. |
| 2008/0022861 A1 | 1/2008 | Ferron |
| 2008/0078371 A1 | 4/2008 | Boscaino |
| 2008/0078755 A1 | 4/2008 | Jeon et al. |
| 2008/0083730 A1 | 4/2008 | Dolgov et al. |

(56) References Cited

U.S. PATENT DOCUMENTS

| | | |
|---|---|---|
| 2008/0095905 A1 | 4/2008 | Sells et al. |
| 2008/0099008 A1 | 5/2008 | Bolton et al. |
| 2008/0099461 A1 | 5/2008 | Li |
| 2008/0105137 A1 | 5/2008 | Genslak et al. |
| 2008/0142498 A1 | 6/2008 | He et al. |
| 2008/0163764 A1 | 7/2008 | Payen et al. |
| 2008/0173631 A1 | 7/2008 | Gagas et al. |
| 2008/0206420 A1 | 8/2008 | McFadden |
| 2008/0213447 A1 | 9/2008 | Payen et al. |
| 2008/0223224 A1 | 9/2008 | Martin |
| 2008/0290090 A1 | 11/2008 | Kindler et al. |
| 2008/0314258 A1 | 12/2008 | Martin |
| 2009/0011101 A1 | 1/2009 | Doherty et al. |
| 2009/0013988 A1 | 1/2009 | Kim et al. |
| 2009/0064868 A1 | 3/2009 | Cartossi |
| 2009/0095166 A1 | 4/2009 | Jian |
| 2009/0134140 A1 | 5/2009 | Van Der Weij |
| 2009/0223380 A1 | 9/2009 | Van Aken |
| 2009/0223386 A1 | 9/2009 | Edwards |
| 2009/0250452 A1 | 10/2009 | Tse |
| 2010/0089248 A1 | 4/2010 | Jones |
| 2010/0136194 A1 | 6/2010 | Schutte |
| 2010/0147159 A1 | 6/2010 | Fossati |
| 2010/0147824 A1 | 6/2010 | Bonuso et al. |
| 2010/0206289 A1 | 8/2010 | Larsen et al. |
| 2010/0282097 A1 | 11/2010 | Schulte |
| 2011/0003048 A1 | 1/2011 | Sugimoto et al. |
| 2011/0095015 A1 | 4/2011 | Kao |
| 2011/0168158 A1 | 4/2011 | Barkhouse |
| 2011/0120319 A1 | 5/2011 | Chang |
| 2011/0126719 A1 | 6/2011 | Valance |
| 2011/0146653 A1 | 6/2011 | Kitatani |
| 2011/0147376 A1 | 6/2011 | Ueda et al. |
| 2011/0248020 A1 | 10/2011 | Yuan |
| 2011/0268153 A1 | 11/2011 | He et al. |
| 2012/0003364 A1 | 1/2012 | Kling et al. |
| 2012/0009317 A1 | 1/2012 | McLemore |
| 2012/0012584 A1 | 1/2012 | Chameroy et al. |
| 2012/0024164 A1 | 2/2012 | Park et al. |
| 2012/0024169 A1 | 2/2012 | Hsu |
| 2012/0040067 A1 | 2/2012 | Baraille et al. |
| 2012/0048843 A1 | 3/2012 | Feng et al. |
| 2012/0125313 A1 | 5/2012 | Van Der Weij |
| 2012/0174797 A1 | 7/2012 | Froza |
| 2012/0181363 A1 | 7/2012 | Huang |
| 2012/0192722 A1 | 8/2012 | Foster |
| 2012/0192726 A1 | 8/2012 | Clearman et al. |
| 2012/0217236 A1 | 8/2012 | Takagi |
| 2012/0217252 A1 | 8/2012 | Jung |
| 2012/0222665 A1 | 9/2012 | Ahmed |
| 2012/0318149 A1 | 12/2012 | Ahmed |
| 2013/0019759 A1 | 1/2013 | Tumenbatur et al. |
| 2013/0061765 A1 | 3/2013 | Reinhart |
| 2013/0074702 A1 | 3/2013 | Difante |
| 2013/0092145 A1 | 4/2013 | Murphy et al. |
| 2013/0104875 A1 | 5/2013 | Schultz et al. |
| 2013/0156906 A1 | 6/2013 | Raghavan et al. |
| 2013/0180413 A1 | 7/2013 | Tjerkgaast et al. |
| 2013/0180986 A1 | 7/2013 | He et al. |
| 2013/0196038 A1 | 8/2013 | Liu |
| 2013/0255509 A1 | 10/2013 | He et al. |
| 2013/0276643 A1 | 10/2013 | Krolick et al. |
| 2013/0298781 A1 | 11/2013 | Ganuza et al. |
| 2013/0305933 A1 | 11/2013 | Heidrich et al. |
| 2013/0333685 A1 | 12/2013 | Jeong et al. |
| 2014/0021191 A1 | 1/2014 | Moon et al. |
| 2014/0044851 A1 | 2/2014 | Kennedy |
| 2014/0083306 A1 | 3/2014 | Lee |
| 2014/0083992 A1 | 3/2014 | Linnewiel |
| 2014/0102315 A1 | 4/2014 | Park |
| 2014/0157994 A1 | 6/2014 | Ryan et al. |
| 2014/0175085 A1 | 6/2014 | Yang et al. |
| 2014/0199454 A1 | 7/2014 | Storek et al. |
| 2014/0199459 A1 | 7/2014 | Jackson et al. |
| 2014/0201688 A1 | 7/2014 | Guilleminot et al. |
| 2014/0220196 A1 | 8/2014 | Veloo |
| 2014/0245898 A1 | 9/2014 | Froza |
| 2014/0246419 A1 | 9/2014 | Li |
| 2014/0251158 A1 | 9/2014 | Yang et al. |
| 2014/0251162 A1 | 9/2014 | Zhou |
| 2014/0318385 A1 | 10/2014 | Kim |
| 2014/0318386 A1 | 10/2014 | Kim |
| 2014/0318387 A1 | 10/2014 | Kim |
| 2014/0318388 A1 | 10/2014 | Kim |
| 2014/0318389 A1 | 10/2014 | Kim |
| 2014/0322417 A1 | 10/2014 | Kim |
| 2014/0348987 A1 | 11/2014 | Cheng et al. |
| 2014/0353316 A1 | 12/2014 | Lin |
| 2014/0360384 A1 | 12/2014 | Kim |
| 2014/0366746 A1 | 12/2014 | Tsai |
| 2014/0370176 A1 | 12/2014 | Imura et al. |
| 2014/0373729 A1 | 12/2014 | Kim et al. |
| 2014/0377417 A1 | 12/2014 | Martinez |
| 2015/0000535 A1 | 1/2015 | Yoshidome et al. |
| 2015/0059595 A1 | 3/2015 | Rand et al. |
| 2015/0083107 A1 | 3/2015 | Busch et al. |
| 2015/0122137 A1 | 5/2015 | Chang |
| 2015/0136769 A1 | 5/2015 | Quinn et al. |
| 2015/0173551 A1 | 6/2015 | Carbone et al. |
| 2015/0192289 A1 | 7/2015 | Gattei et al. |
| 2015/0201788 A1 | 7/2015 | Douma et al. |
| 2015/0201806 A1 | 7/2015 | Yoshidome |
| 2015/0208845 A1 | 7/2015 | Robbins et al. |
| 2015/0208858 A1 | 7/2015 | Robbins et al. |
| 2015/0223627 A1 | 8/2015 | Li et al. |
| 2015/0226438 A1 | 8/2015 | Ozyurt et al. |
| 2015/0250187 A1 | 9/2015 | Sakane et al. |
| 2015/0292750 A1 | 10/2015 | Delrue et al. |
| 2015/0305093 A1 | 10/2015 | Smith et al. |
| 2015/0312964 A1 | 10/2015 | Sorenson et al. |
| 2015/0313399 A1 | 11/2015 | Park |
| 2015/0351578 A1 | 12/2015 | Song et al. |
| 2015/0354827 A1 | 12/2015 | Faraldi et al. |
| 2015/0366393 A1 | 12/2015 | Fareham et al. |
| 2015/0366399 A1 | 12/2015 | Lee |
| 2015/0366402 A1 | 12/2015 | Wu et al. |
| 2016/0007644 A1 | 1/2016 | Hack et al. |
| 2016/0007789 A1 | 1/2016 | Tiruvallur |
| 2016/0029829 A1 | 2/2016 | Klein |
| 2016/0033141 A1 | 2/2016 | Rizzuto |
| 2016/0037955 A1 | 2/2016 | Kim |
| 2016/0045067 A1 | 2/2016 | Liao |
| 2016/0051077 A1 | 2/2016 | Sloot et al. |
| 2016/0051078 A1 | 2/2016 | Jenkins et al. |
| 2016/0051086 A1 | 2/2016 | De'Longhi |
| 2016/0066738 A1 | 3/2016 | Shibuya et al. |
| 2016/0073814 A1 | 3/2016 | Kiriishi et al. |
| 2016/0081509 A1 | 3/2016 | Delrue et al. |
| 2016/0100707 A1 | 4/2016 | Huang |
| 2016/0100713 A1 | 4/2016 | De Haas et al. |
| 2016/0113432 A1 | 4/2016 | Cornelissen |
| 2016/0113442 A1 | 4/2016 | De Haas et al. |
| 2016/0120363 A1 | 5/2016 | Zwanenburg et al. |
| 2016/0120364 A1 | 5/2016 | De Haas et al. |
| 2016/0123660 A1 | 5/2016 | Peng |
| 2016/0150906 A1 | 6/2016 | Lee et al. |
| 2016/0165676 A1 | 6/2016 | Imm et al. |
| 2016/0174749 A1 | 6/2016 | Eades et al. |
| 2016/0174764 A1 | 6/2016 | Xiao |
| 2016/0174771 A1 | 6/2016 | Benoit et al. |
| 2016/0183722 A1 | 6/2016 | Fisher |
| 2016/0206139 A1 | 6/2016 | Johnson |
| 2016/0206140 A1 | 6/2016 | Johnson et al. |
| 2016/0192808 A1 | 7/2016 | Van Der Burg et al. |
| 2016/0198882 A1 | 7/2016 | Linglin |
| 2016/0198883 A1 | 7/2016 | Wang et al. |
| 2016/0206131 A1 | 7/2016 | Chien |
| 2016/0219653 A1 | 7/2016 | Kim et al. |
| 2016/0220057 A1 | 8/2016 | Smith et al. |
| 2016/0235078 A1 | 8/2016 | Farina et al. |
| 2016/0235239 A1 | 8/2016 | Patadia |
| 2016/0253080 A1 | 9/2016 | Ban et al. |
| 2016/0270596 A1 | 9/2016 | Allemand et al. |
| 2016/0278563 A1 | 9/2016 | Choudhary |

(56) References Cited

U.S. PATENT DOCUMENTS

| | | |
|---|---|---|
| 2016/0278565 A1 | 9/2016 | Chameroy et al. |
| 2016/0281994 A1 | 9/2016 | Nuessler |
| 2016/0309940 A1 | 10/2016 | Valance et al. |
| 2016/0309956 A1 | 10/2016 | Glucksman |
| 2016/0316525 A1 | 10/2016 | Vainionpaa |
| 2016/0316968 A1 | 11/2016 | Linglin |
| 2016/0324359 A1 | 11/2016 | Aboujassoum et al. |
| 2016/0327280 A1 | 11/2016 | Smith et al. |
| 2016/0345766 A1 | 12/2016 | Sapire |
| 2016/0353913 A1 | 12/2016 | Chameroy et al. |
| 2016/0353914 A1 | 12/2016 | Chameroy et al. |
| 2016/0353915 A1 | 12/2016 | Chameroy et al. |
| 2016/0353916 A1 | 12/2016 | Chameroy et al. |
| 2016/0360922 A1 | 12/2016 | Xiao et al. |
| 2016/0367061 A1 | 12/2016 | Chou |
| 2016/0374510 A1 | 12/2016 | Albizuri Landazabal |
| 2017/0000293 A1 | 1/2017 | Sladecek et al. |
| 2017/0016623 A1 | 1/2017 | Rabie et al. |
| 2017/0020334 A1 | 1/2017 | Sorenson et al. |
| 2017/0055770 A1 | 3/2017 | Case |
| 2017/0065127 A1 | 3/2017 | Bonaccorso |
| 2017/0071034 A1 | 3/2017 | Metz |
| 2017/0079475 A1 | 3/2017 | Buckley et al. |
| 2017/0089590 A1 | 3/2017 | Bruin-Slot et al. |
| 2017/0095105 A1 | 4/2017 | Clark et al. |
| 2017/0099977 A1 | 4/2017 | Liu |
| 2017/0099984 A1 | 4/2017 | Koetz |
| 2017/0099990 A1 | 4/2017 | Magnouloux et al. |
| 2017/0099995 A1 | 4/2017 | Magnouloux |
| 2017/0119192 A1 | 5/2017 | Sanserverino |
| 2017/0127871 A1 | 5/2017 | Leung |
| 2017/0172335 A1 | 6/2017 | Colas et al. |
| 2017/0181564 A1 | 6/2017 | He et al. |
| 2017/0199658 A1 | 7/2017 | Stoufer et al. |
| 2017/0224157 A1 | 8/2017 | Rummel et al. |
| 2017/0231257 A1 | 8/2017 | Thul et al. |
| 2017/0231415 A1 | 8/2017 | Cheng et al. |
| 2017/0231430 A1 | 8/2017 | Moon et al. |
| 2017/0245674 A1 | 8/2017 | Imura |
| 2017/0245683 A1* | 8/2017 | Chen ................ A23L 5/17 |
| 2017/0245686 A1 | 8/2017 | Man |
| 2017/0251872 A1 | 9/2017 | Li et al. |
| 2017/0251874 A1 | 9/2017 | Sladecek |
| 2017/0258268 A1 | 9/2017 | Kazanas et al. |
| 2017/0276378 A1 | 9/2017 | Faraldi et al. |
| 2017/0280914 A1 | 10/2017 | Kumar et al. |
| 2017/0290452 A1 | 10/2017 | Guillaume et al. |
| 2017/0295993 A1 | 10/2017 | Li et al. |
| 2017/0303740 A1 | 10/2017 | Bonaccorso |
| 2017/0319006 A1 | 11/2017 | Niizumi |
| 2017/0332823 A1 | 11/2017 | Sanseverino |
| 2017/0343221 A1 | 11/2017 | Swayne et al. |
| 2017/0360238 A1 | 12/2017 | Bogazzi |
| 2017/0360254 A1 | 12/2017 | Muhr et al. |
| 2017/0360255 A1 | 12/2017 | Karau |
| 2017/0367514 A1 | 12/2017 | In 'T Groen et al. |
| 2017/0370595 A1 | 12/2017 | Yang et al. |
| 2018/0000285 A1 | 1/2018 | Backus et al. |
| 2018/0007744 A1 | 1/2018 | Nonaka et al. |
| 2018/0014683 A1 | 1/2018 | Glucksman |
| 2018/0028017 A1 | 2/2018 | Wu |
| 2018/0035698 A1 | 2/2018 | McNerney et al. |
| 2018/0070596 A1 | 3/2018 | Kim et al. |
| 2018/0073739 A1 | 3/2018 | Dumenil |
| 2018/0078089 A1 | 3/2018 | Sauer et al. |
| 2018/0103796 A1 | 4/2018 | Park |
| 2018/0110355 A1 | 4/2018 | Huang et al. |
| 2018/0110373 A1 | 4/2018 | Zhang et al. |
| 2018/0116264 A1 | 5/2018 | De Winter et al. |
| 2018/0116438 A1 | 5/2018 | He et al. |
| 2018/0125293 A1 | 5/2018 | McNerney et al. |
| 2018/0125294 A1 | 5/2018 | Conte et al. |
| 2018/0132648 A1 | 5/2018 | Furlanetto et al. |
| 2018/0140126 A1 | 5/2018 | Van Dillen |
| 2018/0143086 A1 | 5/2018 | Stoufer et al. |
| 2018/0146812 A1 | 5/2018 | Choi |
| 2018/0153329 A1 | 6/2018 | Glucksman et al. |
| 2018/0160840 A1 | 6/2018 | De'Longhi |
| 2018/0160849 A1 | 6/2018 | Hebert, Jr. et al. |
| 2018/0177322 A1 | 6/2018 | Kim |
| 2018/0177343 A1 | 6/2018 | Bonaccorso |
| 2018/0184843 A1 | 7/2018 | Kim et al. |
| 2018/0184848 A1 | 7/2018 | De'Longhi |
| 2018/0192825 A1 | 7/2018 | Popeil et al. |
| 2018/0199615 A1 | 7/2018 | Zhang et al. |
| 2018/0199756 A1 | 7/2018 | Huang |
| 2018/0206672 A1 | 7/2018 | Grace et al. |
| 2018/0206677 A1 | 7/2018 | Ivarsson et al. |
| 2018/0213965 A1 | 8/2018 | Li |
| 2018/0220498 A1 | 8/2018 | Jeon et al. |
| 2018/0220842 A1 | 8/2018 | Delrue et al. |
| 2018/0228318 A1 | 8/2018 | Zwanenburg et al. |
| 2018/0235396 A1 | 8/2018 | Schonenberger |
| 2018/0238560 A1 | 8/2018 | Deng et al. |
| 2018/0255967 A1 | 9/2018 | Haas et al. |
| 2018/0255971 A1 | 9/2018 | Moon et al. |
| 2018/0263084 A1 | 9/2018 | Yoshino et al. |
| 2018/0263402 A1 | 9/2018 | Li |
| 2018/0266697 A1 | 9/2018 | Dash et al. |
| 2018/0270915 A1 | 9/2018 | Koetz |
| 2018/0271321 A1 | 9/2018 | Delrue et al. |
| 2018/0271322 A1 | 9/2018 | Thai et al. |
| 2018/0271323 A1 | 9/2018 | Zhang et al. |
| 2018/0279832 A1 | 10/2018 | Ohta et al. |
| 2018/0289212 A1* | 10/2018 | Sladecek .............. A47J 37/0641 |
| 2018/0296019 A1 | 10/2018 | Kim et al. |
| 2018/0299138 A1 | 10/2018 | Faraldi et al. |
| 2018/0303285 A1 | 10/2018 | Cheng |
| 2018/0317691 A1 | 11/2018 | Huang |
| 2018/0317692 A1 | 11/2018 | Huang |
| 2018/0317693 A1 | 11/2018 | Huang |
| 2018/0325311 A1 | 11/2018 | Feldman et al. |
| 2018/0325313 A1 | 11/2018 | De'Longhi et al. |
| 2018/0325318 A1 | 11/2018 | De Longhi et al. |
| 2018/0325322 A1 | 11/2018 | De'Longhi et al. |
| 2018/0328645 A1 | 11/2018 | Wang et al. |
| 2018/0332993 A1 | 11/2018 | Cho et al. |
| 2018/0332994 A1 | 11/2018 | Hasegawa |
| 2018/0332999 A1 | 11/2018 | Nie |
| 2018/0333004 A1 | 11/2018 | DeLonghi |
| 2018/0333005 A1 | 11/2018 | Fritz et al. |
| 2018/0338636 A1 | 11/2018 | Ceccoli |
| 2018/0340695 A1 | 11/2018 | Park et al. |
| 2018/0344085 A1 | 12/2018 | Dutter |
| 2018/0347829 A1 | 12/2018 | Martini et al. |
| 2018/0353007 A1 | 12/2018 | Eberhart et al. |
| 2018/0353010 A1 | 12/2018 | Delrue et al. |
| 2018/0359823 A1 | 12/2018 | Shin et al. |
| 2018/0363915 A1 | 12/2018 | Bu |
| 2018/0368615 A1 | 12/2018 | Luo et al. |
| 2019/0000267 A1 | 1/2019 | Li et al. |
| 2019/0003718 A1 | 1/2019 | Lee et al. |
| 2019/0008310 A1 | 1/2019 | Kim et al. |
| 2019/0008316 A1 | 1/2019 | Kim et al. |
| 2019/0014940 A1 | 1/2019 | Cheung et al. |
| 2019/0014943 A1 | 1/2019 | Gill et al. |
| 2019/0021142 A1 | 1/2019 | Mizuta et al. |
| 2019/0021537 A1 | 1/2019 | Park |
| 2019/0024904 A1 | 1/2019 | Ueda et al. |
| 2019/0029459 A1 | 1/2019 | Gao et al. |
| 2019/0045964 A1 | 2/2019 | Gill et al. |
| 2019/0045973 A1 | 2/2019 | Gill et al. |
| 2019/0053521 A1 | 2/2019 | Tian et al. |
| 2019/0053655 A1 | 2/2019 | Panasik et al. |
| 2019/0059627 A1 | 2/2019 | Kitatani et al. |
| 2019/0059628 A1 | 2/2019 | Liu et al. |
| 2019/0059647 A1 | 2/2019 | Floessholzer |
| 2019/0069719 A1 | 3/2019 | Huang et al. |
| 2019/0082876 A1 | 3/2019 | Shi et al. |
| 2019/0110629 A1 | 4/2019 | Truong et al. |
| 2019/0137112 A1 | 5/2019 | Lego et al. |
| 2019/0142220 A1 | 5/2019 | Shirali et al. |
| 2019/0174944 A1 | 6/2019 | Luo et al. |
| 2019/0203944 A1 | 7/2019 | Cho et al. |

(56) References Cited

U.S. PATENT DOCUMENTS

| | | |
|---|---|---|
| 2019/0231125 A1 | 8/2019 | Gill et al. |
| 2019/0231126 A1 | 8/2019 | Gill et al. |
| 2019/0231127 A1 | 8/2019 | Gill et al. |
| 2019/0231128 A1 | 8/2019 | Gill et al. |
| 2019/0231129 A1 | 8/2019 | Gill et al. |
| 2019/0231130 A1 | 8/2019 | Gill et al. |
| 2019/0231131 A1 | 8/2019 | Gill et al. |
| 2019/0231132 A1 | 8/2019 | Gill et al. |
| 2019/0231133 A1 | 8/2019 | Gill et al. |
| 2019/0231134 A1 | 8/2019 | Gill et al. |
| 2019/0231135 A1 | 8/2019 | Gill et al. |
| 2019/0231136 A1 | 8/2019 | Gill et al. |
| 2019/0231137 A1 | 8/2019 | Gill et al. |
| 2019/0231138 A1 | 8/2019 | Gill et al. |
| 2019/0231139 A1 | 8/2019 | Gill et al. |
| 2019/0231140 A1 | 8/2019 | Gill et al. |
| 2019/0231141 A1 | 8/2019 | Gill et al. |
| 2019/0231142 A1 | 8/2019 | Gill et al. |
| 2019/0231143 A1 | 8/2019 | Gill et al. |
| 2019/0254476 A1 | 8/2019 | Anthony et al. |
| 2019/0269276 A1 | 9/2019 | Gvili |
| 2019/0298100 A1 | 10/2019 | Li et al. |
| 2019/0313844 A1 | 10/2019 | Nadendla et al. |
| 2019/0328169 A1 | 10/2019 | Fogacci |
| 2019/0335934 A1 | 11/2019 | Delrue et al. |
| 2019/0374058 A1 | 12/2019 | Blond et al. |
| 2019/0380524 A1 | 12/2019 | Guegan et al. |
| 2019/0381654 A1 | 12/2019 | Oleynik |
| 2019/0387913 A1 | 12/2019 | Lee et al. |
| 2019/0387922 A1 | 12/2019 | Jin et al. |
| 2020/0000262 A1 | 1/2020 | Delrue et al. |
| 2020/0018475 A1 | 1/2020 | Sim et al. |
| 2020/0029721 A1 | 1/2020 | Kang et al. |
| 2020/0029731 A1 | 1/2020 | Hunt |
| 2020/0046157 A1 | 2/2020 | Leung |
| 2020/0054024 A1 | 2/2020 | Sun et al. |
| 2020/0080726 A1 | 3/2020 | Polster |
| 2020/0088415 A1 | 3/2020 | Lee et al. |
| 2020/0121129 A1 | 4/2020 | Wittig |
| 2020/0128995 A1 | 4/2020 | Patel et al. |
| 2020/0146496 A1 | 5/2020 | Patadia |
| 2020/0170437 A1 | 6/2020 | Anthony et al. |
| 2020/0178583 A1 | 6/2020 | Chen et al. |
| 2020/0187698 A1 | 6/2020 | Peng et al. |
| 2020/0405086 A1 | 12/2020 | Dos Santos et al. |
| 2021/0000292 A1 | 1/2021 | Siu et al. |
| 2021/0000296 A1 | 1/2021 | Kennedy et al. |

FOREIGN PATENT DOCUMENTS

| | | |
|---|---|---|
| CN | 1218653 A | 6/1999 |
| CN | 2358794 Y | 1/2000 |
| CN | 2389593 Y | 8/2000 |
| CN | 2450993 Y | 10/2001 |
| CN | 2469839 Y | 1/2002 |
| CN | 2479871 Y | 3/2002 |
| CN | 1139352 C | 2/2004 |
| CN | 1148142 C | 5/2004 |
| CN | 1158963 C | 7/2004 |
| CN | 2719176 Y | 8/2005 |
| CN | 1805700 A | 7/2006 |
| CN | 1820685 A | 8/2006 |
| CN | 1883351 A | 12/2006 |
| CN | 2855256 Y | 1/2007 |
| CN | 1959214 A | 5/2007 |
| CN | 2904903 Y | 5/2007 |
| CN | 1981682 A | 6/2007 |
| CN | 1985727 A | 6/2007 |
| CN | 1989884 A | 7/2007 |
| CN | 100998476 A | 7/2007 |
| CN | 101023842 A | 8/2007 |
| CN | 101053485 A | 10/2007 |
| CN | 200987595 Y | 12/2007 |
| CN | 101099635 A | 1/2008 |
| CN | 101108064 A | 1/2008 |
| CN | 101112291 A | 1/2008 |
| CN | 101112292 A | 1/2008 |
| CN | 101112293 A | 1/2008 |
| CN | 101142448 A | 3/2008 |
| CN | 101185556 A | 5/2008 |
| CN | 100401957 C | 7/2008 |
| CN | 101209179 A | 7/2008 |
| CN | 101209180 A | 7/2008 |
| CN | 201079267 Y | 7/2008 |
| CN | 100425186 C | 10/2008 |
| CN | 100428906 C | 10/2008 |
| CN | 101273834 A | 10/2008 |
| CN | 201139427 Y | 10/2008 |
| CN | 101322614 A | 12/2008 |
| CN | 201197609 Y | 2/2009 |
| CN | 100464682 C | 3/2009 |
| CN | 100469289 C | 3/2009 |
| CN | 201207144 Y | 3/2009 |
| CN | 101432608 A | 5/2009 |
| CN | 101438929 A | 5/2009 |
| CN | 100496350 C | 6/2009 |
| CN | 100522018 C | 8/2009 |
| CN | 100531628 C | 8/2009 |
| CN | 100534363 C | 9/2009 |
| CN | 101518409 A | 9/2009 |
| CN | 100559999 C | 11/2009 |
| CN | 201365839 Y | 12/2009 |
| CN | 100588351 C | 2/2010 |
| CN | 101666513 A | 3/2010 |
| CN | 101669761 A | 3/2010 |
| CN | 101766439 A | 7/2010 |
| CN | 101766443 A | 7/2010 |
| CN | 101791190 A | 8/2010 |
| CN | 101828856 A | 9/2010 |
| CN | 101856086 A | 10/2010 |
| CN | 201602600 U | 10/2010 |
| CN | 201624512 U | 11/2010 |
| CN | 101936550 A | 1/2011 |
| CN | 101940273 A | 1/2011 |
| CN | 101420893 B | 2/2011 |
| CN | 101977536 A | 2/2011 |
| CN | 201888709 U | 7/2011 |
| CN | 201929758 U | 8/2011 |
| CN | 201948771 U | 8/2011 |
| CN | 102178443 A | 9/2011 |
| CN | 102178445 A | 9/2011 |
| CN | 102178464 A | 9/2011 |
| CN | 201958652 U | 9/2011 |
| CN | 201996364 U | 10/2011 |
| CN | 101305890 B | 11/2011 |
| CN | 102240164 A | 11/2011 |
| CN | 102307500 A | 1/2012 |
| CN | 102313306 A | 2/2012 |
| CN | 102349791 A | 2/2012 |
| CN | 202151310 U | 2/2012 |
| CN | 102368936 A | 3/2012 |
| CN | 202184614 U | 4/2012 |
| CN | 101692958 B | 5/2012 |
| CN | 202207075 U | 5/2012 |
| CN | 202234720 U | 5/2012 |
| CN | 202234761 U | 5/2012 |
| CN | 102589016 A | 7/2012 |
| CN | 202312830 U | 7/2012 |
| CN | 202312830 U | 7/2012 |
| CN | 202312886 U | 7/2012 |
| CN | 102670079 A | 9/2012 |
| CN | 202408428 U | 9/2012 |
| CN | 202408455 U | 9/2012 |
| CN | 102755120 A | 10/2012 |
| CN | 102824120 A | 12/2012 |
| CN | 202619362 U | 12/2012 |
| CN | 102100481 B | 1/2013 |
| CN | 102883641 A | 1/2013 |
| CN | 202636678 U | 1/2013 |
| CN | 202698888 U | 1/2013 |
| CN | 202723624 U | 2/2013 |
| CN | 103006045 A | 4/2013 |
| CN | 103006092 A | 4/2013 |
| CN | 202858889 U | 4/2013 |

(56) References Cited

FOREIGN PATENT DOCUMENTS

| | | | |
|---|---|---|---|
| CN | 103142128 | A | 6/2013 |
| CN | 103142134 | A | 6/2013 |
| CN | 103142151 | A | 6/2013 |
| CN | 103169371 | A | 6/2013 |
| CN | 103179884 | A | 6/2013 |
| CN | 202960194 | U | 6/2013 |
| CN | 202981682 | U | 6/2013 |
| CN | 203000535 | U | 6/2013 |
| CN | 103188947 | A | 7/2013 |
| CN | 103188970 | A | 7/2013 |
| CN | 103220947 | A | 7/2013 |
| CN | 103222807 | A | 7/2013 |
| CN | 203041954 | U | 7/2013 |
| CN | 203041955 | U | 7/2013 |
| CN | 102342739 | B | 8/2013 |
| CN | 203122175 | U | 8/2013 |
| CN | 103299132 | A | 9/2013 |
| CN | 203195497 | U | 9/2013 |
| CN | 203195499 | U | 9/2013 |
| CN | 103375826 | A | 10/2013 |
| CN | 203234602 | U | 10/2013 |
| CN | 203234613 | U | 10/2013 |
| CN | 102319018 | B | 11/2013 |
| CN | 203302862 | U | 11/2013 |
| CN | 203302892 | U | 11/2013 |
| CN | 103445669 | A | 12/2013 |
| CN | 102397005 | B | 1/2014 |
| CN | 103491830 | A | 1/2014 |
| CN | 203407931 | U | 1/2014 |
| CN | 103649643 | A | 3/2014 |
| CN | 203483269 | U | 3/2014 |
| CN | 103750730 | A | 4/2014 |
| CN | 203539138 | U | 4/2014 |
| CN | 203597771 | U | 5/2014 |
| CN | 203597772 | U | 5/2014 |
| CN | 203615383 | U | 5/2014 |
| CN | 103876645 | A | 6/2014 |
| CN | 203634023 | U | 6/2014 |
| CN | 203647141 | U | 6/2014 |
| CN | 203662545 | U | 6/2014 |
| CN | 103892696 | A | 7/2014 |
| CN | 103948308 | A | 7/2014 |
| CN | 203693372 | U | 7/2014 |
| CN | 203723888 | U | 7/2014 |
| CN | 104000478 | A | 8/2014 |
| CN | 203762926 | U | 8/2014 |
| CN | 203776718 | U | 8/2014 |
| CN | 203776719 | U | 8/2014 |
| CN | 203776720 | U | 8/2014 |
| CN | 203776729 | U | 8/2014 |
| CN | 203789747 | U | 8/2014 |
| CN | 203828675 | U | 9/2014 |
| CN | 104068757 | B | 10/2014 |
| CN | 203873601 | U | 10/2014 |
| CN | 203873602 | U | 10/2014 |
| CN | 203885286 | U | 10/2014 |
| CN | 203885342 | U | 10/2014 |
| CN | 104138200 | A | 11/2014 |
| CN | 203914511 | U | 11/2014 |
| CN | 203953373 | U | 11/2014 |
| CN | 203970073 | U | 12/2014 |
| CN | 203970160 | U | 12/2014 |
| CN | 203987492 | U | 12/2014 |
| CN | 203987520 | U | 12/2014 |
| CN | 203987550 | U | 12/2014 |
| CN | 203987551 | U | 12/2014 |
| CN | 204015964 | U | 12/2014 |
| CN | 204016055 | U | 12/2014 |
| CN | 204016056 | U | 12/2014 |
| CN | 204049362 | U | 12/2014 |
| CN | 204071670 | U | 1/2015 |
| CN | 204091762 | U | 1/2015 |
| CN | 204091768 | U | 1/2015 |
| CN | 104323708 | A | 2/2015 |
| CN | 104337407 | A | 2/2015 |
| CN | 104367182 | A | 2/2015 |
| CN | 204133165 | U | 2/2015 |
| CN | 204133291 | U | 2/2015 |
| CN | 204158183 | U | 2/2015 |
| CN | 104433841 | A | 3/2015 |
| CN | 204192406 | U | 3/2015 |
| CN | 104490294 | A | 4/2015 |
| CN | 102917623 | B | 5/2015 |
| CN | 104586233 | A | 5/2015 |
| CN | 104613515 | A | 5/2015 |
| CN | 104622274 | A | 5/2015 |
| CN | 104676681 | A | 6/2015 |
| CN | 104688019 | A | 6/2015 |
| CN | 104706212 | A | 6/2015 |
| CN | 103284618 | B | 7/2015 |
| CN | 104754992 | A | 7/2015 |
| CN | 104757872 | A | 7/2015 |
| CN | 204427799 | | 7/2015 |
| CN | 204427801 | U | 7/2015 |
| CN | 204467861 | U | 7/2015 |
| CN | 204500391 | U | 7/2015 |
| CN | 104814665 | A | 8/2015 |
| CN | 104856561 | A | 8/2015 |
| CN | 104856563 | A | 8/2015 |
| CN | 204520386 | U | 8/2015 |
| CN | 204580991 | U | 8/2015 |
| CN | 104873098 | A | 9/2015 |
| CN | 104887063 | A | 9/2015 |
| CN | 204636063 | U | 9/2015 |
| CN | 104983318 | A | 10/2015 |
| CN | 104997394 | A | 10/2015 |
| CN | 204697804 | U | 10/2015 |
| CN | 105011741 | A | 11/2015 |
| CN | 105030035 | A | 11/2015 |
| CN | 105054772 | B | 11/2015 |
| CN | 105054773 | B | 11/2015 |
| CN | 204734374 | U | 11/2015 |
| CN | 204743846 | U | 11/2015 |
| CN | 204765165 | U | 11/2015 |
| CN | 204765167 | U | 11/2015 |
| CN | 204765168 | U | 11/2015 |
| CN | 204765197 | U | 11/2015 |
| CN | 204797615 | U | 11/2015 |
| CN | 204797616 | U | 11/2015 |
| CN | 103813738 | B | 12/2015 |
| CN | 105105624 | A | 12/2015 |
| CN | 105105626 | A | 12/2015 |
| CN | 105167591 | B | 12/2015 |
| CN | 105167592 | A | 12/2015 |
| CN | 105193301 | A | 12/2015 |
| CN | 204813499 | U | 12/2015 |
| CN | 204839219 | U | 12/2015 |
| CN | 204889693 | U | 12/2015 |
| CN | 105212693 | B | 1/2016 |
| CN | 105212730 | A | 1/2016 |
| CN | 105231802 | A | 1/2016 |
| CN | 105231811 | A | 1/2016 |
| CN | 105231812 | A | 1/2016 |
| CN | 105231813 | A | 1/2016 |
| CN | 105266565 | A | 1/2016 |
| CN | 105266577 | A | 1/2016 |
| CN | 204995259 | U | 1/2016 |
| CN | 105286491 | A | 2/2016 |
| CN | 105286496 | A | 2/2016 |
| CN | 105286498 | A | 2/2016 |
| CN | 105286627 | A | 2/2016 |
| CN | 105326332 | A | 2/2016 |
| CN | 105342454 | A | 2/2016 |
| CN | 205018872 | U | 2/2016 |
| CN | 205018878 | U | 2/2016 |
| CN | 105380512 | A | 3/2016 |
| CN | 105380513 | A | 3/2016 |
| CN | 105380514 | A | 3/2016 |
| CN | 105411378 | A | 3/2016 |
| CN | 105411379 | A | 3/2016 |
| CN | 105433778 | A | 3/2016 |
| CN | 105433779 | A | 3/2016 |
| CN | 105451610 | A | 3/2016 |
| CN | 205053851 | U | 3/2016 |

(56) References Cited

FOREIGN PATENT DOCUMENTS

| | | |
|---|---|---|
| CN | 105455628 A | 4/2016 |
| CN | 105455664 A | 4/2016 |
| CN | 105455671 A | 4/2016 |
| CN | 105476461 A | 4/2016 |
| CN | 105476464 A | 4/2016 |
| CN | 105476472 A | 4/2016 |
| CN | 105476491 A | 4/2016 |
| CN | 105496184 A | 4/2016 |
| CN | 105496185 A | 4/2016 |
| CN | 105496224 A | 4/2016 |
| CN | 205126014 U | 4/2016 |
| CN | 105534269 A | 5/2016 |
| CN | 105559571 A | 5/2016 |
| CN | 105595792 A | 5/2016 |
| CN | 105595802 A | 5/2016 |
| CN | 105595803 A | 5/2016 |
| CN | 205197727 U | 5/2016 |
| CN | 205214967 U | 5/2016 |
| CN | 205215045 U | 5/2016 |
| CN | 102440681 B | 6/2016 |
| CN | 102783908 B | 6/2016 |
| CN | 103648337 B | 6/2016 |
| CN | 105615638 A | 6/2016 |
| CN | 105615639 A | 6/2016 |
| CN | 105615686 A | 6/2016 |
| CN | 105640299 A | 6/2016 |
| CN | 105640302 A | 6/2016 |
| CN | 105640309 A | 6/2016 |
| CN | 105640351 A | 6/2016 |
| CN | 105662112 A | 6/2016 |
| CN | 105662125 A | 6/2016 |
| CN | 105662126 A | 6/2016 |
| CN | 105662127 A | 6/2016 |
| CN | 105708312 A | 6/2016 |
| CN | 205286098 U | 6/2016 |
| CN | 205322075 U | 6/2016 |
| CN | 104605727 B | 7/2016 |
| CN | 105725730 A | 7/2016 |
| CN | 105725829 A | 7/2016 |
| CN | 105768844 A | 7/2016 |
| CN | 105768859 A | 7/2016 |
| CN | 105768860 A | 7/2016 |
| CN | 103908166 B | 8/2016 |
| CN | 105816023 A | 8/2016 |
| CN | 105882176 A | 8/2016 |
| CN | 105852667 A | 8/2016 |
| CN | 105852668 A | 8/2016 |
| CN | 105902144 A | 8/2016 |
| CN | 105902144 A | 8/2016 |
| CN | 105902150 A | 8/2016 |
| CN | 205410811 U | 8/2016 |
| CN | 205425108 U | 8/2016 |
| CN | 205433281 U | 8/2016 |
| CN | 205433317 U | 8/2016 |
| CN | 205433320 U | 8/2016 |
| CN | 205493513 U | 8/2016 |
| CN | 205493586 U | 8/2016 |
| CN | 205493593 U | 8/2016 |
| CN | 105919411 A | 9/2016 |
| CN | 105919417 A | 9/2016 |
| CN | 105935244 A | 9/2016 |
| CN | 105935258 A | 9/2016 |
| CN | 105972653 A | 9/2016 |
| CN | 205568641 U | 9/2016 |
| CN | 205568772 U | 9/2016 |
| CN | 205597052 U | 9/2016 |
| CN | 105982529 A | 10/2016 |
| CN | 105982532 A | 10/2016 |
| CN | 105996737 A | 10/2016 |
| CN | 105996748 A | 10/2016 |
| CN | 105996752 A | 10/2016 |
| CN | 105996753 A | 10/2016 |
| CN | 105996809 A | 10/2016 |
| CN | 106037448 A | 10/2016 |
| CN | 106037457 A | 10/2016 |
| CN | 106037458 A | 10/2016 |
| CN | 106073481 A | 11/2016 |
| CN | 106073517 A | 11/2016 |
| CN | 106073519 A | 11/2016 |
| CN | 106108627 A | 11/2016 |
| CN | 106108630 A | 11/2016 |
| CN | 106108631 A | 11/2016 |
| CN | 106108697 B | 11/2016 |
| CN | 106132256 A | 11/2016 |
| CN | 106166030 A | 11/2016 |
| CN | 205671926 U | 11/2016 |
| CN | 205671927 U | 11/2016 |
| CN | 106175412 A | 12/2016 |
| CN | 106175476 A | 12/2016 |
| CN | 106175477 A | 12/2016 |
| CN | 106213979 A | 12/2016 |
| CN | 106235878 A | 12/2016 |
| CN | 106235892 A | 12/2016 |
| CN | 106235893 A | 12/2016 |
| CN | 205831638 U | 12/2016 |
| CN | 205831665 U | 12/2016 |
| CN | 106264085 A | 1/2017 |
| CN | 106264095 A | 1/2017 |
| CN | 106292340 | 1/2017 |
| CN | 106343895 A | 1/2017 |
| CN | 205849309 U | 1/2017 |
| CN | 205860134 U | 1/2017 |
| CN | 106377158 A | 2/2017 |
| CN | 106377159 A | 2/2017 |
| CN | 106377165 A | 2/2017 |
| CN | 106388565 A | 2/2017 |
| CN | 106388572 A | 2/2017 |
| CN | 106419486 A | 2/2017 |
| CN | 106419521 A | 2/2017 |
| CN | 106419524 A | 2/2017 |
| CN | 106419618 B | 2/2017 |
| CN | 106419620 A | 2/2017 |
| CN | 205923705 U | 2/2017 |
| CN | 205923803 U | 2/2017 |
| CN | 102805554 B | 3/2017 |
| CN | 106473623 A | 3/2017 |
| CN | 106490967 A | 3/2017 |
| CN | 106510449 A | 3/2017 |
| CN | 206007050 U | 3/2017 |
| CN | 206026097 U | 3/2017 |
| CN | 206026100 U | 3/2017 |
| CN | 206044349 U | 3/2017 |
| CN | 206044409 U | 3/2017 |
| CN | 106551617 A | 4/2017 |
| CN | 106562680 A | 4/2017 |
| CN | 106575469 A | 4/2017 |
| CN | 106580074 A | 4/2017 |
| CN | 206062888 U | 4/2017 |
| CN | 206062947 U | 4/2017 |
| CN | 206102391 U | 4/2017 |
| CN | 206119969 U | 4/2017 |
| CN | 206119969 U | 4/2017 |
| CN | 206119971 U | 4/2017 |
| CN | 106618154 A | 5/2017 |
| CN | 106618156 A | 5/2017 |
| CN | 106667244 A | 5/2017 |
| CN | 106691171 A | 5/2017 |
| CN | 206166699 U | 5/2017 |
| CN | 206166710 U | 5/2017 |
| CN | 206166711 U | 5/2017 |
| CN | 206166726 U | 5/2017 |
| CN | 206183062 U | 5/2017 |
| CN | 106802584 A | 6/2017 |
| CN | 106805744 A | 6/2017 |
| CN | 106805746 A | 6/2017 |
| CN | 106805747 A | 6/2017 |
| CN | 106805749 A | 6/2017 |
| CN | 106805750 A | 6/2017 |
| CN | 106805752 A | 6/2017 |
| CN | 106820951 A | 6/2017 |
| CN | 106820954 A | 6/2017 |
| CN | 106821017 A | 6/2017 |
| CN | 106852641 A | 6/2017 |
| CN | 106859298 A | 6/2017 |

(56) References Cited

FOREIGN PATENT DOCUMENTS

| | | | |
|---|---|---|---|
| CN | 106889875 | | 6/2017 |
| CN | 106889876 | A | 6/2017 |
| CN | 106901591 | A | 6/2017 |
| CN | 106901592 | A | 6/2017 |
| CN | 206239100 | | 6/2017 |
| CN | 206252365 | U | 6/2017 |
| CN | 206261486 | U | 6/2017 |
| CN | 206261487 | U | 6/2017 |
| CN | 206284788 | U | 6/2017 |
| CN | 206284794 | U | 6/2017 |
| CN | 106913201 | A | 7/2017 |
| CN | 106923655 | A | 7/2017 |
| CN | 106937820 | A | 7/2017 |
| CN | 106943000 | A | 7/2017 |
| CN | 106943002 | A | 7/2017 |
| CN | 106955017 | A | 7/2017 |
| CN | 106974548 | A | 7/2017 |
| CN | 106983360 | A | 7/2017 |
| CN | 206303774 | U | 7/2017 |
| CN | 206324671 | U | 7/2017 |
| CN | 106993928 | A | 8/2017 |
| CN | 106998961 | A | 8/2017 |
| CN | 107019418 | A | 8/2017 |
| CN | 107019419 | A | 8/2017 |
| CN | 107019420 | A | 8/2017 |
| CN | 107019423 | A | 8/2017 |
| CN | 107048976 | A | 8/2017 |
| CN | 107048991 | A | 8/2017 |
| CN | 107048993 | A | 8/2017 |
| CN | 107049054 | A | 8/2017 |
| CN | 107049058 | A | 8/2017 |
| CN | 107065634 | B | 8/2017 |
| CN | 107105914 | A | 8/2017 |
| CN | 206371913 | U | 8/2017 |
| CN | 206371926 | U | 8/2017 |
| CN | 206371930 | U | 8/2017 |
| CN | 206371931 | U | 8/2017 |
| CN | 206381064 | U | 8/2017 |
| CN | 206414178 | U | 8/2017 |
| CN | 104334066 | B | 9/2017 |
| CN | 107136910 | A | 9/2017 |
| CN | 107136911 | A | 9/2017 |
| CN | 107149395 | A | 9/2017 |
| CN | 107149398 | A | 9/2017 |
| CN | 206453694 | U | 9/2017 |
| CN | 206469994 | U | 9/2017 |
| CN | 206518479 | U | 9/2017 |
| CN | 105142473 | B | 10/2017 |
| CN | 107224188 | A | 10/2017 |
| CN | 107224197 | A | 10/2017 |
| CN | 107232962 | A | 10/2017 |
| CN | 107259978 | A | 10/2017 |
| CN | 107290094 | A | 10/2017 |
| CN | 107296485 | A | 10/2017 |
| CN | 107296486 | A | 10/2017 |
| CN | 107296487 | A | 10/2017 |
| CN | 107296488 | A | 10/2017 |
| CN | 107296489 | A | 10/2017 |
| CN | 107296490 | A | 10/2017 |
| CN | 107296493 | A | 10/2017 |
| CN | 107296494 | A | 10/2017 |
| CN | 206560353 | U | 10/2017 |
| CN | 206560354 | U | 10/2017 |
| CN | 206560359 | U | 10/2017 |
| CN | 206560361 | U | 10/2017 |
| CN | 104643954 | B | 11/2017 |
| CN | 107307729 | A | 11/2017 |
| CN | 107307730 | A | 11/2017 |
| CN | 107361637 | A | 11/2017 |
| CN | 107397431 | A | 11/2017 |
| CN | 206603656 | U | 11/2017 |
| CN | 107411540 | A | 12/2017 |
| CN | 107411542 | A | 12/2017 |
| CN | 107432668 | A | 12/2017 |
| CN | 107440490 | A | 12/2017 |
| CN | 107468052 | A | 12/2017 |
| CN | 107495849 | A | 12/2017 |
| CN | 107495856 | A | 12/2017 |
| CN | 107510356 | A | 12/2017 |
| CN | 107510379 | A | 12/2017 |
| CN | 206687606 | U | 12/2017 |
| CN | 206687631 | U | 12/2017 |
| CN | 206700038 | U | 12/2017 |
| CN | 206777230 | U | 12/2017 |
| CN | 206807803 | U | 12/2017 |
| CN | 206807804 | U | 12/2017 |
| CN | 106213986 | B | 1/2018 |
| CN | 107550258 | A | 1/2018 |
| CN | 107616686 | A | 1/2018 |
| CN | 206867128 | U | 1/2018 |
| CN | 107647763 | A | 2/2018 |
| CN | 107647769 | A | 2/2018 |
| CN | 107647771 | A | 2/2018 |
| CN | 107647772 | A | 2/2018 |
| CN | 107647773 | A | 2/2018 |
| CN | 107647777 | A | 2/2018 |
| CN | 107660996 | A | 2/2018 |
| CN | 107660997 | A | 2/2018 |
| CN | 107684336 | A | 2/2018 |
| CN | 107684337 | A | 2/2018 |
| CN | 107684338 | A | 2/2018 |
| CN | 107684339 | A | 2/2018 |
| CN | 107684340 | A | 2/2018 |
| CN | 107684341 | A | 2/2018 |
| CN | 107684342 | A | 2/2018 |
| CN | 107692806 | A | 2/2018 |
| CN | 107702838 | A | 2/2018 |
| CN | 107713732 | A | 2/2018 |
| CN | 107713733 | A | 2/2018 |
| CN | 107713734 | A | 2/2018 |
| CN | 107713774 | A | 2/2018 |
| CN | 107726388 | A | 2/2018 |
| CN | 106419522 | B | 3/2018 |
| CN | 107752726 | A | 3/2018 |
| CN | 107752748 | A | 3/2018 |
| CN | 107752751 | A | 3/2018 |
| CN | 107752788 | A | 3/2018 |
| CN | 107773021 | A | 3/2018 |
| CN | 107773026 | A | 3/2018 |
| CN | 107773029 | A | 3/2018 |
| CN | 107773090 | A | 3/2018 |
| CN | 107788820 | A | 3/2018 |
| CN | 107788827 | A | 3/2018 |
| CN | 107811499 | A | 3/2018 |
| CN | 107811517 | A | 3/2018 |
| CN | 107811518 | A | 3/2018 |
| CN | 107822492 | A | 3/2018 |
| CN | 107822494 | A | 3/2018 |
| CN | 107822496 | A | 3/2018 |
| CN | 107836981 | A | 3/2018 |
| CN | 107836986 | A | 3/2018 |
| CN | 107836988 | A | 3/2018 |
| CN | 207084680 | U | 3/2018 |
| CN | 207101150 | U | 3/2018 |
| CN | 107874584 | A | 4/2018 |
| CN | 107874599 | A | 4/2018 |
| CN | 107874601 | A | 4/2018 |
| CN | 107874602 | A | 4/2018 |
| CN | 107898351 | A | 4/2018 |
| CN | 107928388 | A | 4/2018 |
| CN | 107928395 | A | 4/2018 |
| CN | 107951369 | A | 4/2018 |
| CN | 107951376 | A | 4/2018 |
| CN | 107951407 | A | 4/2018 |
| CN | 207202762 | U | 4/2018 |
| CN | 207253261 | U | 4/2018 |
| CN | 107969907 | A | 5/2018 |
| CN | 107969908 | A | 5/2018 |
| CN | 107981713 | A | 5/2018 |
| CN | 107997571 | A | 5/2018 |
| CN | 108013742 | A | 5/2018 |
| CN | 108013743 | A | 5/2018 |
| CN | 108030404 | A | 5/2018 |
| CN | 108041976 | A | 5/2018 |

(56) References Cited

FOREIGN PATENT DOCUMENTS

| | | | |
|---|---|---|---|
| CN | 108056670 A | 5/2018 |
| CN | 207355971 U | 5/2018 |
| CN | 108095570 A | 6/2018 |
| CN | 108113501 A | 6/2018 |
| CN | 108143256 A | 6/2018 |
| CN | 108143259 A | 6/2018 |
| CN | 108143260 A | 6/2018 |
| CN | 108143261 A | 6/2018 |
| CN | 108143262 A | 6/2018 |
| CN | 108143263 A | 6/2018 |
| CN | 108143264 A | 6/2018 |
| CN | 108158429 A | 6/2018 |
| CN | 108201338 A | 6/2018 |
| CN | 108209547 A | 6/2018 |
| CN | 207429001 U | 6/2018 |
| CN | 207492655 U | 6/2018 |
| CN | 207506440 U | 6/2018 |
| CN | 104207651 B | 7/2018 |
| CN | 106175423 A | 7/2018 |
| CN | 108244994 A | 7/2018 |
| CN | 108244995 A | 7/2018 |
| CN | 108244997 A | 7/2018 |
| CN | 108244998 A | 7/2018 |
| CN | 108244999 A | 7/2018 |
| CN | 108245000 A | 7/2018 |
| CN | 108261055 A | 7/2018 |
| CN | 108261056 A | 7/2018 |
| CN | 108261061 A | 7/2018 |
| CN | 108272336 A | 7/2018 |
| CN | 108272338 A | 7/2018 |
| CN | 108294616 A | 7/2018 |
| CN | 108309035 A | 7/2018 |
| CN | 108324096 A | 7/2018 |
| CN | 207575048 U | 7/2018 |
| CN | 207604862 U | 7/2018 |
| CN | 207627123 U | 7/2018 |
| CN | 207627136 U | 7/2018 |
| CN | 207640235 U | 7/2018 |
| CN | 106388570 B | 8/2018 |
| CN | 106419517 B | 8/2018 |
| CN | 108354444 A | 8/2018 |
| CN | 108354466 A | 8/2018 |
| CN | 108378678 A | 8/2018 |
| CN | 108378690 A | 8/2018 |
| CN | 108402888 A | 8/2018 |
| CN | 108402889 A | 8/2018 |
| CN | 108402920 A | 8/2018 |
| CN | 108420304 A | 8/2018 |
| CN | 108433517 A | 8/2018 |
| CN | 108433529 A | 8/2018 |
| CN | 108451351 A | 8/2018 |
| CN | 108451388 A | 8/2018 |
| CN | 108464732 A | 8/2018 |
| CN | 207754989 U | 8/2018 |
| CN | 207755036 U | 8/2018 |
| CN | 106539491 B | 9/2018 |
| CN | 107019415 B | 9/2018 |
| CN | 107019416 B | 9/2018 |
| CN | 108477987 A | 9/2018 |
| CN | 108497908 A | 9/2018 |
| CN | 108497914 A | 9/2018 |
| CN | 108497918 A | 9/2018 |
| CN | 108497942 A | 9/2018 |
| CN | 108523647 A | 9/2018 |
| CN | 108523649 A | 9/2018 |
| CN | 108552969 A | 9/2018 |
| CN | 108552989 A | 9/2018 |
| CN | 108567309 A | 9/2018 |
| CN | 108567321 A | 9/2018 |
| CN | 108567322 A | 9/2018 |
| CN | 108577514 A | 9/2018 |
| CN | 207804077 U | 9/2018 |
| CN | 207804095 U | 9/2018 |
| CN | 207855533 U | 9/2018 |
| CN | 207855579 U | 9/2018 |
| CN | 106264094 B | 10/2018 |
| CN | 108606627 A | 10/2018 |
| CN | 108618592 A | 10/2018 |
| CN | 108618593 A | 10/2018 |
| CN | 108618594 A | 10/2018 |
| CN | 108618595 A | 10/2018 |
| CN | 108618597 A | 10/2018 |
| CN | 108618651 A | 10/2018 |
| CN | 108634771 A | 10/2018 |
| CN | 108634777 A | 10/2018 |
| CN | 108634807 A | 10/2018 |
| CN | 108652431 A | 10/2018 |
| CN | 108652432 A | 10/2018 |
| CN | 108670021 A | 10/2018 |
| CN | 108670023 A | 10/2018 |
| CN | 108703644 A | 10/2018 |
| CN | 108703645 A | 10/2018 |
| CN | 108703675 A | 10/2018 |
| CN | 207940738 U | 10/2018 |
| CN | 207940739 U | 10/2018 |
| CN | 106580073 B | 11/2018 |
| CN | 108720548 A | 11/2018 |
| CN | 108720577 A | 11/2018 |
| CN | 108720581 A | 11/2018 |
| CN | 108720584 A | 11/2018 |
| CN | 108720585 A | 11/2018 |
| CN | 108720586 A | 11/2018 |
| CN | 108720633 A | 11/2018 |
| CN | 108732958 A | 11/2018 |
| CN | 108771466 A | 11/2018 |
| CN | 108784323 A | 11/2018 |
| CN | 108784324 A | 11/2018 |
| CN | 108784330 A | 11/2018 |
| CN | 108784401 A | 11/2018 |
| CN | 108814274 A | 11/2018 |
| CN | 108836104 A | 11/2018 |
| CN | 108836105 A | 11/2018 |
| CN | 108836107 A | 11/2018 |
| CN | 108836108 A | 11/2018 |
| CN | 108836131 A | 11/2018 |
| CN | 108851966 A | 11/2018 |
| CN | 108851969 A | 11/2018 |
| CN | 108888087 A | 11/2018 |
| CN | 108888099 A | 11/2018 |
| CN | 108903620 A | 11/2018 |
| CN | 108903621 A | 11/2018 |
| CN | 106419520 B | 12/2018 |
| CN | 106419526 B | 12/2018 |
| CN | 108926239 A | 12/2018 |
| CN | 108926249 A | 12/2018 |
| CN | 108937520 A | 12/2018 |
| CN | 108937525 A | 12/2018 |
| CN | 108937556 A | 12/2018 |
| CN | 108937558 A | 12/2018 |
| CN | 108937559 A | 12/2018 |
| CN | 108937560 A | 12/2018 |
| CN | 108955959 A | 12/2018 |
| CN | 108968659 A | 12/2018 |
| CN | 108968660 A | 12/2018 |
| CN | 108968662 A | 12/2018 |
| CN | 108968663 A | 12/2018 |
| CN | 108968667 A | 12/2018 |
| CN | 108968668 A | 12/2018 |
| CN | 108968669 A | 12/2018 |
| CN | 108991918 A | 12/2018 |
| CN | 108991919 A | 12/2018 |
| CN | 109008595 A | 12/2018 |
| CN | 109008597 A | 12/2018 |
| CN | 109008598 A | 12/2018 |
| CN | 208211922 U | 12/2018 |
| CN | 208259529 U | 12/2018 |
| CN | 106562666 B | 1/2019 |
| CN | 106606293 B | 1/2019 |
| CN | 106724784 B | 1/2019 |
| CN | 106820956 B | 1/2019 |
| CN | 106820957 B | 1/2019 |
| CN | 107019417 B | 1/2019 |
| CN | 109247837 A | 1/2019 |
| CN | 208300842 U | 1/2019 |

(56) References Cited

FOREIGN PATENT DOCUMENTS

| | | |
|---|---|---|
| CN | 106388566 B | 3/2019 |
| CN | 107174116 B | 3/2019 |
| CN | 107174117 B | 3/2019 |
| CN | 109393957 A | 3/2019 |
| CN | 208808155 U | 5/2019 |
| CN | 105640308 A | 6/2019 |
| CN | 105996805 B | 6/2019 |
| CN | 109996475 A | 7/2019 |
| CN | 209136189 U | 7/2019 |
| CN | 209136190 U | 7/2019 |
| CN | 209252407 U | 7/2019 |
| CN | 110213984 A | 9/2019 |
| CN | 209518760 U | 10/2019 |
| CN | 110430793 A | 11/2019 |
| CN | 110475493 A | 11/2019 |
| CN | 110520022 A | 11/2019 |
| CN | 209863450 U | 12/2019 |
| CN | 110868894 A | 3/2020 |
| DE | 2705168 A1 | 8/1978 |
| DE | 2753827 A1 | 6/1979 |
| DE | 20207570 U1 | 8/2002 |
| DE | 102011002821 A1 | 7/2012 |
| DE | 202017102536 U1 | 8/2018 |
| EP | 1767860 A1 | 3/2007 |
| EP | 1780471 A2 | 5/2007 |
| EP | 2003400 A2 | 12/2008 |
| EP | 2020574 A2 | 2/2009 |
| EP | 2910856 A1 | 8/2015 |
| EP | 2976977 A1 | 1/2016 |
| EP | 3165134 A1 | 5/2017 |
| EP | 2904953 B1 | 12/2018 |
| EP | 3491980 A1 | 6/2019 |
| FR | 2409736 A1 | 6/1979 |
| GB | 2398628 A | 8/2004 |
| GB | 2479384 A | 10/2011 |
| JP | S5827524 A | 2/1983 |
| JP | H09164074 A | 6/1997 |
| JP | 10028643 A | 2/1998 |
| JP | 2005147604 A | 6/2005 |
| JP | 2007007027 A | 1/2007 |
| JP | 2008018122 A | 1/2008 |
| JP | 2009291417 | 12/2009 |
| JP | 2011010786 A | 1/2011 |
| JP | 2013106850 A | 6/2013 |
| JP | 2014200627 A | 10/2014 |
| JP | 2014204770 A | 10/2014 |
| JP | 2015145778 A | 8/2015 |
| WO | 8911773 A1 | 11/1989 |
| WO | 9837796 A1 | 9/1998 |
| WO | 9930086 | 6/1999 |
| WO | 9952328 A1 | 10/1999 |
| WO | 0044096 | 7/2000 |
| WO | 0049839 A1 | 8/2000 |
| WO | 2006122643 A1 | 11/2006 |
| WO | 2006132612 A1 | 12/2006 |
| WO | 2009043812 A1 | 4/2009 |
| WO | 2012007681 A2 | 1/2012 |
| WO | 2012051508 A2 | 4/2012 |
| WO | 2014132105 A1 | 9/2014 |
| WO | 2015006891 A1 | 1/2015 |
| WO | 2015028940 A1 | 3/2015 |
| WO | 2015081549 A1 | 6/2015 |
| WO | 2016007002 A1 | 1/2016 |
| WO | 2016012908 A1 | 1/2016 |
| WO | 2016028549 A1 | 2/2016 |
| WO | 2016091063 A1 | 6/2016 |
| WO | 2016141009 A1 | 9/2016 |
| WO | 2016148492 A1 | 9/2016 |
| WO | 2016154114 A1 | 9/2016 |
| WO | 2016165198 A1 | 10/2016 |
| WO | 2016171385 A1 | 10/2016 |
| WO | 2016182975 A1 | 11/2016 |
| WO | 2016189440 | 12/2016 |
| WO | 2016193008 A1 | 12/2016 |
| WO | 2016193643 A1 | 12/2016 |
| WO | 2017005533 A1 | 1/2017 |
| WO | 2017039091 A1 | 3/2017 |
| WO | 2017045387 A1 | 3/2017 |
| WO | 2017049635 A1 | 3/2017 |
| WO | 2017049717 A1 | 3/2017 |
| WO | 2017050693 A2 | 3/2017 |
| WO | 2017063872 A1 | 4/2017 |
| WO | 2017072068 A1 | 5/2017 |
| WO | 2017074119 A1 | 5/2017 |
| WO | 2017076797 A1 | 5/2017 |
| WO | 2017081420 A1 | 5/2017 |
| WO | 2017085026 A1 | 5/2017 |
| WO | 2017085671 A1 | 5/2017 |
| WO | 2017085673 A1 | 5/2017 |
| WO | 2017086543 A1 | 5/2017 |
| WO | 2017092062 A1 | 6/2017 |
| WO | 2017092063 A1 | 6/2017 |
| WO | 2017094968 A1 | 6/2017 |
| WO | 2017097790 A1 | 6/2017 |
| WO | 2017104892 A1 | 6/2017 |
| WO | 2017104894 A1 | 6/2017 |
| WO | 2017104895 A1 | 6/2017 |
| WO | 2017104896 A1 | 6/2017 |
| WO | 2017104898 A1 | 6/2017 |
| WO | 2017104900 A1 | 6/2017 |
| WO | 2017105076 A2 | 6/2017 |
| WO | 2017111425 A1 | 6/2017 |
| WO | 2017121691 A1 | 7/2017 |
| WO | 2017127655 A1 | 7/2017 |
| WO | 2017144795 A1 | 8/2017 |
| WO | 2017149519 A1 | 9/2017 |
| WO | 2017152518 A1 | 9/2017 |
| WO | 2017153360 A1 | 9/2017 |
| WO | 2017158068 A1 | 9/2017 |
| WO | 2017166317 A1 | 10/2017 |
| WO | 2017177007 A1 | 10/2017 |
| WO | 2017177423 A1 | 10/2017 |
| WO | 2017178229 A1 | 10/2017 |
| WO | 2017178650 A1 | 10/2017 |
| WO | 2017178739 A1 | 10/2017 |
| WO | 2017179804 A1 | 10/2017 |
| WO | 2017191377 A1 | 11/2017 |
| WO | 2017191395 A1 | 11/2017 |
| WO | 2017195777 A1 | 11/2017 |
| WO | 2017197482 A1 | 11/2017 |
| WO | 2017198815 A1 | 11/2017 |
| WO | 2017198848 A1 | 11/2017 |
| WO | 2017201530 A1 | 11/2017 |
| WO | 2017202641 A1 | 11/2017 |
| WO | 2017209465 A1 | 12/2017 |
| WO | 2017211045 A1 | 12/2017 |
| WO | 2017213330 A2 | 12/2017 |
| WO | 2017213423 A1 | 12/2017 |
| WO | 2017215926 A1 | 12/2017 |
| WO | 2017215988 A1 | 12/2017 |
| WO | 2018004226 A1 | 1/2018 |
| WO | 2018007218 A1 | 1/2018 |
| WO | 2018014806 A1 | 1/2018 |
| WO | 2018015695 A1 | 1/2018 |
| WO | 2017077571 A1 | 2/2018 |
| WO | 2018018670 A1 | 2/2018 |
| WO | 2018023863 A1 | 2/2018 |
| WO | 2018024781 A1 | 2/2018 |
| WO | 2018024782 A1 | 2/2018 |
| WO | 2018024783 A1 | 2/2018 |
| WO | 2018026041 A1 | 2/2018 |
| WO | 2018026906 A1 | 2/2018 |
| WO | 2018026928 A1 | 2/2018 |
| WO | 2018032540 A1 | 2/2018 |
| WO | 2018032541 A1 | 2/2018 |
| WO | 2018032542 A1 | 2/2018 |
| WO | 2018032589 A1 | 2/2018 |
| WO | 2018032648 A1 | 2/2018 |
| WO | 2018037177 A1 | 3/2018 |
| WO | 2018040250 A1 | 3/2018 |
| WO | 2018041536 A1 | 3/2018 |
| WO | 2018045643 A1 | 3/2018 |
| WO | 2018050520 A1 | 3/2018 |
| WO | 2018050838 A1 | 3/2018 |

(56) References Cited

FOREIGN PATENT DOCUMENTS

| | | |
|---|---|---|
| WO | 2018058384 A1 | 4/2018 |
| WO | 2018058569 A1 | 4/2018 |
| WO | 2018058740 A1 | 4/2018 |
| WO | 2018059994 A1 | 4/2018 |
| WO | 2018060260 A1 | 4/2018 |
| WO | 2018060273 A1 | 4/2018 |
| WO | 2018060331 A1 | 4/2018 |
| WO | 2018065424 A1 | 4/2018 |
| WO | 2018068376 A1 | 4/2018 |
| WO | 2018068425 A1 | 4/2018 |
| WO | 2018068976 A1 | 4/2018 |
| WO | 2018076164 A1 | 5/2018 |
| WO | 2018076166 A1 | 5/2018 |
| WO | 2018076415 A1 | 5/2018 |
| WO | 2018082131 A1 | 5/2018 |
| WO | 2018090287 A1 | 5/2018 |
| WO | 2018093004 A1 | 5/2018 |
| WO | 2018095247 A1 | 5/2018 |
| WO | 2018095420 A1 | 5/2018 |
| WO | 2018095949 A1 | 5/2018 |
| WO | 2018120561 A1 | 5/2018 |
| WO | 2017104893 A1 | 6/2018 |
| WO | 2018099233 A1 | 6/2018 |
| WO | 2018102128 A1 | 6/2018 |
| WO | 2018104351 A1 | 6/2018 |
| WO | 2018107522 A1 | 6/2018 |
| WO | 2018107973 A1 | 6/2018 |
| WO | 2018116056 A1 | 6/2018 |
| WO | 2018116057 A1 | 6/2018 |
| WO | 2018121166 A1 | 7/2018 |
| WO | 2018121199 A1 | 7/2018 |
| WO | 2018133993 A1 | 7/2018 |
| WO | 2018137832 A1 | 8/2018 |
| WO | 2018138078 A1 | 8/2018 |
| WO | 2018140954 A1 | 8/2018 |
| WO | 2018142088 A1 | 8/2018 |
| WO | 2018147640 A1 | 8/2018 |
| WO | 2018157409 A1 | 9/2018 |
| WO | 2018161497 A1 | 9/2018 |
| WO | 2018165698 A1 | 9/2018 |
| WO | 2018171250 A1 | 9/2018 |
| WO | 2018189921 A1 | 10/2018 |
| WO | 2018191960 A1 | 10/2018 |
| WO | 2018197720 A1 | 11/2018 |
| WO | 2018207221 A1 | 11/2018 |
| WO | 2018212473 A1 | 11/2018 |
| WO | 2018216042 A1 | 11/2018 |
| WO | 2018220659 A1 | 12/2018 |
| WO | 2018223713 A1 | 12/2018 |
| WO | 2018227851 A1 | 12/2018 |
| WO | 2018227852 A1 | 12/2018 |
| WO | 2018227866 A1 | 12/2018 |
| WO | 2018227938 A1 | 12/2018 |
| WO | 2018233210 A1 | 12/2018 |
| WO | 2018235095 A1 | 12/2018 |
| WO | 2019015425 A1 | 1/2019 |
| WO | 2019026018 A1 | 2/2019 |
| WO | 2019032876 A1 | 2/2019 |
| WO | 2019032878 A1 | 2/2019 |
| WO | 2019066747 A1 | 4/2019 |

OTHER PUBLICATIONS

U.S. Appl. No. 16/548,562, filed Aug. 22, 2019; Non-Final Office Action dated Oct. 25, 2019; 1-20 pages.
U.S. Appl. No. 16/357,238, filed Mar. 18, 2019; Final Office Action dated Oct. 8, 2019; 1-13 pages.
U.S. Appl. No. 16/357,243, filed Mar. 18, 2019; Notice of Allowance dated Oct. 15, 2019; pp. 1-9.
U.S. Appl. No. 16/357,250, filed Mar. 18, 2019; Non-Final Office Action dated Apr. 17, 2020; 1-12 pages.
Canadian Application No. 3065805 filed Dec. 31, 2019; Office Action dated Mar. 12, 2020; 6 pages.
Chinese Application No. 2019105629830 filed Jun. 26, 2019; Office Action with English Translation dated Jun. 29, 2020; 18 pages.
European Application No. 19218088.3-1004 filed Dec. 19, 2019; European Search Report dated Jun. 3, 2020; 7 pages.
European Application No. 19218129.5-1004 filed Dec. 19, 2019; European Search Report dated May 19, 2020; 7 pages.
European Application No. 19218218.6-1004 filed Dec. 19, 2019; European Search Report dated May 27, 2020; 6 pages.
European Application No. 19218240.0-1004 filed Dec. 19, 2019; European Search Report dated May 27, 2020; 7 pages.
European Application No. 19218251.7-1004 filed Dec. 19, 2019; European Search Report dated May 27, 2020; 7 pages.
European Application No. 19218259.0-1004 filed Dec. 19, 2019; European Search Report dated May 27, 2020; 7 pages.
International Search Report for International Application No. PCT/US2019/065662 filed Dec. 11, 2019; dated Mar. 25, 2020; 7 pages.
International Search Report for International Application No. PCT/US2020/017203; International Filing Date: Feb. 7, 2020; dated Jun. 4, 2020; 6 pages.
International Search Report for International Application No. PCT/US2020/017205; International Filing Date: Feb. 7, 2020; dated Jul. 16, 2020; 8 pages.
International Search Report for International Application No. PCT/US2020/19664; International Filing Date: Feb. 25, 2020; dated Jun. 4, 2020; 6 pages.
Invitation to Pay Additional Fees for International Application No. PCT/US2020/017205; International Filing Date: Feb. 7, 2020; dated May 19, 2020; 61 pages.
U.S. Appl. No. 16/671,709, filed Nov. 1, 2019; Non-Final Office Action dated Jul. 8, 2020; 28 pages.
U.S. Appl. No. 16/548,562, filed Aug. 22, 2019; Non-Final Office Action dated Aug. 3, 2020; 35 pages.
U.S. Appl. No. 16/671,972, filed Nov. 1, 2019; Non-Final Office Action dated Jul. 31, 2020; 30 pages.
Written Opinion for International Application No. PCT/US2019/065662 filed Dec. 11, 2019; dated Mar. 25, 2020; 7 pages.
Written Opinion for International Application No. PCT/US2020/017203; International Filing Date: Feb. 7, 2020; dated Jun. 4, 2020; 10 pages.
Written Opinion for International Application No. PCT/US2020/017205; International Filing Date: Feb. 7, 2020; dated Jul. 16, 2020; 11 pages.
Written Opinion for International Application No. PCT/US2020/19664; International Filing Date: Feb. 25, 2020; dated Jun. 4, 2020; 10 pages.
Chinese Application No. 2019105566386 filed Jun. 25, 2019; Office Action with English Translation dated Sep. 9, 2020; 11 pages.
U.S. Application No. filed Mar. 18, 2019; Final Office Action dated Aug. 24, 2020; 33 pages.
U.S. Appl. No. 16/357,175, filed Mar. 18, 2019; Non-Final Office Action dated May 16, 2019; 49 pages.
U.S. Appl. No. 16/357,194, filed Mar. 18, 2019; Non-Final Office Action dated May 17, 2019; 51 pages.
U.S. Appl. No. 16/357,223, filed Mar. 1, 2019; Non-Final Office Action dated May 23, 2019; 11 pages.
U.S. Appl. No. 16/357,227, filed Mar. 18, 2019; Non-Final Office Action dated May 23, 2019; 10 pages.
U.S. Appl. No. 16/357,234, filed Mar. 18, 2019; Non-Final Office Action dated May 24, 2019; 12 pages.
U.S. Appl. No. 16/357,238, filed Mar. 18, 2019; Non-Final Office Action dated May 28, 2019; 32 pages.
U.S. Appl. No. 16/357,250, filed Mar. 18, 2019; Non-Final Office Action dated May 24, 2019; 18 pages.
U.S. Appl. No. 16/357,271, filed Mar. 18, 2019; Non-Final OA dated May 15, 2019; 7 pages.
U.S. Appl. No. 16/357,273, filed Mar. 8, 2019; Non-Final Office Action dated May 17, 2019; 8 pages.
U.S. Appl. No. 16/357,274, filed Mar. 18, 2019; Non-Final Office Action dated May 10, 2019; 7 pages.
U.S. Appl. No. 16/357,276, filed Mar. 18, 2019; Non-Final Office Action dated May 10, 2019; 7 pages.
U.S. Appl. No. 16/357,277, filed Mar. 18, 2019; Non-Final Office Action dated May 9, 2019; 9 pages.

(56) References Cited

OTHER PUBLICATIONS

U.S. Appl. No. 16/357,279, filed Mar. 18, 2019; Non-Final Office Action dated May 30, 2019; 9 pages.
U.S. Appl. No. 16/357,280, filed Mar. 18, 2019; Non-Final Office Action dated May 14, 2019; 8 pages.
U.S. Appl. No. 16/402,023, filed May 2, 2019; Non-Final Office Action dated May 30, 2019; 25 pages.
U.S. Appl. No. 16/402,029, filed May 2, 2019; Non-Final Office Action dated Jun. 13, 2019; 9 pages.
U.S. Appl. No. 16/357,141, filed Mar. 18, 2019; Non-Final Office Action dated May 16, 2019; 17 pages.
U.S. Appl. No. 16/357,243, filed Mar. 18, 2019; Non-Final Office Action dated Jun. 3, 2019; 24 pages.
DeLonghi, [online]; [retrieved on Mar. 18, 2019]; retrieved from the Internethttps://www.delonghi.com/en-us/products/kitchen/kitchen-appliances/low-oil-fryer-and-multicooker/multifry-fh11631bk-0125392006?TabSegment=support#supportDeLonghi, "FH1163 FH1363 MultiFry", DeLonghi Instruction Manual, www.delonghi.com, 5712511041/05.15, pp. 1-11.
U.S. Appl. No. 16/357,141, filed Mar. 18, 2019; Interview Summary dated Jun. 17, 2019; 1-3 pages.
U.S. Appl. No. 16/357,238, filed Mar. 18, 2019; Interview Summary dated Jun. 26, 2019; 1-4 pages.
U.S. Appl. No. 16/357,250, filed Mar. 18, 2019; Interview Summary dated Jun. 17, 2019; 1-4 pages.
U.S. Appl. No. 16/357,274, filed Mar. 18, 2019; Interview Summary dated Jun. 5, 2019; 1-3 pages.
U.S. Appl. No. 16/357,276, filed Mar. 18, 2019; Interview Summary dated Jun. 5, 2019; 1-4 pages.
U.S. Appl. No. 16/357,277, filed Mar. 18, 2019; Interview Summary dated Jun. 3, 2019; 1-4 pages.
U.S. Appl. No. 16/357,279, filed Mar. 18, 2019; interview Summary dated Jun. 19, 2019; 1-4 pages.
U.S. Appl. No. 16/357,280, filed Mar. 18, 2019; Interview Summary dated Jun. 17, 2019; 1-3 pages.
U.S. Appl. No. 16/357,282, filed Mar. 18, 2019; Non-Final Office Action dated Jun. 27, 2019; 19 pages.
Chinese Application No. 201910557433.X filed Jun. 25, 2019; First Office Action with English Translation; 12 pages.
Invitation to Pay Additional Fees for International Application No. PCT/US2020/019685; International Filing Date: Feb. 25, 2020; dated Oct. 13, 2020; 11 pages.
Chinese Application No. 201910557420.2 filed Aug. 9, 2018; Office Action with English translation dated Feb. 21, 2020; pp. 1-21.
Chinese Application No. 2019105630895 filed Aug. 9, 2018; Office Action with English translation dated Feb. 3, 2020; pp. 1-13.
First Office Action with English Translation; Chinese Application No. 201910562983.0; Action dated Jan. 2, 2020; pp. 1-17.
International Preliminary Report on Patentability for International Application No. PCT/US18/046077, dated Feb. 20, 2020, 14 pages.
International Preliminary Report on Patentability for International Application No. PCT/US2018/046079, dated Feb. 20, 2020, 11 pages.
U.S. Appl. No. 16/548,562, filed Aug. 22, 2019; Third Party Submission Under 37 CFR 1.290 dated Feb. 19, 2020; 15 pages.
U.S. Appl. No. 16/357,141, filed Mar. 18, 2019; Non-Final Office Action dated Jan. 28, 2020; 22 pages.
U.S. Appl. No. 16/357,238, filed Mar. 18, 2019; Non-Final Office Action dated Feb. 26, 2020; 26 pages.
U.S. Appl. No. 16/357,280, filed Mar. 18, 2019; Non-Final Office Action dated Feb. 4, 2020; pp. 1-9.
U.S. Appl. No. 16/402,029, filed May 2, 2019; Final Office Action dated Dec. 31, 2019; pp. 1-6.
U.S. Appl. No. 16/671,709, filed Nov. 1, 2019; Non-Final Office Action dated Jan. 8, 2020; pp. 1-5.
U.S. Appl. No. 16/671,972, filed Nov. 1, 2019; Non-Final Office Action dated Dec. 18, 2019; pp. 1-5.
U.S. Appl. No. 16/548,562, filed Aug. 22, 2019; Final Office Action dated Mar. 9, 2020; 26 pages.
Chinese Application No. 201910563072 filed Aug. 9, 2018; Office Action with English translation dated Mar. 9, 2020; 14 pages.
U.S. Appl. No. 16/671,709, filed Nov. 1, 2019; Third Party Submission Under 37 CFR 1.290 dated Feb. 26, 2020; pp. 1-79.
U.S. Appl. No. 16/671,972, filed Nov. 1, 2019; Third Party Submission Under 37 CFR 1.290 dated Feb. 27, 2020; pp. 1-81.
U.S. Appl. No. 16/402,023, filed May 2, 2019; Non-Final Office Action dated Feb. 27, 2020; 25 pages.
U.S. Appl. No. 16/800,089, filed Feb. 25, 2020; Third Party Submission Under 37 CFR 1.290 dated Mar. 13, 2020; pp. 1-82.
U.S. Appl. No. 16/357,270, filed Mar. 18, 2019; Non-Final Office Action dated Jun. 14, 2019; 16 pages.
U.S. Appl. No. 16/402,035, filed May 2, 2019; Non-Final Office Action dated Aug. 8, 2019; 1-9 pages.
U.S. Appl. No. 16/357,141, filed Mar. 18, 2019; Final Office Action dated Aug. 30, 2019; 20 pages.
U.S. Appl. No. 16/357,280, filed Mar. 18, 2019; Final Office Action dated Sep. 13, 2019; 1-11 pages.
U.S. Appl. No. 16/357,250, filed Mar. 18, 2019; Final Office Action dated Sep. 13, 2019; 1-14 pages.
U.S. Appl. No. 16/357,251, filed Mar. 18, 2019; Non-Final Office Action dated Aug. 1, 2019; 186 pages.
Notification of Transmittal of the International Search Report of the International Searching Authority, or the Declaration. PCT/US2018/046077, dated Dec. 19, 2018, 7 pages.
Notification of Transmittal of the International Search Report of the International Searching Authority, or the Declaration; PCT/US2018/046079; dated Jan. 2, 2019, 7 pages.
Notification of Transmittal of the Written Opinion of the International Searching Authority, or the Declaration. PCT/US2018/046077, dated Dec. 19, 2018, 10 pages.
Notification of Transmittal of the Written Opinion of the International Searching Authority, or the Declaration; PCT/US2018/046079; dated Jan. 2, 2019, 10 pages.
WO2018122652A1; Jul. 5, 2018; English Abstract Only (3 Pages).
U.S. Appl. No. 16/357,175, filed Mar. 18, 2019; Final Office Action dated Sep. 30, 2019; 1-17 pages.
U.S. Appl. No. 16/357,194, filed Mar. 18, 2019; Final Office Action dated Sep. 30, 2019; 1-17 pages.
U.S. Appl. No. 16/357,223, filed Mar. 18, 2019; Final Office Action dated Oct. 3, 2019; 1-7 pages.
European Application No. 1921797806-1004 filed Dec. 31, 2019; European Search Report dated Apr. 1, 2020; 7 pages.
Hip Cooking, [online]; [retrieved on Nov. 25, 2019]; retrieved from the Internethttps://www.hippressurecooking.com/pressure-cooker-psi-faq-the-stuff-you-didnt-think-to-ask/Laura Pazzaglia, "Pressure Cooker PSI FAQ: The Stuff You Didn't Think to Ask about Pressure," Hip Cooking, Apr. 7, 2013, pp. 1-26.
U.S. Appl. No. 16/357,270, filed Mar. 18, 2019; Final Office Action dated Dec. 2, 2019; pp. 1-20.
Civil Action No. 19-cv-24114, U.S. District Court, Southern District of Florida; Complaint Plaintiff SharkNInja Operating LLC for Compaint for Patent Infringement and Demand for Jury Trial against Defendants Tristar Products, Inc. and Emeril Lagasse (Entered: Oct. 4, 2019) pp. 1-194.
Civil Action No. 19-cv-24114, U.S. District Court, Southern District of Florida; Defendant Tristar Products Inc.'s Answer To Plaintiff's Complaint and Counterclaims; *SharkNinja Operating LLC* (Plaintiff) v *Emeril Lagasse* (Defendant) and *Tristar Products, Inc.* (Defandant/Counterclaim Plaintiff) v *SharkNinja Operating LLC, Daniel R. Gibson, Cantor Colburn LLP, Pedro Lopez-Baldrich* (Counterclaim Defendants) Document 25 (Entered: Nov. 29, 2019) pp. 1-36.
Civil Action No. 19-cv-24114, U.S. District Court, Southern District of Florida; Defendant Emeril Lagasse's Motion To Dismiss for Improper Venue; *SharkNinja OPerating LLC* (Plaintiff) v. *Tristar Products, Inc. and Emeril Lagasse* (Defendants); Document 24 (Entered: Nov. 29, 2019) pp. 1-6.
Chinese Application No. 2019105637856 filed Feb. 8, 2019; Office Action dated Dec. 3, 2019.

(56) References Cited

OTHER PUBLICATIONS

U.S. Appl. No. 17/139,283, filed Dec. 31, 2020; Non-Final Office Action dated Mar. 10, 2021; 309 pages.
U.S. Appl. No. 17/139,572, filed Dec. 31, 2020; Non-Final Office Action dated Mar. 11, 2021; 292 pages.
U.S. Appl. No. 17/139,314, filed Dec. 31, 2020; Non-Final Office Action dated Mar. 23, 2021; 310 pages.
Chinese Patent Application No. 2019105638416 filed Jun. 26, 2019; Office Action with English Translation dated Nov. 3, 2020; 16 pages.
Japanese Application No. 2020-030582 filed Feb. 26, 2020; Japanese Office Action with English Translation dated Dec. 8, 2020; 8 pages.
Japanese Application No. 2020-030585 filed Feb. 26, 2020; Japanese Office Action with English dated Dec. 8, 2020; 7 pages.
Japanese Application No. 2020-030586 filed Feb. 26, 2020; Japanese Office Action with English Translation dated Dec. 8, 2020; 6 pages.
Japanese Application No. 2020-030587 filed Feb. 26, 2020; Japanese Office Action with English Translation dated Dec. 8, 2020; 4 pages.
Japanese Patent Application No. 2020-030583 filed Feb. 26, 2020; Office Action with English Translation dated Nov. 10, 2020; 13 pages.
Japanese Patent Application No. 2020-030584 filed Feb. 26, 2020; Office Action with English Translation; 6 pages.
U.S. Appl. No. 17/084,891, filed Oct. 30, 2020; Third Party Submission Under 37 CFR 1.290 dated Dec. 8, 2020; 72 pages.
U.S. Appl. No. 16/357,238, filed Mar. 18, 2019; Non-Final Office Action dated Jan. 14, 2021; 74 pages.
U.S. Appl. No. 16/357,270, filed Mar. 18, 2019; Non-Final Office Action dated Dec. 21, 2020; 32 pages.
U.S. Appl. No. 16/671,709, filed Nov. 1, 2019; Final Office Action dated Jan. 1, 2021; 29 pages.
U.S. Appl. No. 16/671,972, filed Nov. 1, 2019; Final Office Action dated Feb. 24, 2021; 59 pages.
U.S. Appl. No. 17/139,236, filed Dec. 31, 2020; Non-Final Office Action dated Mar. 8, 2021; 307 pages.
U.S. Appl. No. 17/139,599, filed Dec. 31, 2020; Non-Final Office Action dated Feb. 23, 2021; 9 pages.
U.S. Appl. No. 17/139,602, filed Dec. 31, 2020; Non-Final Office Action dated Feb. 22, 2021; 33 pages.
Extended European Search Report issued in European Application No. 21165153.4, dated Jul. 6, 2021, 7 pages.

\* cited by examiner

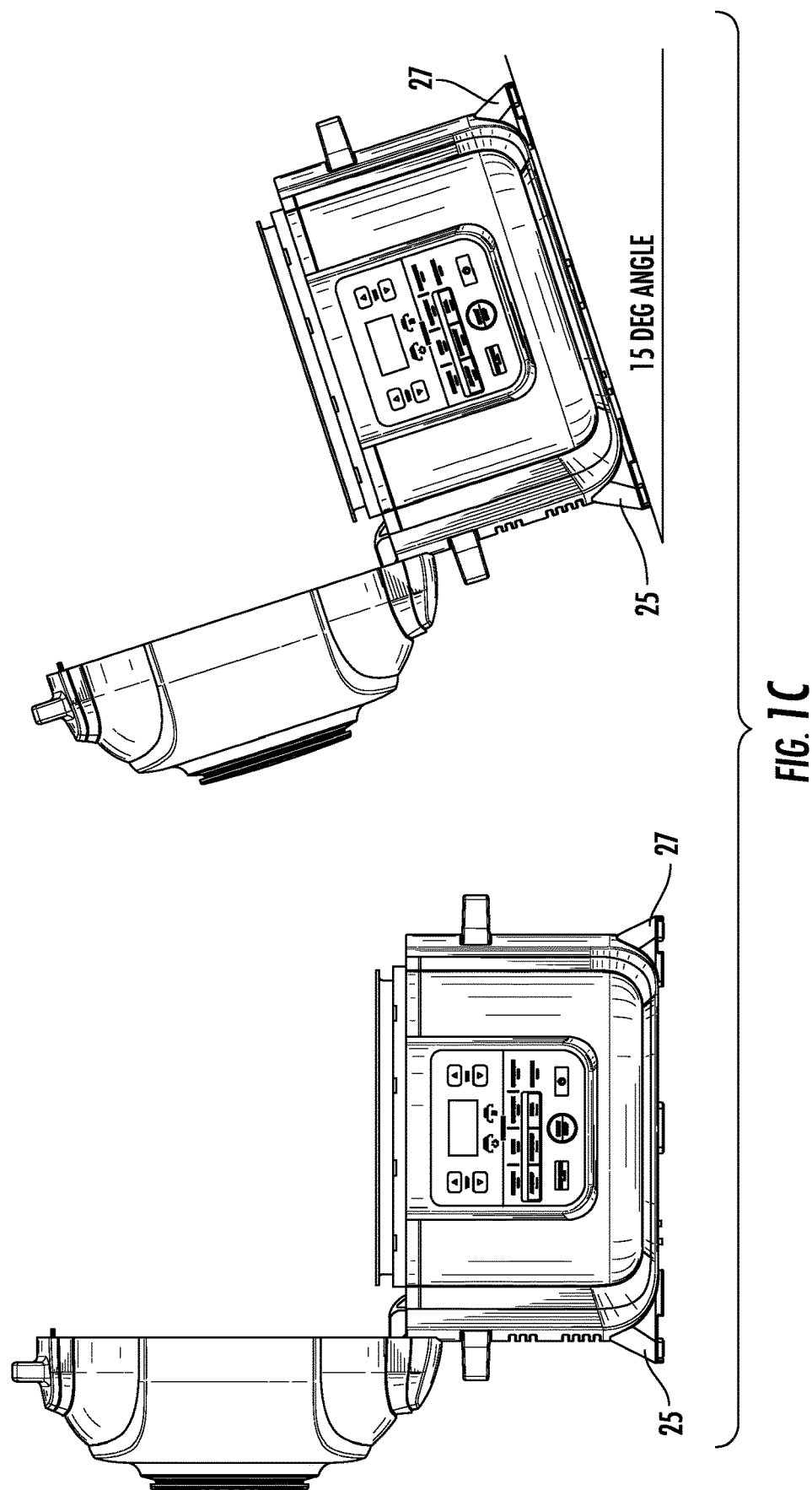

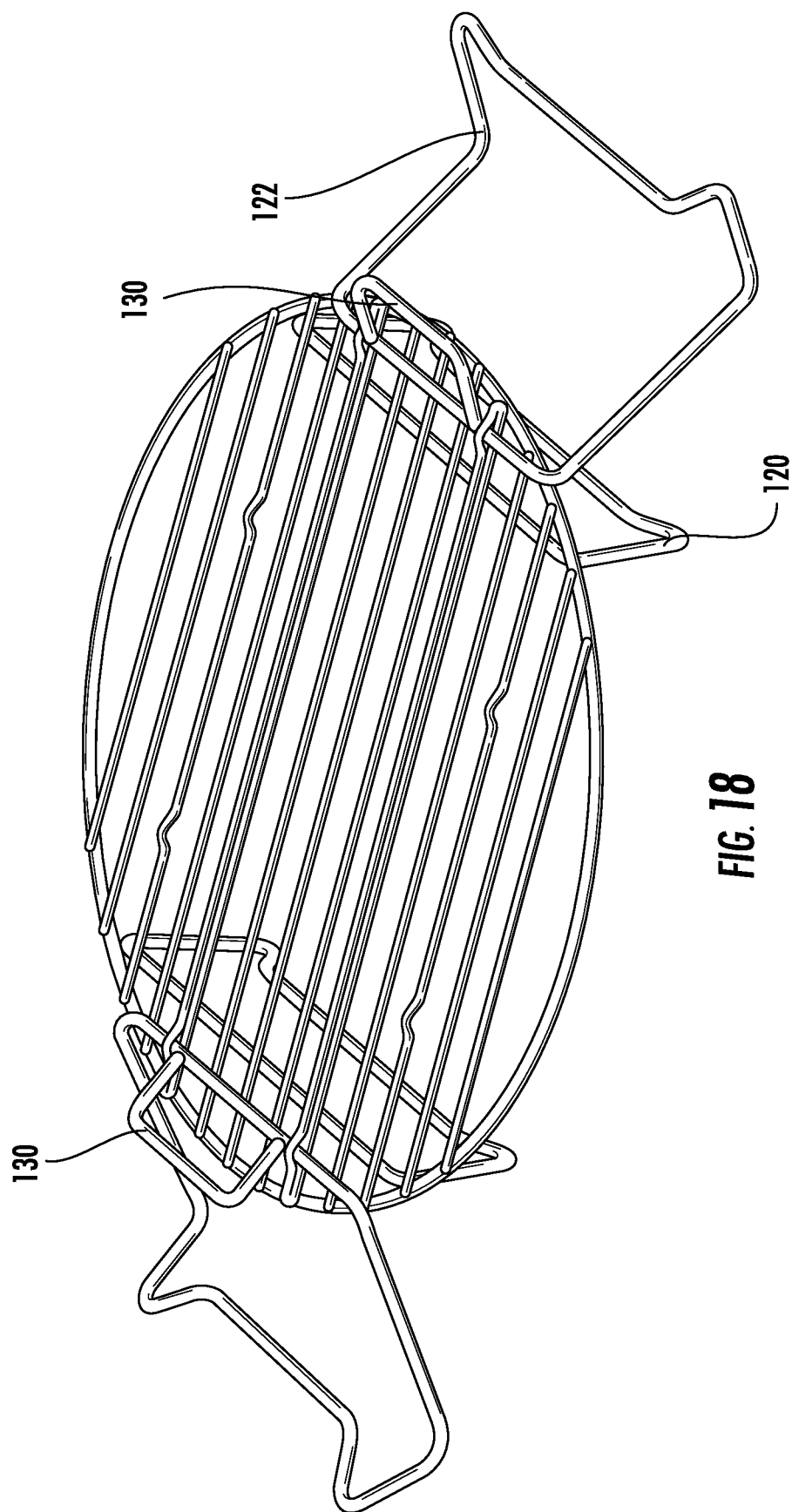

| FUNCTION | DEFAULT TIME (HH:MM) | TIME SETTINGS | PRESSURE SETTINGS | DEFAULT TEMPERATURE (F) | TEMPERATURE SETTINGS | FAN SPEED SETTING (RPM) |
|---|---|---|---|---|---|---|
| PRESSURE | 0:10 HI (DEFAULT)/ 0:10 LO | 0:00–4:00, 1 MIN INCREMENTS FROM 0:00–1:00, 5 MIN INCREMENTS FROM 1:00–4:00 | LO: 50 ± 10KPA HI: 80 ± 10KPA | N/A | N/A | N/A |
| SLOW COOK | 4:00 HI (DEFAULT)/ 8:00 LO | 4:00–12:00, 15 MIN INCREMENT HIGH, 6:00–12:00, 15 MIN INCREMENT LOW | N/A | HI | LO/HI | N/A |
| SEAR/SAUTE | N/A | NO TIME FUNCTIONALITY FOR SEAR/SAUTE | N/A | HI | LO / LO-MD / MD / MD-HI / HI (INCLUDE: WHERE SHOWN) | N/A |
| STEAM | 0:10 | 0:01–0:30, 1 MIN INCREMENT | N/A | N/A | N/A | N/A |
| AIR CRISP | 0:20 | 0:01–1:00, 1 MIN INCREMENT | N/A | 390 | 300, 315, 325, 330, 345, 350, 360, 375, 390, 400 | 100% MOTOR POWER (TARGET 2650RPM) |
| ROAST | 0:15 | 0:01–4:00, 1 MIN INCREMENTS FROM 0:01–1:00, 5 MIN INCREMENTS FROM 1:00–4:00 | N/A | 375 | 250, 260, 275, 290, 300, 315, 325, 330, 345, 350, 360, 375, 390, 400 | 100% MOTOR POWER (TARGET 2650RPM) |
| DEHYDRATE | 6:00 | 1:00–12:00, 15 MIN INCREMENTS | N/A | 150 | 105, 120, 135, 150, 165, 180, 195 | 50% MOTOR POWER (TARGET 1200RPM) |
| BROIL | 00:10 | 0:01–0:30, 1 MIN INCREMENTS | N/A | 450 | 450 | 100% MOTOR POWER (TARGET 2650RPM) |

FIG. 19

COOKING DEVICE AND COMPONENTS THEREOF

CROSS-REFERENCE TO RELATED APPLICATIONS

This application claims the benefit of U.S. Provisional Application Ser. No. 62/543,082, filed Aug. 9, 2017, which is incorporated herein by reference in its entirety.

BACKGROUND

Embodiments of the present disclosure relates generally to a cooking device and components thereof, and more specifically, a multifunction device configured to perform the operation of a plurality of distinct cooking devices, the multifunctional cooking device optionally employing various components for cooking in the distinct cooking modes.

Conventional cooking devices, such as pressure cookers and air fryers each perform a single cooking operation, and as such, these devices employ different components and method for cooking food items. As such, multiple devices are required to perform various cooking operations. For consumers that wish to enjoy food cooked in different ways via different operations, an accumulation of these devices can occur. Such an accumulation of cooking devices is often prohibitive from a standpoint of cost and storage space. For at least these reasons, it would be desirable to integrate the functionality of several cooking devices into a single user-friendly cooking device.

SUMMARY

Disclosed herein is a cooking system for cooking food, the system including a housing having a hollow interior, a lid movable relative to the housing, at least one heating element associated with one of the housing and the lid, wherein the cooking system is operable in a plurality of modes including a conductive cooking mode and a convective cooking mode, wherein in the conductive cooking mode the cooking system is operable as a conductive cooker and in the convective cooking mode the cooking system is operable as a convection cooker.

Also disclosed is a cooking system for cooking food, the cooking system being functional in a plurality of cooking modes, the cooking system including a housing having a hollow interior, a lid movable relative to the housing, at least one heating element disposed within one of the housing and the lid, and a rotational air movement device coupled to at least one of the housing and the lid, wherein during operation of the rotational air movement device, the rotational air movement device is operable to rotate at a plurality of speeds including first rotational speed and a second rotational speed, the second rotational speed being different than the first rotational speed.

Additionally disclosed is a cooking system for cooking food, the cooking system including a housing having a hollow interior, a lid movable between an open position and a closed position relative to the housing to selectively close an opening to the hollow interior, wherein in both the open position and the closed position, the lid is affixed to the housing, and at least one heating element disposed within one of the housing and the lid, wherein the cooking system is operable in a plurality of modes including a first mode and a second mode, during operation of the cooking system in the first mode, the lid is arranged in the closed position, and during operation of the cooking system in the second mode, the lid is arranged in the open position.

Further disclosed is a cooking system for cooking a food item, the cooking system including a housing having a hollow interior; a primary lid connectable to the housing, wherein when the primary lid is connected to the housing, the primary lid is arranged in contact with the housing, a secondary lid connectable to the housing, wherein when the secondary lid is connected to the housing, the secondary lid is arranged in contact with the housing, wherein the primary lid and the secondary lid are connectable to the housing simultaneously, and wherein at least one heating element is disposed within at least one of the housing, the primary lid, and the secondary lid.

Still further disclosed is a cooking system for cooking food, the cooking system being functional in a plurality of cooking modes, the cooking system including a housing having a hollow interior, a lid movable relative to the housing, at least one heating element disposed within one of the housing and the lid, an air movement device coupled to at least one of the housing and the lid to circulate air through the hollow interior, and an air diffuser configured to impart rotation to the air circulating through the hollow interior, wherein the air diffuser is arranged within the hollow interior during at least one of the plurality of cooking modes.

Also disclosed is an insert for disposal on a surface of a cooking system, the insert including a food support body including a first body surface and an opposing second body surface, at least one leg extending from the first body surface, and at least one leg extending from the second body surface, wherein the at least one leg extending from the first body surface extends a lesser distance from the food support body than the at least one leg extending from the second body surface extends from the food support body.

Additionally disclosed is a cooking system for cooking food, the cooking system being functional in a plurality of cooking modes, the cooking system including a housing having a hollow interior, a first heating element, a second heating element distinct from the first heating element, a first thermal cut off in communication with the first heating element, and a second thermal cut off in communication with the second heating element, wherein a triggering of the first thermal cut off terminates power to both the first heating element and the second heating element, and wherein a triggering of said second thermal cut off terminates power to both the first heating element and the second heating element.

Further disclosed is a cooking system for cooking food, the cooking system being functional in a plurality of cooking modes, the cooking system including a housing having a hollow interior, a first lid for use in at least a first cooking mode, a second lid for use in at least a second cooking mode, a first lid detection sensor configured to detect a closed condition between the first lid and the housing, a second lid detection sensor configured to detect a closed condition between the second lid and the housing.

In addition to one or more of the features described above, or as an alternative, in further embodiments.

BRIEF DESCRIPTION OF THE FIGURES

The accompanying drawings incorporated in and forming a part of the specification embodies several aspects of the present disclosure and, together with the description, serves to explain the principles of the disclosure. In the drawings:

FIG. 1C is a side by side front view the cooking system according to an embodiment;

FIG. 18 is another perspective view of the cooking rack for use in the cooking system according to an embodiment;

FIG. 19 is a table showing cooking parameters for use in a cooking system according to an embodiment;

Figure 1A:
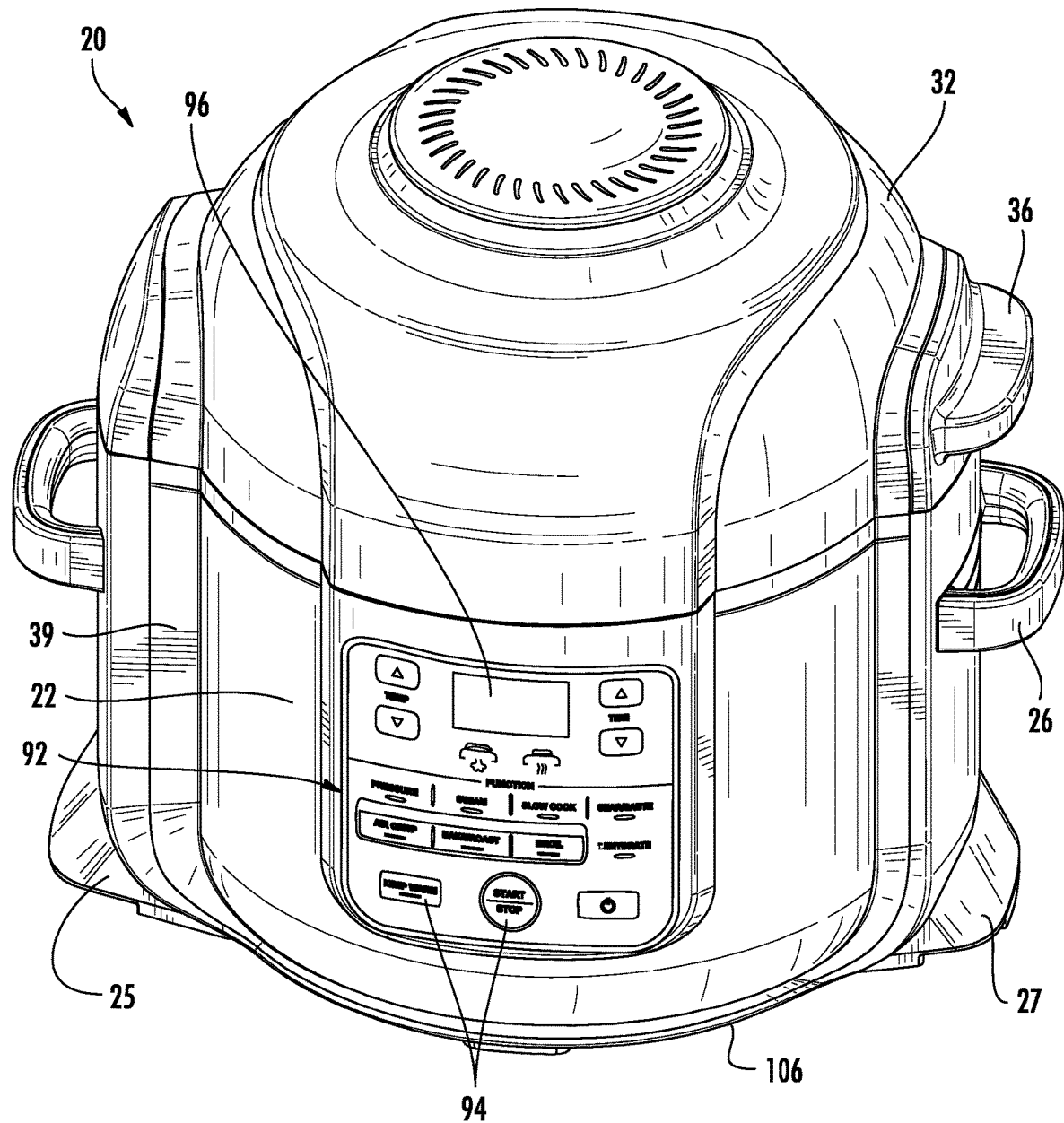
FIG. 1A is a perspective front view of the cooking system according to an embodiment.

The detailed description explains embodiments of the disclosure, together with advantages and features, by way of example with reference to the drawings.

DETAILED DESCRIPTION

With reference first to FIGS. 1-7, a cooking system 20 configured to perform multiple cooking operations is illustrated. As shown, the cooking system 20 includes a housing 22 and a first or primary lid 32 permanently or removably attached, or more specifically hinged, to the housing 22. In an exemplary, non-limiting embodiment, the connection or hinge area between the lid 32 and the housing 22 occurs at an upper portion of a spine 39 of the housing 22. A bottom 106 of the housing 22 of the cooking system 20 (see FIG. 1B) may be supported on a surface by one or more feet 25 and 27, which may include shock absorbing pads 25a and 27a (of a material such as but not limited to rubber) at a bottom surface thereof. The feet 25, 27 may extend from the housing 22 to define a surface on which the cooking system 20 may contact an adjacent supporting surface, such as a countertop for example. The bottom surface of the feet 25, 27 or pads 25a, 27a may be flush with, or alternatively, may extend out of plane from the bottom 106 of the housing. In the illustrated, non-limiting embodiment, the housing 22 includes two feet 25, 27 arranged on opposing sides of the housing 22; however, it should be understood that a housing having any suitable number of feet 25 is within the scope of the disclosure.

Figure 1B:
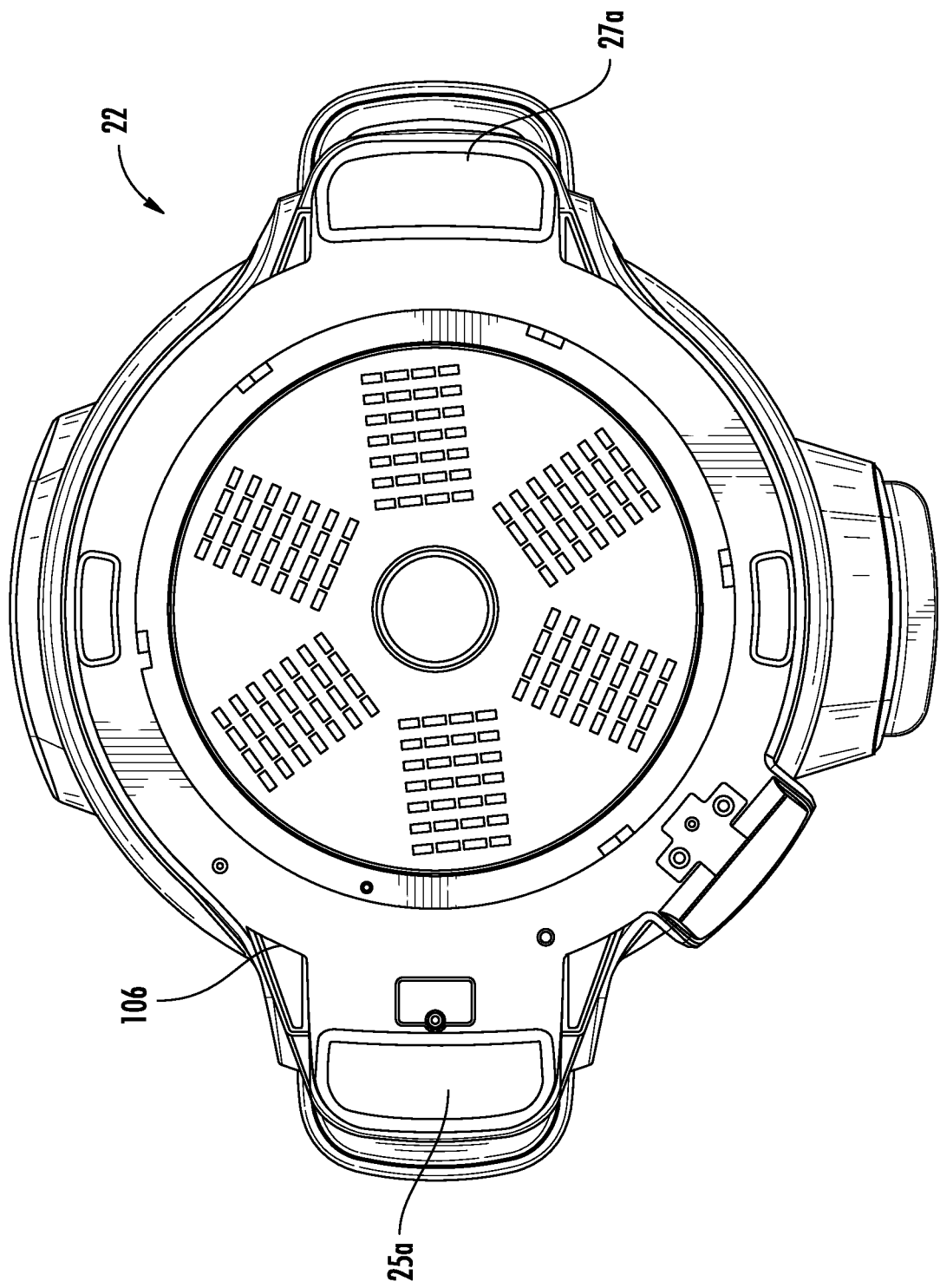
FIG. 1B is a bottom view of the cooking system according to an embodiment.
Figure 1D:
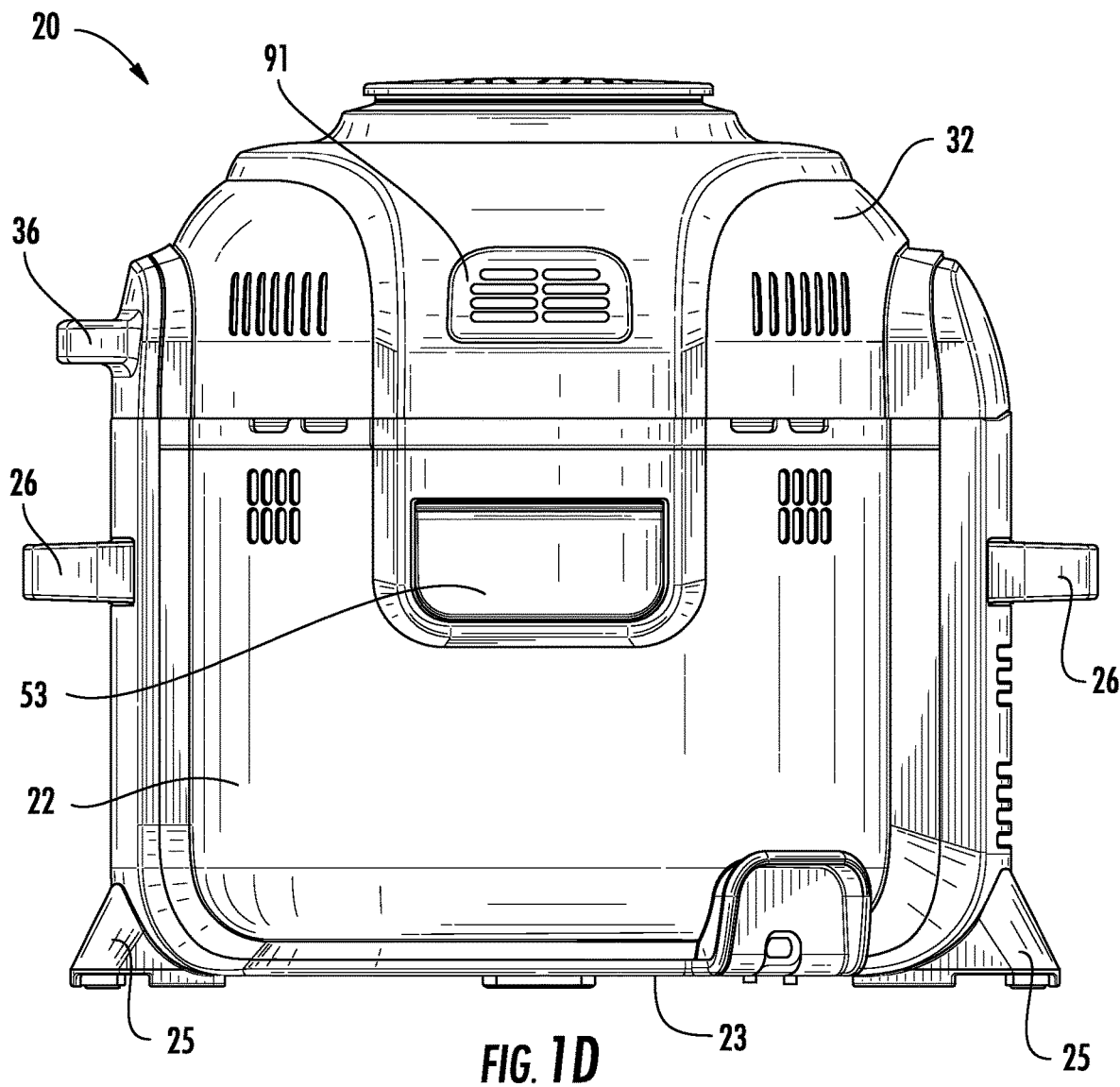
FIG. 1D is a rear view of the cooking system according to an embodiment.

Further, in the exemplary, non-limiting embodiment shown in at least FIGS. 1A-C, the foot 25 under the spine 39 is larger and extends out a greater distance from the side of the housing 22 than the foot 27. As shown in FIG. 1C, this allows for better support of the system 20 when the cooking system 20 is on a substantially flat surface or an inclined surface (up to 15 degrees in an exemplary embodiment) and the relatively heavy lid 32 is in an open position.

Figure 2:
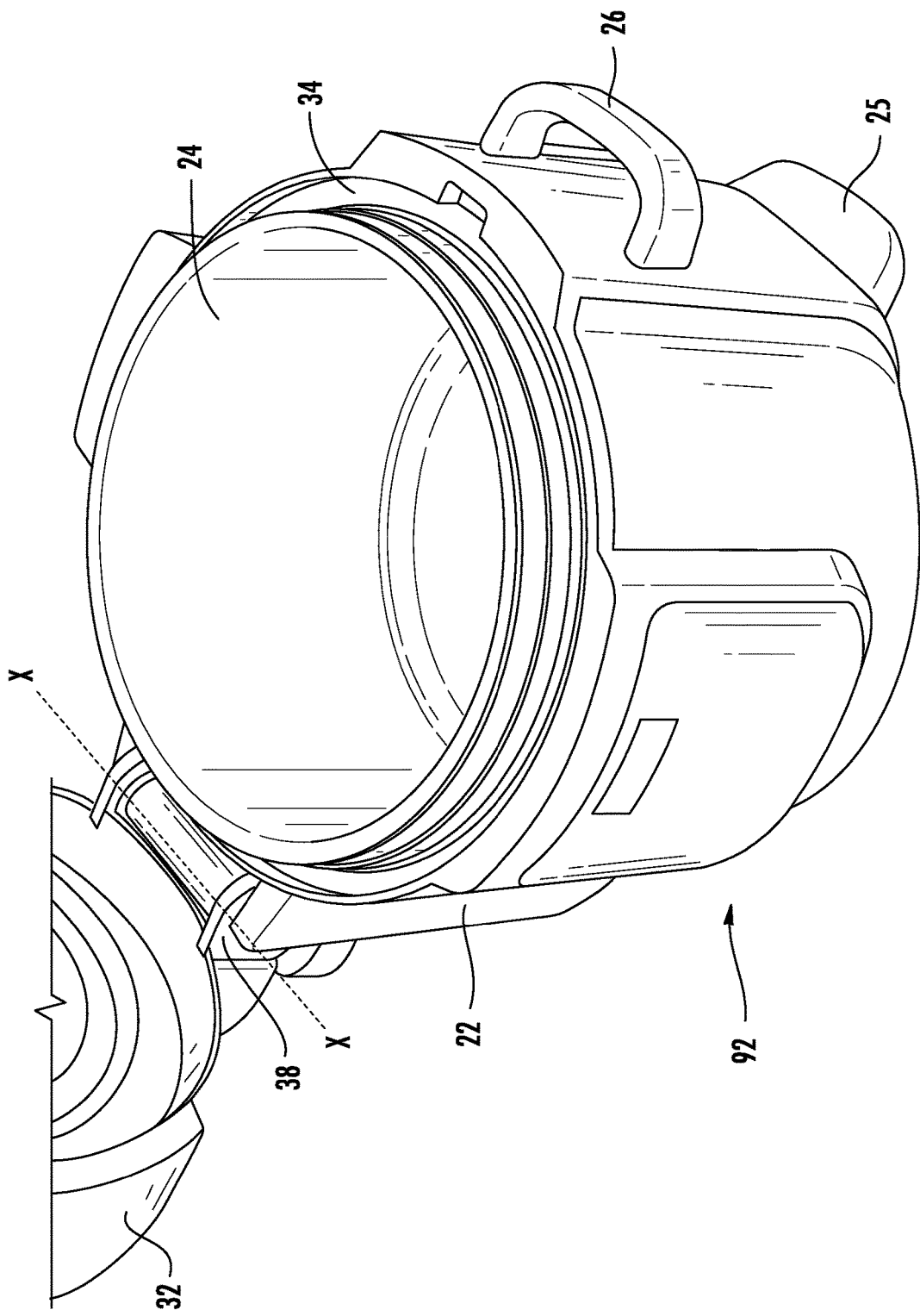
FIG. 2 is a perspective view of the cooking system having a lid in an open position according to an embodiment.
Figure 3A:
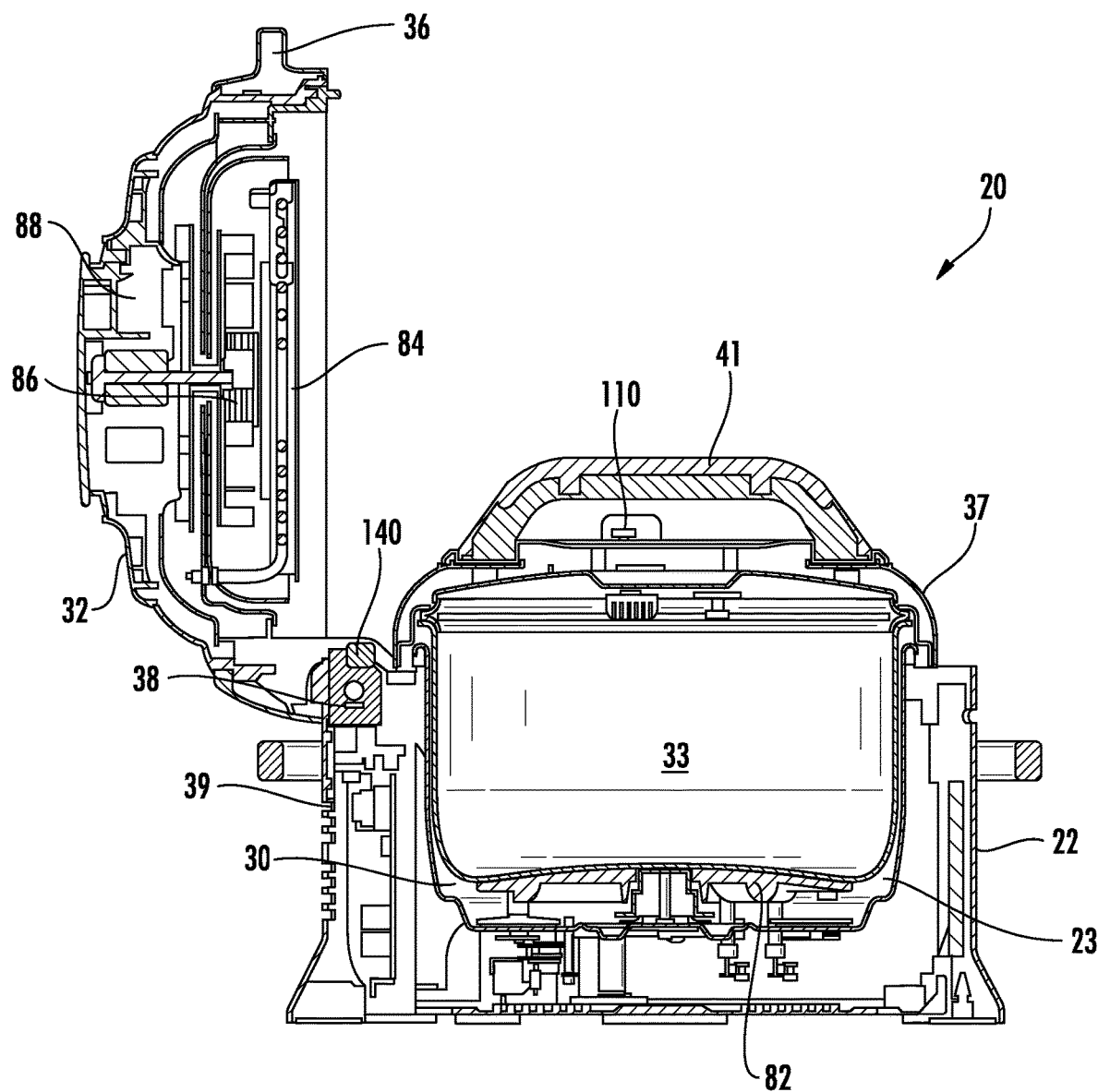
FIG. 3A is a cross-sectional view of the cooking system having a secondary lid according to an embodiment.

In the illustrated, non-limiting embodiment, one or more handles 26 extend outwardly from the exterior of the housing 22 to provide a user with a location to more easily grasp the system 20. Although two handles 26 are shown, embodiments having no handles, a single handle, or more than two handles are also within the scope of the disclosure. The housing 22 and/or the one or more handles 26 may be integrally or separately formed, such as from a molded plastic material for example. Referring now to some of the interior features of the system 20, an inner surface of the housing 22 defines a hollow interior 30. In an exemplary non-limiting embodiment, a liner 23 that may be formed from any suitable conductive material, such as aluminum for example is disposed within the hollow interior 30, and in some embodiments the liner 23 may be the inner surface defining the hollow interior (though surfaces inside the liner 23, such as the walls of the container, or outside the liner 23, such as plastic around the liner 23, may also define the hollow interior 30). In an exemplary, non-limiting embodiment, a food container 24 is receivable inside the hollow interior 30 defined by the liner 23. Spacing components, such as silicone bumpers (not shown) may be disposed along the inner surface of the liner 23 to keep the container 24 aligned properly within the hollow interior 30 during cooking. Although the container 24 is described herein as being removable from the housing 22, embodiments where the container 24 is integrally formed with the housing 22 are also contemplated herein. The container 24, which is shown in FIGS. 2 and 3A, has an interior 33 designed to receive and retain one or more consumable products, such as food products for example, therein. Examples of food products suitable for use with the cooking system 20, include but are not limited to, meats, fish, poultry, bread, rice, grains, pasta, vegetables, fruits, and dairy products, among others. The container 24 may be a pot formed from a ceramic, metal, or die cast aluminum material. In an embodiment, an interior surface of the container 24 includes a nano ceramic coating and exterior surface of the container 24 includes a silicone epoxy material. However, any suitable material capable of withstanding the high temperatures and pressures required for cooking food products is contemplated herein.

Referring with more detail not to the lid 32, it should be noted that the lid 32 is connectable to a surface of the container 24 and/or housing 22 to close off entry to the hollow interior 30 of the container 24. In an embodiment, a diameter of the lid 32 is generally complementary to a diameter of the housing 22 such that the lid 32 covers not only the container 24, but also an upper surface 34 of the housing 22. The lid 32 can be made of any suitable material, such as glass, aluminum, plastic, or stainless steel for example. Further, the lid 32 may, but need not, include one or more handles 36 for removably coupling the lid 32 to the remainder of the cooking system 20. In the illustrated, non-limiting embodiment, the lid 32 is coupled to the housing 22 via a hinge 38 (best shown in FIG. 3A just above the spine 39), such that the lid 32 is rotatable about an axis X between an open position (FIG. 3) and a closed position (FIG. 1A). In such embodiments, the hinge axis X may be located at a side surface of the cooking system 20, as shown in FIG. 2, or alternatively, at a back surface of the cooking system 20, such as vertically disposed relative to one or more handles 26 of the housing 22, as shown in FIG. 4. However, embodiments where the lid 32 is separable from the housing 22, or movable between the open and closed positions in another manner are also contemplated herein. One or more fastening mechanisms (not shown) may, but need not be used to secure the lid 32 to the housing 22 when the lid 32 is in the closed position. Any suitable type of fastening mechanism capable of withstanding the heat associated with the cooking system 20 is considered within the scope of the disclosure. In an embodiment, best shown in FIGS. 3A-C, 4-5, and 6A-B, the cooking system 20 additionally includes a secondary lid 37 configured to removably couple to the housing 22 and/or container 24 to seal the hollow interior 30. In an embodiment, the secondary lid 37 is press-fit onto an upper surface 34 of the housing 22 or directly to the container 24. In another embodiment, the secondary lid 37 is configured to thread-ably couple to the upper surface 34 of the housing 22 or the container 24. However, embodiments where the secondary lid 37 is configured to couple to at least one of the housing 22 and container 24 in another suitable manner, such as via a pressure tight mechanism for example, are also contemplated herein. The secondary lid 37 can be made of any suitable material, such as glass, aluminum, plastic, or stainless steel, or any combination thereof for example. In an embodiment, the secondary lid 37 is formed from a molded plastic material. In addition, the secondary lid 37 may, but need not, include one or more handles 41 for removably coupling the secondary lid 37 to the cooking system 20. The handle 41 may be integrally formed with the remainder of the lid 37, such as via a molding process, or alternatively, may be a separate component coupled to the lid 37.

Figure 6A:
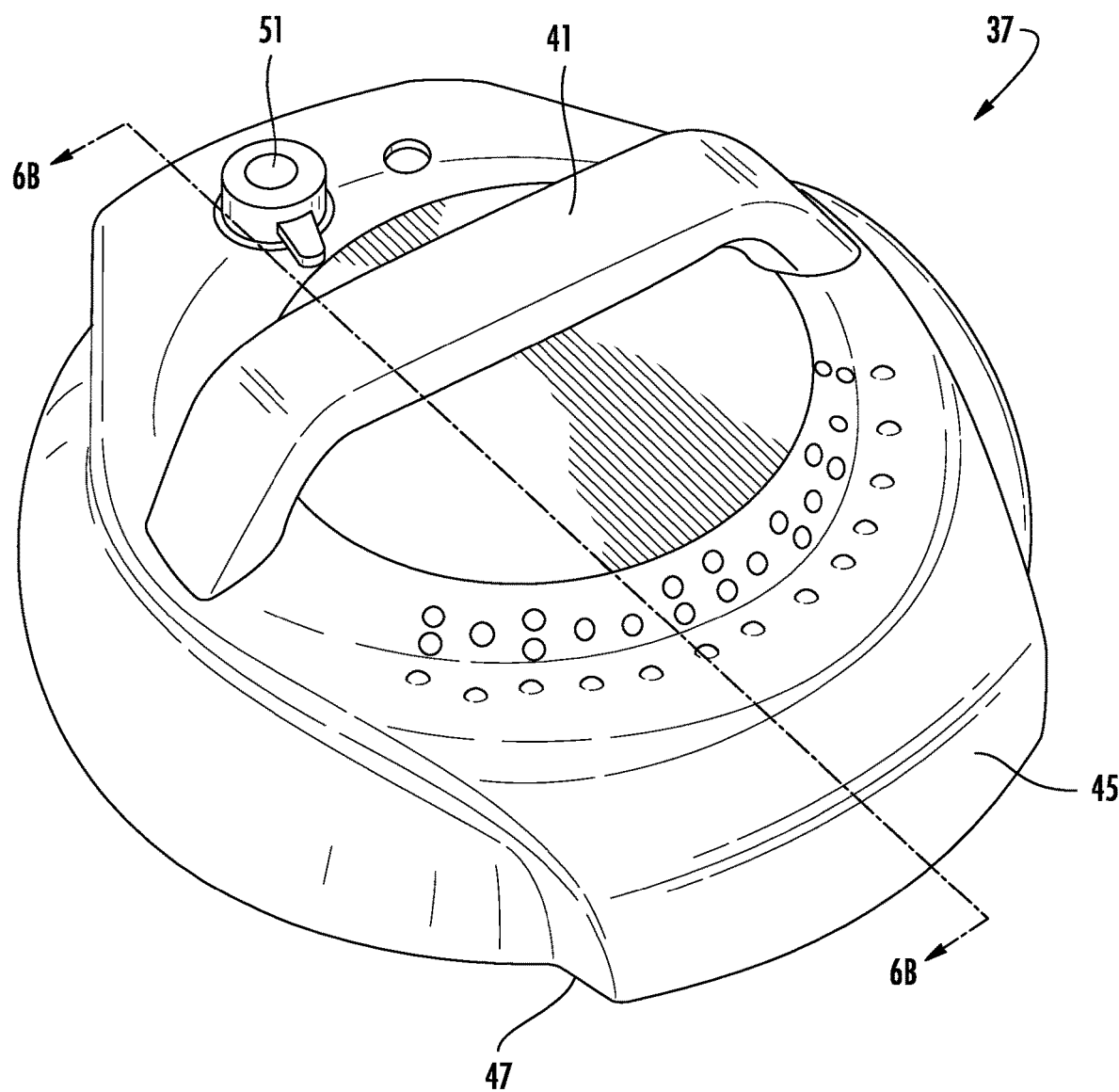
FIG. 6A is a perspective view of a lid of the cooking system according to an embodiment.
Figure 6B:
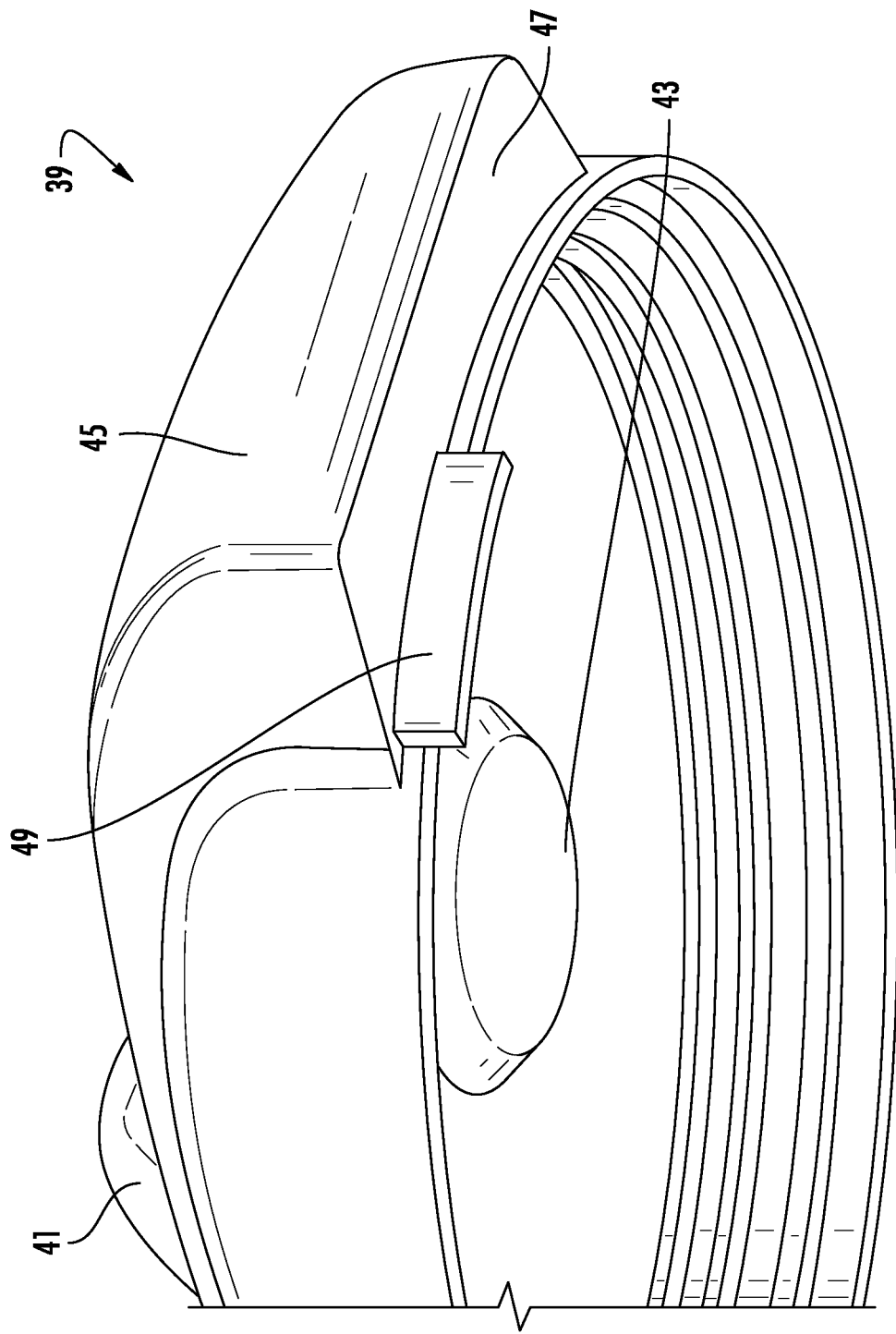
FIG. 6B is another perspective view of a lid of the cooking system according to an embodiment.

As best shown in FIG. 6B, the secondary lid 37 includes an interior liner 43, also referred to as an "underliner" formed from any suitable material, such as stainless steel for example. In an embodiment, one or more threads may be formed in the underliner 43 to couple the lid 37 to an end of the container 24. As shown, the lid 37 may additionally include a lid support ring 45 having a diameter extending beyond the outer diameter of the underliner 43 about at least a portion of the circumference thereof. In an embodiment, a surface 47 of the lid support ring 45 may be configured to abut the upper surface 34 of the housing 22 when the secondary lid 37 is coupled to the container 24. A lid cushion 49, such as formed from a resilient or elastomeric material, such as rubber for example, may be disposed at an exterior surface of a portion of the lid 37, such as between the under-liner 43 and the lid support ring 45 for example. Further, a pressure relief valve 51 (see FIG. 6A) is formed in a surface of the secondary lid, such as the upper surface thereof for example. The pressure relief valve is configured to automatically open to release air from within the chamber formed between the secondary lid 37 and the container 24 when the pressure therein exceeds a predetermined threshold. Alternatively, or in addition, the pressure relief valve is manually operable to release air from within the chamber formed between the secondary lid 37 and the container 24.

Figure 3B:
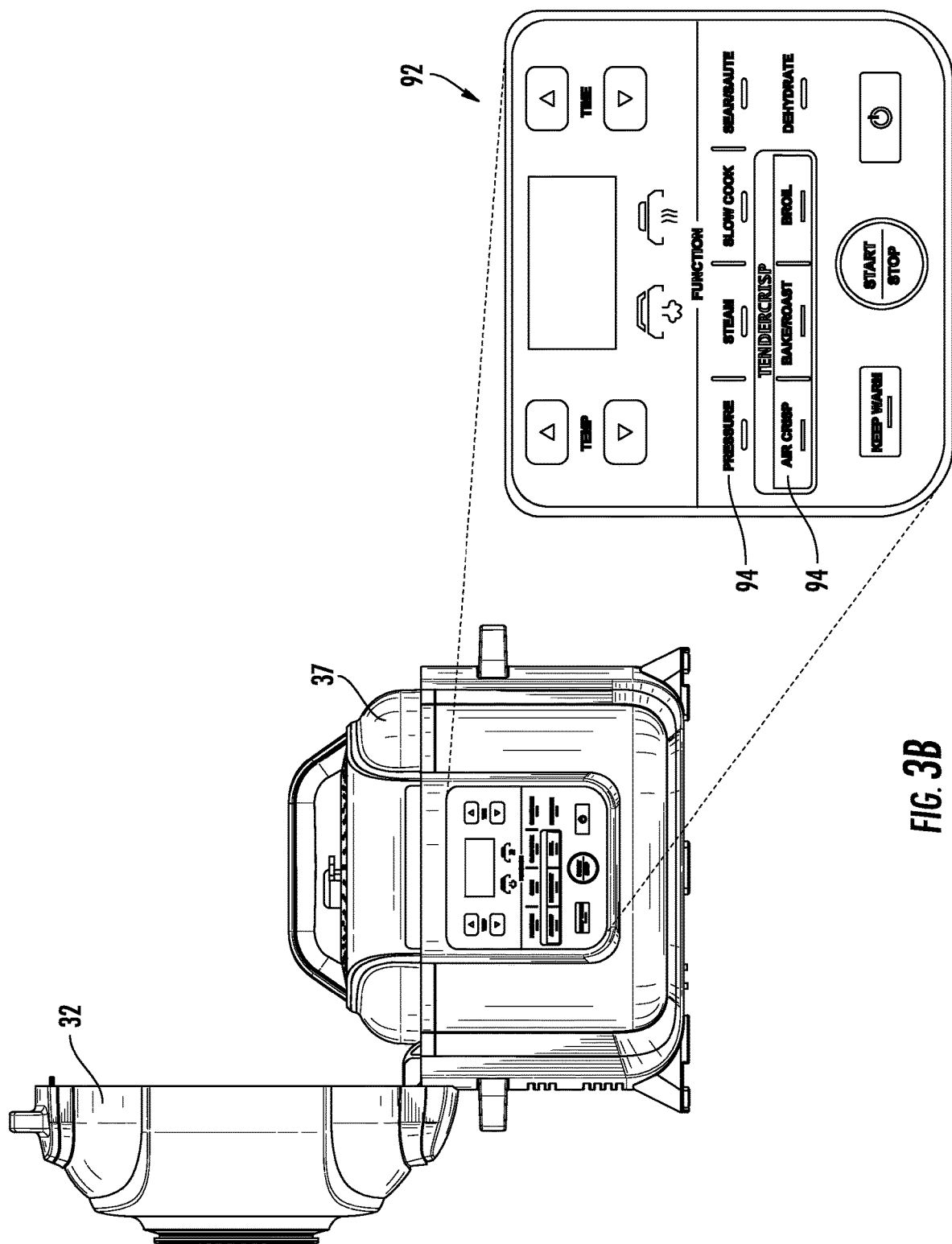
FIG. 3B is a front view of a cooking system having a secondary lid according to an embodiment.
Figure 4:
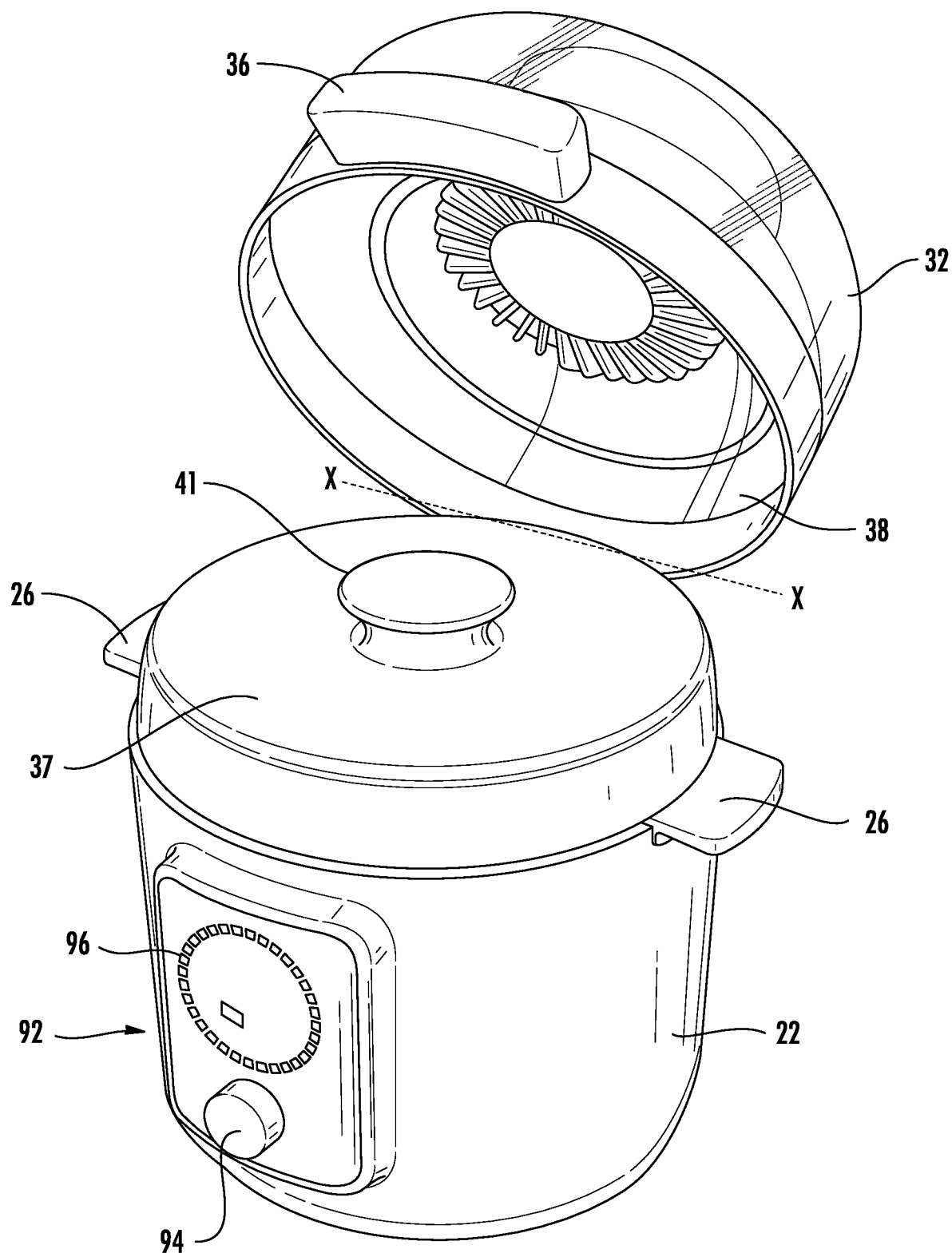
FIG. 4 is a perspective view of a cooking system having both a lid and a secondary lid in an open position according to an embodiment.
Figure 5:
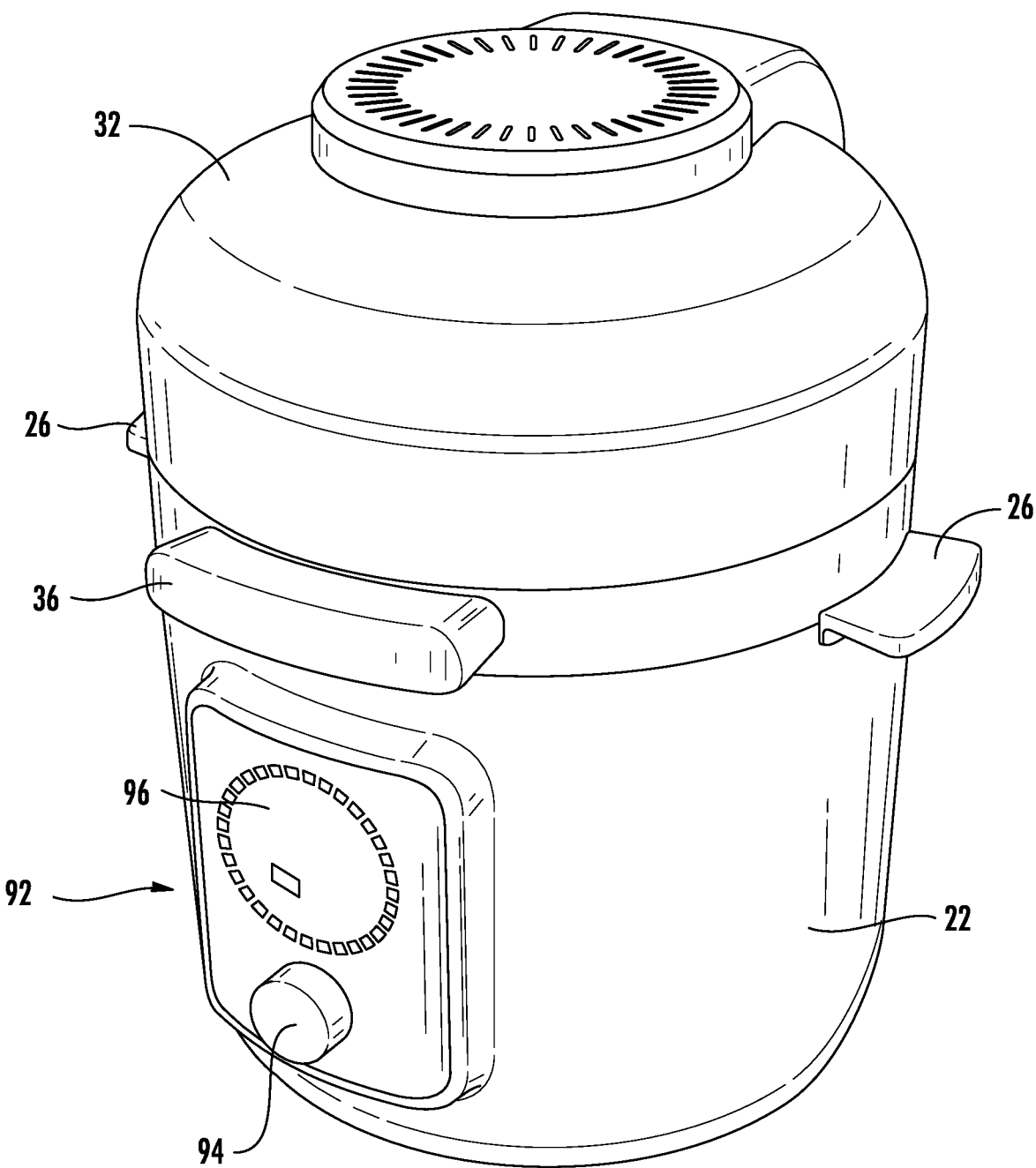
FIG. 5 is a perspective view of a cooking system having both a lid and a secondary lid in a closed position according to an embodiment.

To couple the secondary lid 37 to the housing 22, the primary lid 32 must be in an open position, as shown in FIGS. 3A and 3B. Further, in an embodiment, the primary lid 32 is not movable to the closed position relative to the housing 22 when the secondary lid 37 is affixed thereto. This may be due to the outer diameter of the secondary lid 37, or alternatively, because one or more components extending upwardly from the lid 37, such as handle 41, would interfere with a portion of the primary lid 32. However, in other embodiments, as shown in FIGS. 4 and 5, at least a portion of the secondary lid 37 may be nestable or receivable within the primary lid 32. In such embodiments, the outer diameter of the secondary lid 37 may be smaller than the inner diameter of the primary lid 32, such that the primary lid 32 substantially surrounds the secondary lid 37 when in the closed position. Accordingly, the enclosure defined by the hollow interior 30 of the container 24 and the secondary lid 37 is smaller than the enclosure formed by the hollow interior 30 of the container 24 and the primary lid 32. Although the cooking system 20 is illustrated and described herein including the secondary lid 37, it should be understood that in some embodiments the cooking system 20 includes only a primary lid 32 and does not include a secondary lid 37.

With reference again to FIG. 2, a condensation rim may be formed in the upper surface 34 of the housing 22, radially outward of the opening and/or container 24. During operation of the cooking system 20, condensation or other fluid circulating within the container 24 and/or hollowed interior 30 of the system 20 may collect within the condensation rim. In an embodiment, best shown in FIG. 1D, a condensation tray 53 is arranged in communication with the interior 30 of the container 24. The condensation tray 53, may, but need not, be arranged in fluid communication with the condensation rim of the upper surface 34. As shown, the condensation tray 53 is accessible via the back surface of the housing 22 and is configured to removably couple to the housing 22 to allow a user to empty the contents of the tray 53. When connected to the housing 22, the condensation tray 53 may be suitable to form a pressure tight seal with the housing 22.

Figure 7:
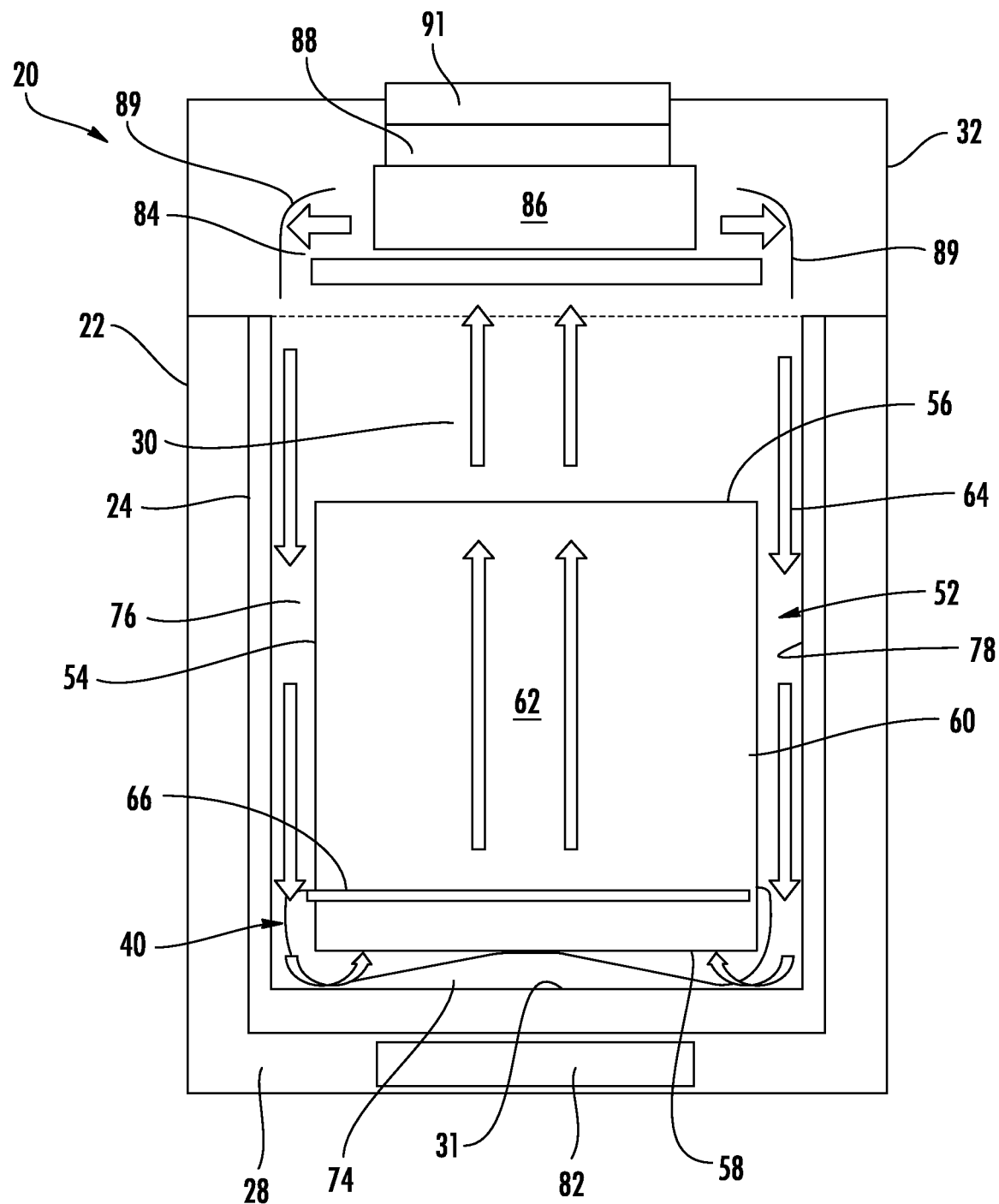
FIG. 7 is a schematic diagram of the cooking system according to an embodiment
Figure 8A:
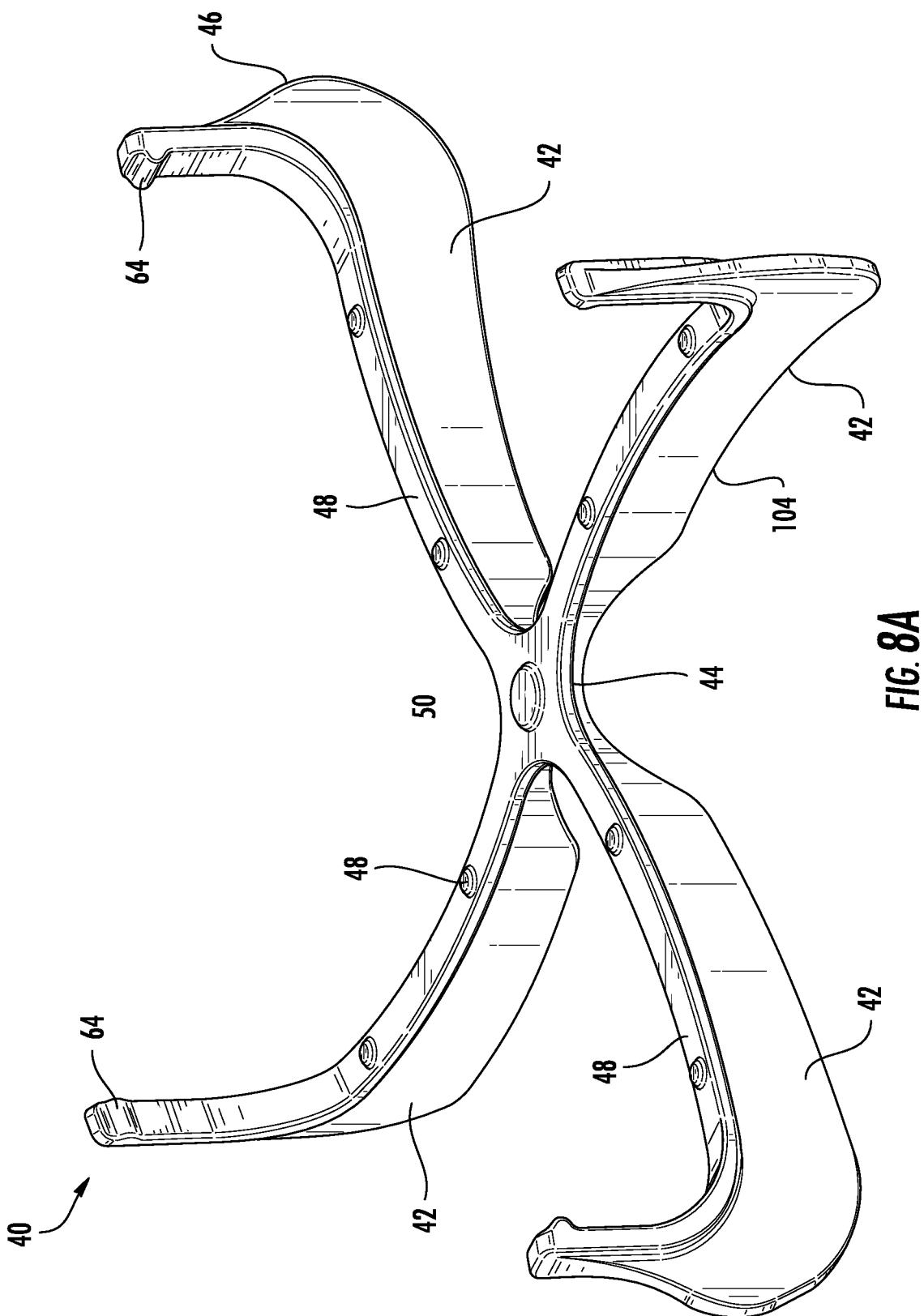
FIG. 8A is a perspective view of an air diffuser according to an embodiment.
Figure 8C:
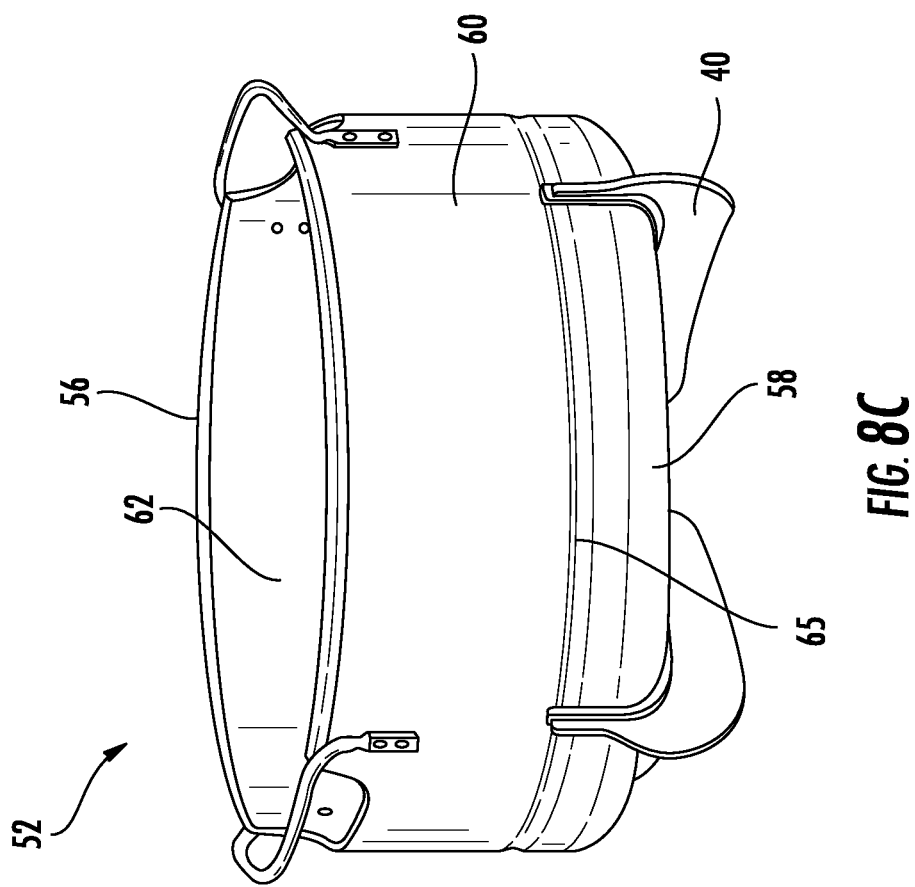
FIG. 8C is a perspective view of an insert with attached diffuser according to an embodiment.
Figure 8B:
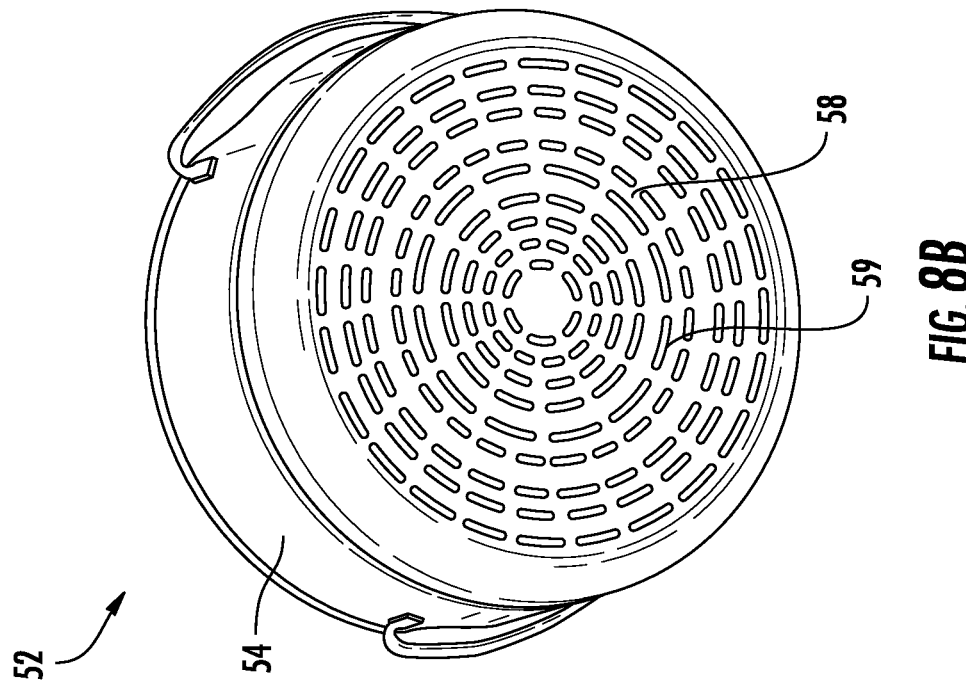
FIG. 8B perspective lower view of an insert according to an embodiment.
Figure 8D:
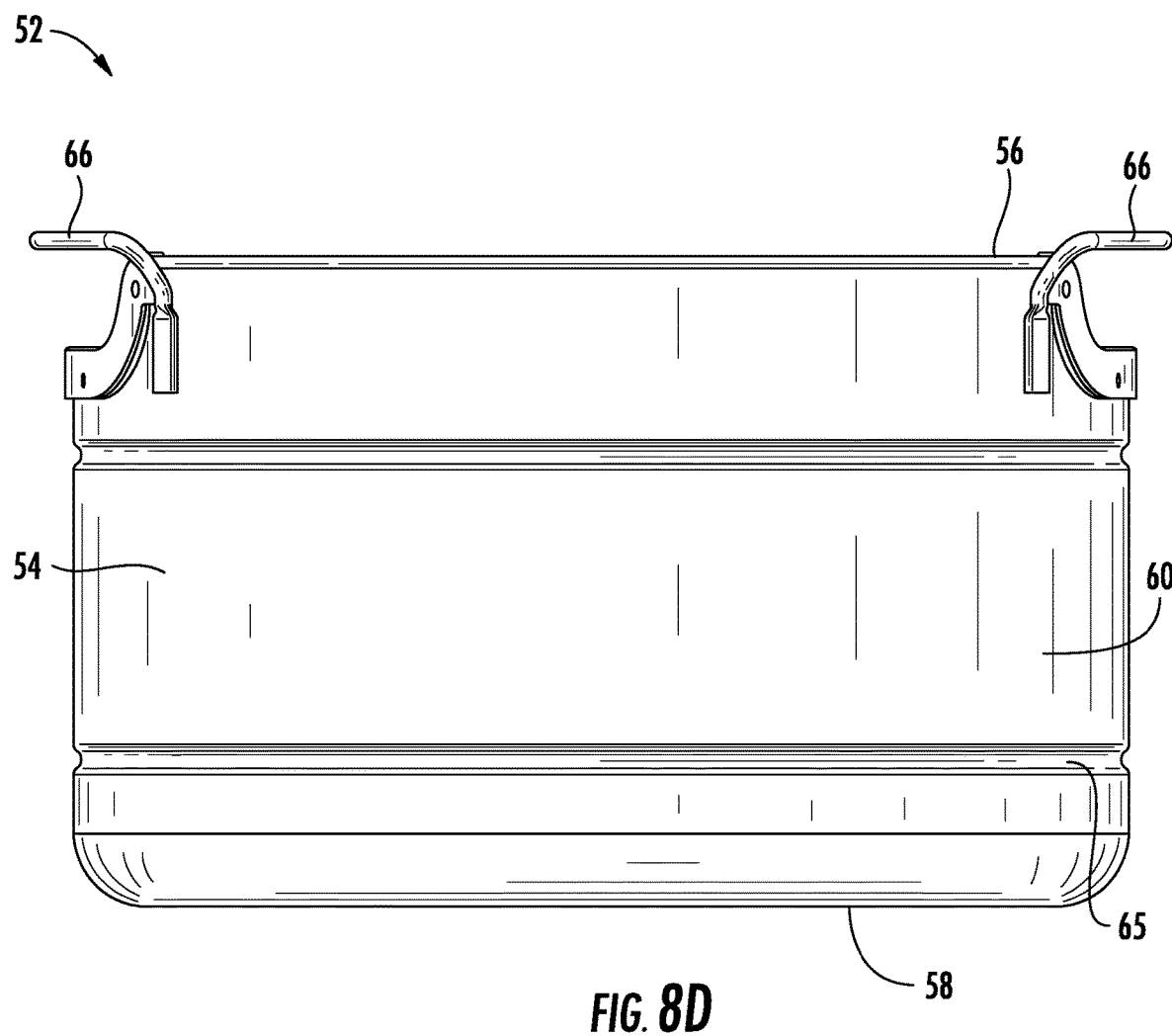
FIG. 8D is a side view of the insert according to an embodiment.
Figure 9:
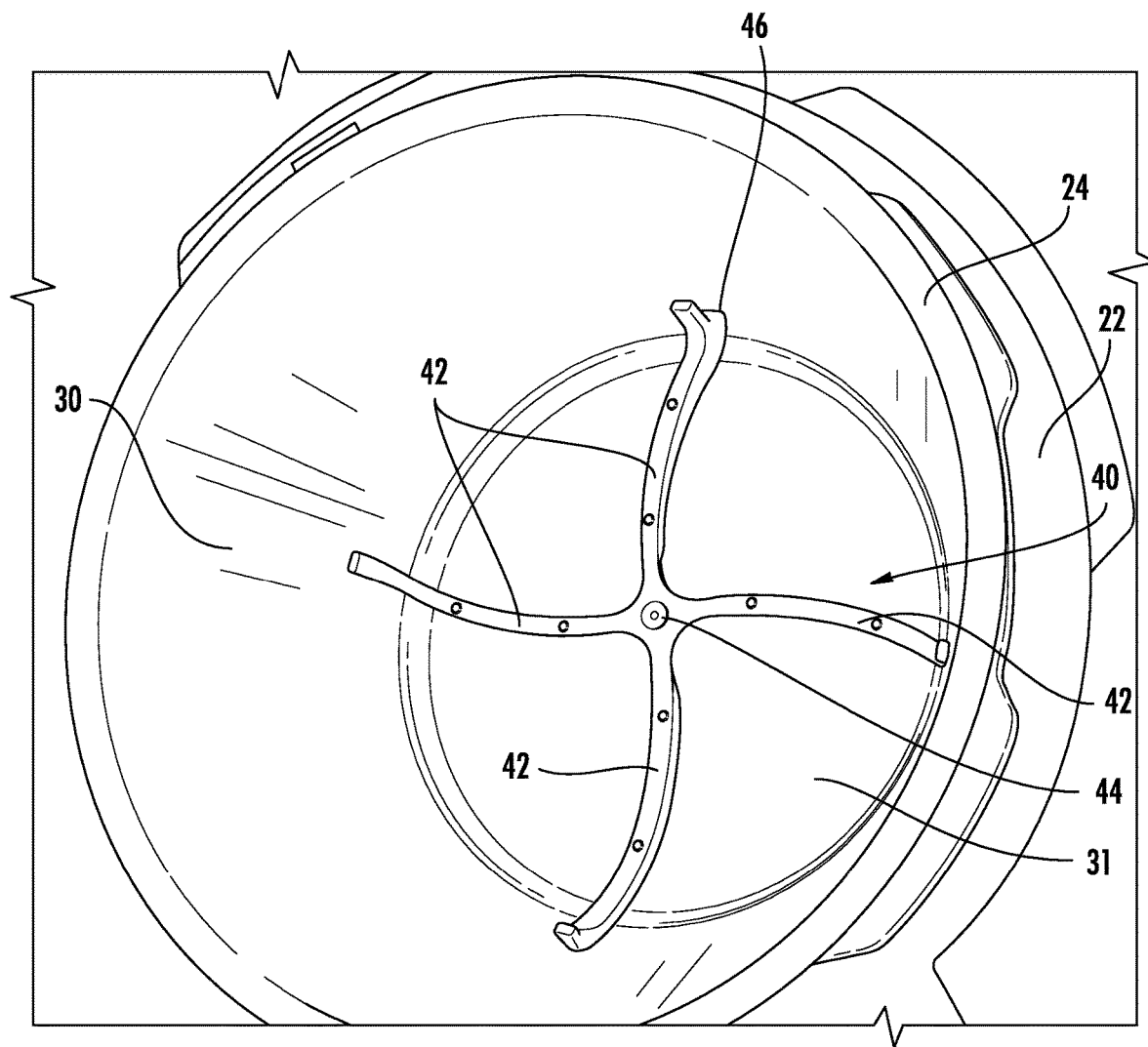
FIG. 9 is a perspective view of a diffuser received in a container according to an embodiment.

With specific reference now to FIG. 7, the cooking system 20 includes at least one first heating element 82 and at least one second heating element 84 configured to impart heat to the hollow interior and/or container 24 during various modes of operation of the cooking system 20. As shown, one or more first heating elements 82 may be disposed at the base 28 of the housing 22, generally adjacent the bottom 31 of the container 24; though, embodiments where one or more of the first heating elements 82 are arranged adjacent a side of the housing 22, in addition to or in place of the base 28 of the housing 22, are also contemplated herein. The second heating element 84 may be positioned generally at or above an upper extent of the container 24, proximate an upper opening of the container. However, in the exemplary non-limiting embodiment shown in the Figures, the second heating element 84 is disposed in the lid 32, and therefore completely outside of the container 24, above the upper extent thereof.

Figure 10:
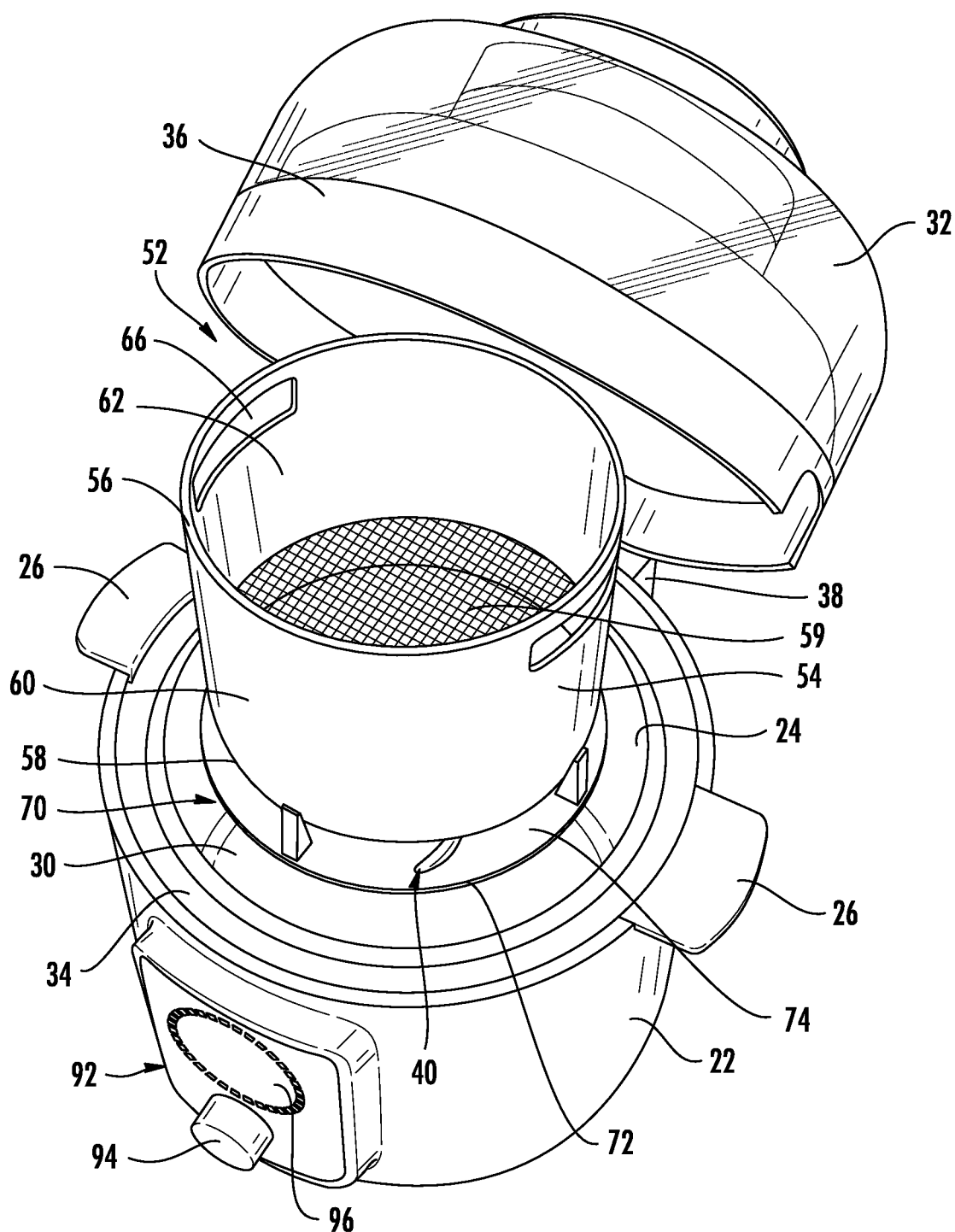
FIG. 10 is a perspective view of a cooking system having an insert positioned therein according to an embodiment.

With reference again to FIGS. 1A, 4, 5, and reference to FIG. 10, a control panel or user interface 92 of the cooking system 20 is positioned adjacent one or more sides of the housing 22. The control panel 92 includes one or more inputs 94 associated with energizing the one or more heating elements 82, 84 of the cooking system 20 and for selecting various modes of operation of the cooking system 20. One or more of the inputs 94 may include a light or other indicator to show that the respective input has been selected. The control panel 92 may additionally include a display 96 separate from and associated with the at least one input 94. However, embodiments where the display 96 is integrated into the at least one input 94 are also contemplated herein.

Figure 12:
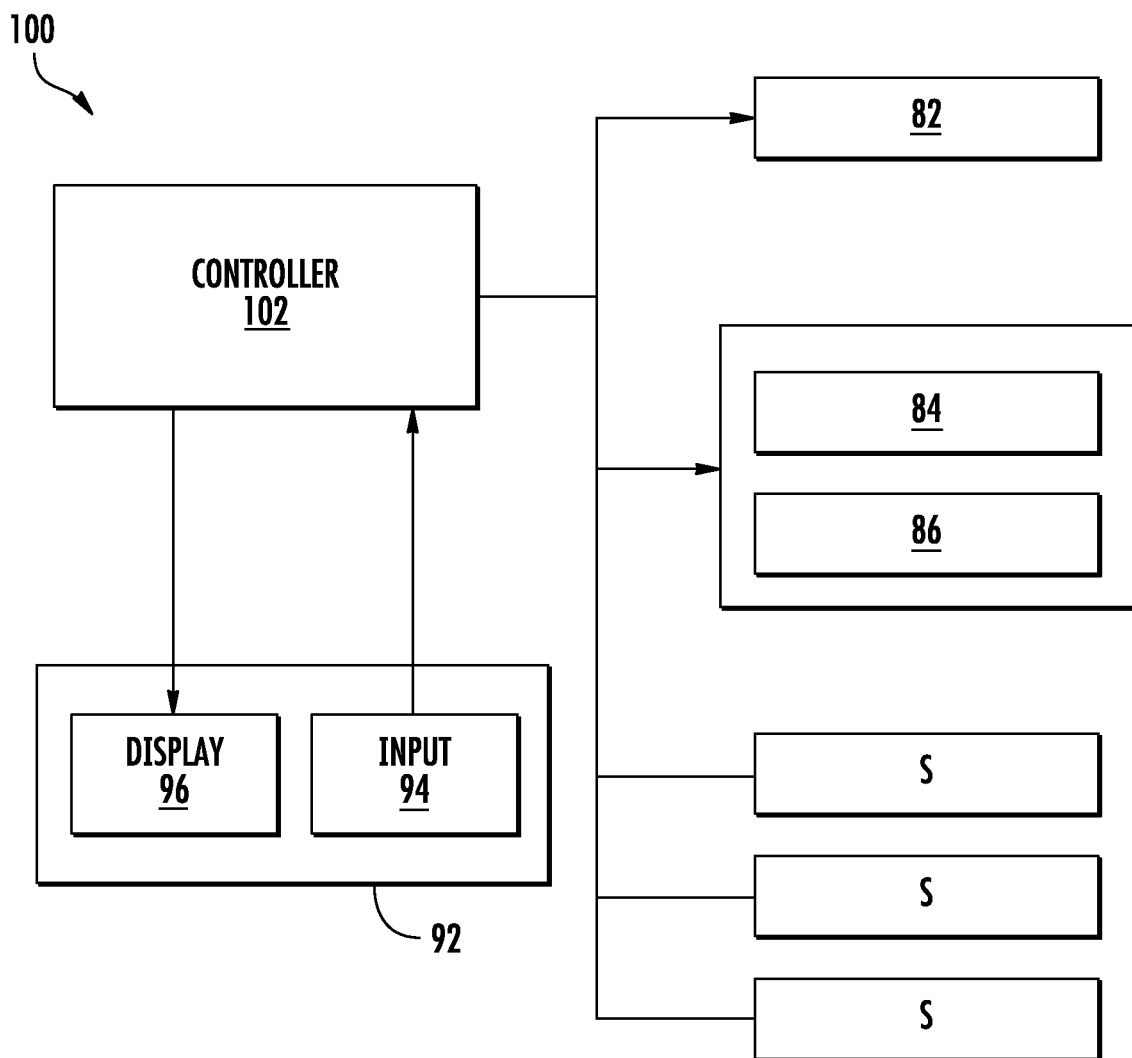
FIG. 12 is a block diagram illustrating a control path for a cooking system according to an embodiment.

Operation of the one or more inputs 94 will be described in more detail below. As shown in FIG. 12, a control system 100 of the cooking system 20 includes a controller or processor 102 for controlling operation of the heating elements 82, 84 (and air movement device 86 including the motor 88 and fan 90 associated therewith, which will be discussed in greater detail below), and in some embodiments for executing stored sequences of heating operation. The processor 102 is operably coupled to the control panel 92 and to the heating elements 82, 84 and the air movement device 86. In addition, in an exemplary embodiment, one or more sensors S for monitoring one or more parameters (such as temperature, pressure, lid configuration, etc.) associated with operation of the heating elements 82, 84 and/or lids 32, 37 may be arranged in communication with the processor 102. In an embodiment, a first temperature sensor extends from a bottom surface 108 of the liner 23 proximate the first heating element 82 and bottom surface of the container 24, and a second temperature sensor is located within the lid 32 proximate the second heating element 84. In such embodiments, the second sensor may be used, such as to monitor temperature for example, when the lid 32 is closed and the sensor S is arranged in fluid communication with the hollow interior 30 of the system 20. The first sensor may be used to monitor temperature in this manner, separately or in conjunction with the second temperature sensor.

In an embodiment, at least one input 94 on the control panel 92 is an on/off button which allows the user to activate or deactivate the control panel 92. When the control panel 92 is deactivated, none of the heating elements 82, 84 are energized. In an exemplary embodiment, the at least one input 94 is operable to select one or more manual modes of operation of at least one of the heating elements 82, 84. Alternatively, or in addition, at least one input 94 is operable to select a stored sequence of operation of at least one heating element 82, 84. In some cases, the stored sequences may be particularly well suited for a given method of food preparation and/or for particular ingredients or types of ingredients. The plurality of stored sequences associated with the at least one input 94 may be stored within a memory accessible by the processor 102. Alternatively, the plurality of stored sequences may be stored remotely from the cooking system 20, and may be accessed by the processor 102, such as via wireless communication for example.

In addition, a user may be able to enter a time associated with operation of the cooking system 20 in a desired manual mode. The time may be entered via the same input, or a separate input as used to select a mode of operation. Further in embodiments where the system 20 is in a mode configured to perform a stored sequence in response to selection of one of the inputs 94, the display 96 may indicate a time remaining on the display. Temperature and pressure parameters may also be entered via inputs 94.

The at least one input 94 may include a distinct start button intended to initiate operation in a desired mode, a distinct stop button to cease all operation, or a stop/start button intended to initiate and cease functions. Alternatively, the cooking system 20 may be operable to automatically start operation after a predetermined time has elapsed once an input has been selected and any necessary information has been provided to the control panel. Alternatively, one or more of the other inputs 94, such as the knob for example, may be operable, such as by pushing the knob towards the control panel 92, to start and stop operation of the cooking system 20, regardless of whether the system 20 is following a stored sequence or is in a manual mode.

The one or more inputs 94 are operable to initiate manual operation of the cooking system 20 in at least a first cooking mode and a second cooking mode. In an embodiment, the first cooking mode employs first heating element 82 to perform conductive cooking operations. Conductive cooking operations may generally be referred to as "wet cooking" operations, such as but not limited to pressure cooking, steam cooking, slow cooking, searing, and sautéing. To create a wet cooking environment the majority of the moisture within the container, i.e. liquid added to the container 24 or moisture released from the food within the container 24, is retained within the container as the food is cooked. Although during conductive cooking operations a minimal amount of air having moisture entrained therein may be vented from the system, such air is passively removed from the cooking enclosure. Similarly, the second cooking mode employs the second heating element 84 to perform convective heating operations. Convective heating operations may generally be referred to as "dry cooking operations," which include any cooking mode that creates a "dry cooking environment" within the container 24, such as but not limited to air frying, broiling, baking/roasting and dehydrating. To create a dry cooking environment, air and moisture are actively exhausted or vented from the cooking enclosure to outside the cooking system 20, thereby maintaining a minimum level of moisture within the container 24. Parameters associated with the various exemplary but non-limiting cooking modes are shown at FIG. 19.

As is noted above, the first cooking mode of the cooking system 20 includes pressure cooking. In such embodiments, the secondary lid 37 is affixed to the container 24 or housing 22 to form a pressure-tight, sealed enclosure with the container 24. During operation in the pressure cooker mode, the controller 102 initiates operation of the first heating element 82, causing the temperature and therefore the pressure, within the enclosure formed by the container 24 and the secondary lid 37 to rise. During operation in the pressure cooker mode, the second heating element 84 disposed within the primary lid 32 is typically not energized. In an embodiment, the cooking device 20 may include a sensor S configured to monitor the pressure within the enclosure. Upon detection that the pressure is at or exceeds a predetermined threshold, the controller 102 may de-energize the heating element 82 until the pressure within the enclosure has returned to an acceptable level. Alternatively, or in addition, a pressure relief valve 51 (see FIG. 6A) may be formed in the secondary lid 37, and may open to reduce the pressure within the enclosure to below the threshold. The pressure relief valve 51 may be configured to open automatically when the pressure is above the threshold, or the valve 51 may be coupled to the controller 102 and may be operable in response to a signal generated by the controller 102, for example in response to sensing a pressure above the threshold. In embodiments where the cooking system 20 is operable in a slow cooking mode, but not a pressure cooking mode, the liner 23 of the housing 22 may be formed from a light weight, cost effective material, such as aluminum for example. However, in embodiments where the cooking system 20 is operable in a pressure cooking mode, the liner 23 should be formed from a more rigid material capable of withstanding the pressure build up within the container 24. As is noted above, the first cooking mode of the cooking system 20 also includes slow cooking, steaming, searing, and sautéing. When the cooking device 20 is operated in one of these non-pressure modes, either the secondary lid 37 may be affixed to the container 24 or housing 22 or the primary lid 32 may simply be closed.

During slow cooking, steaming, searing, and sautéing (or other conductive cooking means that do not involve "pressure cooking"), the controller 102 initiates operation of the first heating element 82, causing the temperature within the container 24 and at the bottom surface thereof to increase. Upon detection that the temperature of the chamber 30 is equal to or exceeds a predetermined threshold, the controller 102 may de-energize the heating element 82 until the temperature has returned to an acceptable level. Such de-energization or power termination to the heating elements 82 and 84 based on detection of unsafe conditions by temperature or pressure sensors S will be discussed in greater detail below.

As previously suggested, the at least one input 94 is also usable to select operation of the cooking device 20 in a second cooking mode that employs convective cooking such as air frying. In an exemplary, non-limiting embodiment, air frying in the system 20 involves the use of various components such as the fan 90, and a basket 52 and diffuser 40.

With reference now to FIGS. 8A-D and 9, an air diffuser 40 is shown. The diffuser 40 is an optional system component that may benefit air circulation during the air frying mode. The diffuser is positionable anywhere in the hollow interior 30 (though typically near the bottom). In an exemplary, non-limiting embodiment, the diffuser is positioned in contact with a bottom surface 31 of the container 24, and, as will be discussed in greater detail below, used in conjunction with an insert 52.

As shown in the Figures, the air diffuser 40 may include a plurality of vanes 42 spaced about a center body 44. Each of the plurality of vanes 42 is configured to impart swirl to an air flow circulating through the container 24. In the illustrated, non-limiting embodiment, the air diffuser 40 includes four vanes 42. However, embodiments where the air diffuser 40 includes one vane, two vanes, three vanes, or more than four vanes are also within the scope of the disclosure. Further, although the vanes 42 are illustrated as being substantially identical and equidistantly spaced about the center body 44, embodiments where a configuration of one or more of the vanes 42 varies and/or the spacing between adjacent vanes 42 varies are also contemplated herein. In an embodiment, each of the vanes 42 of the air diffuser 40 has a radius of curvature such that the vanes 42 curve generally from the center body 44 of the air diffuser outwardly. In addition, the vanes 42 of the air diffuser 40 extend generally perpendicularly in an upward direction from the bottom surface 31 of the container 24, and a lower extent of the vanes 42 generally lengthens as the vanes move out from the center body 44 towards the outer edge 46. However, an air diffuser 40 including one or more vanes having another configuration are also within the scope of the disclosure.

In an exemplary, non-limiting embodiment, the upper surface 48 and the distal ends 46 of the vanes 42 cooperate to define an area 50 within which the insert 52 may be removably mounted. With reference to FIGS. 8A-D and 9, the insert 52 includes a body 54 having a first, open end 56, second, aperture end 58, and at least one sidewall 60 extending between the first end 56 and second end 58 to define a hollow interior or chamber 62 defined by the body 54. The first end 56 is generally open to provide access for positioning one or more food items within the chamber 62. The second end 58 of the body 54 is partially closed to retain one or more food items within the chamber 62. In an exemplary, non-limiting embodiment, the closed second end 58 of the body 54 defines a plurality of apertures 59 (see FIG. 8B) to allow air, heat, and/or steam flowing within/ through the interior 33 of the container 24 may pass through the apertures 59 in the end 58 to cook one or more food items within the chamber 62 of the body 54.

When the insert 52 is positioned within the area 50, in contact with the upper surface 48 of the air diffuser 40, and the insert 52 with air diffuser 40 is disposed within the interior 33 of the container 24, the bottom surface 58 of the insert 52 is positioned to be offset from the bottom surface 31 of the container 24. The offset spacing is via presence of the vanes 42 between the surfaces 58 and 31, allowing air moving through the system 20 to flow underneath the insert 52. In an embodiment, a tab 64, best shown in FIG. 8A, protrudes from the upwardly extending portion of each vane 42. As shown, the tabs 64 generally protrude inwardly, towards the center body 44 of the air diffuser 40. The tabs 64 may be sized and contoured to cooperate with a ridge or groove 65 formed in the exterior surface of the insert 52 to retain the insert 52 in position adjacent the air diffuser 40. Of course, embodiments wherein the diffuser 40 is integrally formed with either the insert 52 or bottom surface 31 and/or side surfaces of the container 24 are also contemplated.

Although the body 54 of the inserts 52 illustrated are shown having a single chamber, embodiments where the body 54 includes a plurality of chambers are also contemplated herein. As previously described, the closed second end 58 of the body 54 has a generally porous structure, which may also be formed via mesh or wire for example (see FIG. 10), so that heat and/or steam flowing through the interior 33 of the container 24 may pass through the openings in the porous structure to cook one or more food items within the chamber 62 of the body 54. One or more handles 66 may be associated with the body 54 to allow a user to easily grasp the insert 50. In the illustrated, non-limiting embodiment, the body 54 includes two handles 66 extending from the sidewall 60, or alternatively, integrally formed into the sidewall 60 of the body 54 as openings. However, any suitable configuration of the body 54 and/or handles 66 is within the scope of the disclosure. Such configurations may include removable handles.

In embodiments where the air diffuser 40 and the insert 52 may be integrally formed, as shown in FIG. 10, the insert 52 may additionally include a base 70 having an upper surface 72 and a lower surface (not shown). The base 70 may have a size and/or shape generally complementary to the body 54, and both the base 70 and body 54 may have a similar shape to the interior 33 of the container 24. In the illustrated, non-limiting embodiment, the interior 33, and the insert 52 are both generally cylindrical in shape.

The base 70 is generally offset from the second end 58 of the body 54 by a distance. As a result, a gap or clearance 74 defining a fluid flow path is formed between at least a portion of an upper surface 72 of the base 70 and the second end 58 of the body 54. In the illustrated, non-limiting embodiment, the lower surface (not shown) of the base 70 of the insert 52 has a generally planar configuration for directly contacting an adjacent supporting surface of the container 24, such as the bottom surface 31, when the insert 52 is installed therein. In embodiments where the supporting surface of the container 24 does not have a planar configuration, the configuration of the lower surface of the base 70 will be complementary to the supporting surface.

As previously described, in an embodiment, the air diffuser 40 comprising one or more vanes configured to impart swirl to air moving through the clearance 74 towards the second end 58 of the body 54 may be formed in the upper surface 72 of the base 70. In such embodiments, the configuration of the air diffuser 40 may be the same, or alternatively, different than in embodiments where the air diffuser 40 is a separate component. As shown, the vanes 42 of the air diffuser 40 integrally formed with the insert 52 have a radius of curvature such that the vanes 42 curve generally from an outer edge of the base 70 towards a center thereof. In addition, the vanes 42 of the air diffuser 40 extend generally perpendicular to the upper surface 72, and the height of the vanes 42 measured perpendicular to the upper surface 72 increases from the outer edge of the base 70 towards the center. Although the air diffuser 40 is described as being integrally formed with the insert 52, in other embodiments, all or a portion of the air diffuser may alternatively, or in addition, be integrally formed with a portion of the container 24.

Regardless of whether the insert 52 is integrally formed with or coupled to the air diffuser 40, when the insert 52 and air diffuser 40 are arranged within the interior 33 of the container 24, an annulus 76 is formed between an inner surface 78 of the container 24 and the sidewalls 60 of the body 54 (see FIG. 7). Further, in an exemplary non-limiting embodiment the height of the insert 52, when installed within the container 24 with the air diffuser 40, may be generally equal to or less than height of the container 24. In embodiments where the cooking system 20 includes a secondary lid 37, either the primary lid 32 or the secondary lid 37 may be used, i.e. coupled to the upper surface 34 of the housing 22 when the insert 52 is positioned generally within the hollow interior 30 of the system 20 or specifically within the interior 33 of the container 24.

It should be appreciated that the insert 52 may also be received directly in the hollow interior 30 as opposed to within the container 24 within the hollow interior 30. That is, the insert 52 (and diffuser 40) may be disposed in the system without the container 24, and food may be cooked in the insert 52 in accordance with of the second mode, convective cooking functions.

Figure 11:
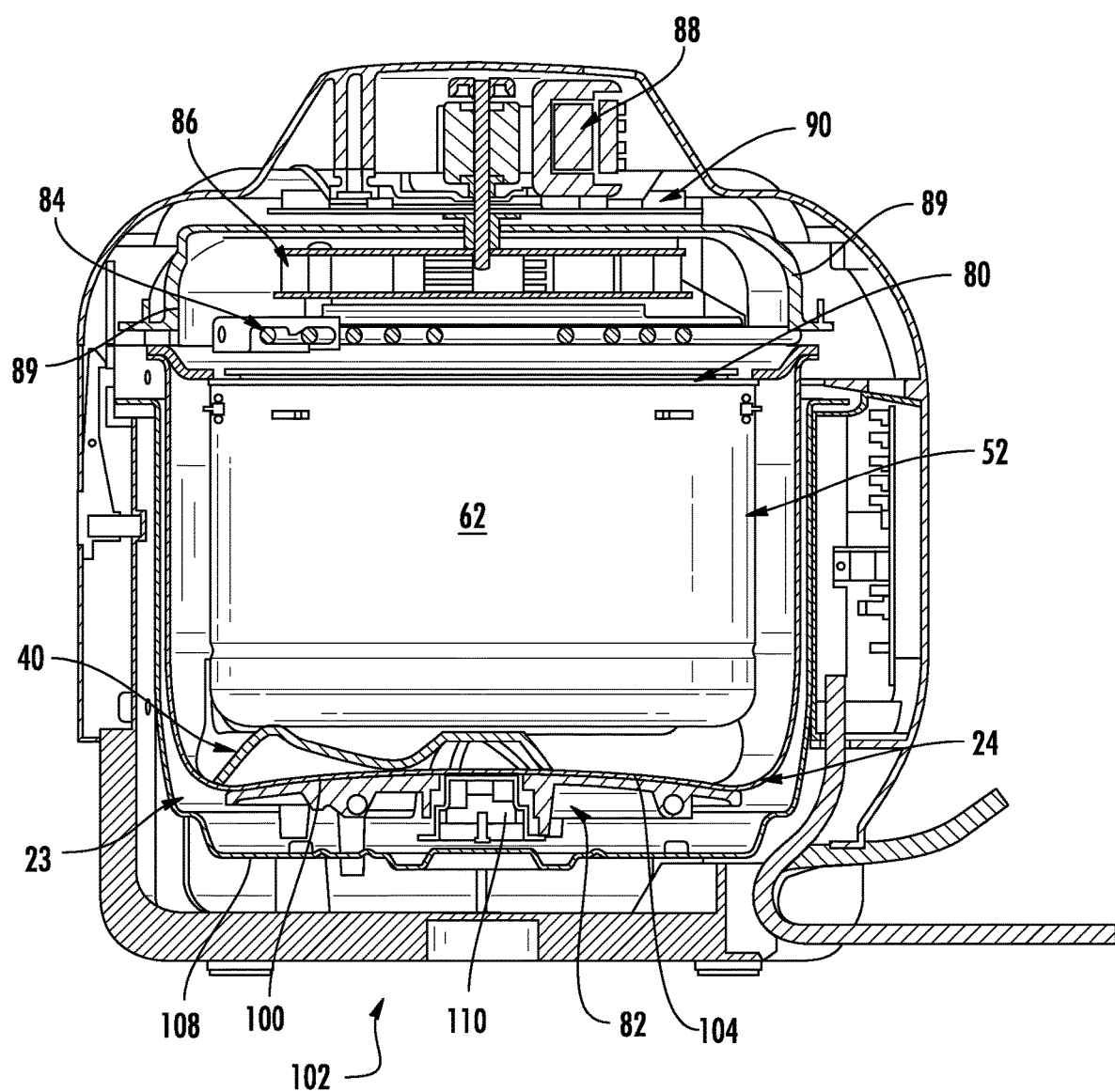
FIG. 11 is a cross-sectional view of the cooking system according to an embodiment.

With further reference to second, convective cooking mode functions (particularly air frying modes), the second heating element 84 is configured to heat air as it passes therethrough via an air movement device 86, such as a fan for example. In embodiments where the insert 52 is arranged within the interior 33 of the container 24, the air movement device 86 draws air from the center of the insert 52, and moves it across the second heating element 84 before forcing the heated air through the annulus 76 between the container 24 and the insert 52 towards the clearance 74 formed between the bottom 58 of the insert and the bottom surface 31 of the container 23 (the arrows in FIG. 7 show exemplary air flow through the system). This air movement may be facilitated via air guides such as a skirt/air guide 89 that creates a non-sealing air guide for air into the annulus 76. In the illustrated, non-limiting embodiment of FIGS. 7 and 11, the air movement device 86 is driven by a motor 88 having a separate cooling mechanism 90 coupled thereto. In an embodiment, a vent 91 is formed in the primary lid for exhausting hot air generated by operation of either the air movement device 86, the motor 88, or the separate cooling mechanism 90 to the exterior of the cooking system 20. However, it should be understood that the second heating element 84 and the air movement device 86 may also be used to circulate air through the enclosure defined between the container 24 and the primary lid 32 when the insert 52 and/or air diffuser 40 are not arranged within the container 24. As is shown in the exemplary embodiments of the Figures, the at least one second heating element 84 is disposed within the primary lid 32. In an embodiment, the second heating element 84 has a diameter substantially equal to the diameter of the body 54 of the insert 52. However, embodiments where the second heating element 84 has a diameter smaller than or greater than the diameter of the body 54 of the insert 52 are also contemplated herein.

When utilizing the second heating element 84 in the air fryer mode, the controller 102 initiates operation of the second heating element 84 and the air movement device 86 to circulate the hot air represented by the arrows in FIG. 7 through the enclosure formed between the container 24 and the lid 32. During operation in the air fryer mode, the first heating element 82 is generally not energized. However, embodiments where the first heating element 82 is energized are also within the scope of the disclosure.

The air movement device 86 draws air upward through the adjacent heating element 84 and expels the hot air outwardly towards the guide 89 (which, in an exemplary embodiment, actually surrounds the fan 86). The guide 89 deflects the air downwardly towards the annulus 76 along the sides of the container 24 (again, please see the arrows in FIG. 7). The air travels down through the annulus 76 (still by actuation of the fan 86) until it is deflected off the bottom surface 31 of the container 24 and drawn up by the fan 86 into the clearance 74 up towards the diffuser 40 and end 58 of the insert 52 with the aperture pattern 59. The hot air flows over and between the plurality of vanes 42 of the air diffuser 40, which impart a rotational motion to the hot air, thereby creating a vortex as the air is drawn through the apertures 59 and into the chamber 62 of the body 54 by the air movement device 86. After traversing the chamber 62, the air is drawn back up through the heating element 84 and into the fan 86 for further circulation.

As the air circulates through the chamber 62 in the manner described above, the hot air cooks and forms a crispy outer layer on the food items disposed therein as a result of the Maillard effect. In an embodiment, a liquid, such as oil or fat, is contained within the enclosure, such as adjacent the bottom surface 31 of the container 24. The liquid may be added to the container 24 prior to operation in the air fry mode, or alternatively, may be produced as a residual material as the hot air passes over the food within the chamber 62. In embodiments where a liquid is disposed at the bottom of the container 24, as the air circulates through the interior 30 of the container 24, a portion of the liquid becomes entrained in the air flow and is heated.

Figure 3C:
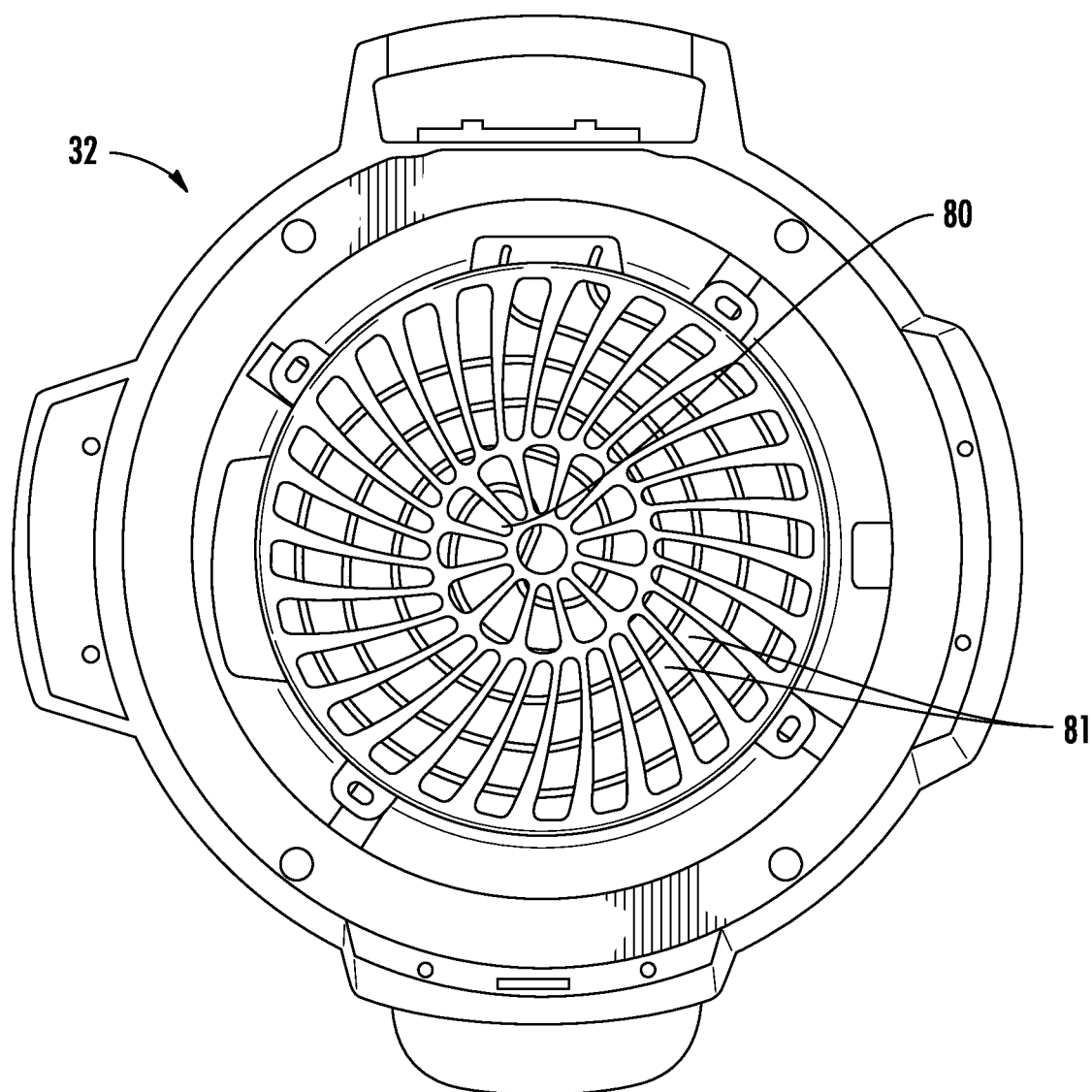
FIG. 3C is a lower view of a lid of the cooking system according to an embodiment.

As is best shown in FIG. 3C, in an exemplary embodiment the lid 32 includes a heater/fan cover 80 that protects a user from the heating element 84 and fan 86, and protects the heating element 84 and fan 86 from the areas 31,33,64 where food is cooked. The cover 80 may be included in embodiments of the cooking system 20 including only a primary lid 32, or alternatively, in embodiments including both the primary and secondary lids 32, 37. In the illustrated, non-limiting embodiment, the cover 80 is formed from a nano ceramic coated and is mounted to the primary lid 32, such as via one or more fasteners for example. In such embodiments, when the primary lid 32 is in the closed position, the cover 80 is arranged generally above the first open end of the container 24. The cover 80 has a plurality of openings 81 formed therein to allow hot air circulating within the chamber of the container 24 to pass there through.

In another convection cooking embodiment, the second cooking mode of the cooking system 20 includes a dehydrator mode, such as used to make jerky for example. In such embodiments, the primary lid 32, is typically affixed to the container 24 or housing 22, though the secondary lid 32 may also be used. When the cooking device 20 is operated in the dehydration mode, the air diffuser 40 and/or insert 52 may, but need not be, positioned within the interior 30 of the container 24. During operation in the dehydrator mode, air is configured to circulate through the container 24 in a manner similar to the air fryer mode.

In an embodiment, the air movement device 86 of the cooking system 20 is a variable speed fan operable at a plurality of rotational speeds. In an embodiment, the operational speed of the air movement device 86 may vary based on the cooking mode selected (see the exemplary, non-limiting parameters and speeds set forth in FIG. 19). For example, the speed of the air movement device 86 during operation in an air fryer mode may be different than the speed of the air movement device during operation in a dehydrator mode. The operational speed of the air movement device 86 may be controlled by the controller 102 in response to one or more inputs 94, including selection of a cooking mode. However, the controller 102 may also be configured to adjust the operational speed of the air movement device 86, or alternatively, the power supplied to the one or more heating elements 82, 84, to control the temperature and/or pressure within the hollow interior 30 of the container 24.

The first and second heating elements 82, 84 are operable independently or in combination to apply one or more predetermined power settings to cook the food products within the container 24 and/or insert 52. In operation, the heating elements 82, 84 are capable of cooking the food products independent of the loading of the food products. In other words, the heating elements 82, 84 are capable of cooking the food products independent of the amount of food products within the container 24.

In some embodiments, the cooking system 20 is operable in more than two cooking modes. For example, the cooking system 20 may be independently operable in any of a slow cooking mode, a pressure cooking mode, an air fryer mode, and a dehydrator mode. Alternatively, or in addition, the at least one input 94 may be used to select operation of the cooking device 20 in a cooking mode that functions as a combination of two or more cooking modes. In such embodiments, the controller 102 may execute a stored sequence where the first heating mechanism 82 is operated during a first portion of the sequence and the second heating mechanism 84 and air movement device 86 are operated during a second portion of the sequence. For example, in the combination mode, a food item, such as a chicken for example, may be slowly cooked or pressure cooked via operation of the first heating element 82. Then, the second heating element 84 and the air movement device 86 may be operated to air fry the chicken to achieve a crispy exterior layer. However, the embodiments described herein are intended as an example only and any sequence of operation combining both the first and second heating elements is contemplated herein. When operated in a combination of two or more cooking modes, such as a pressure cooker and an air fryer, the food need not be removed from the hollow interior 30, or more specifically the container 24, or even more specifically from the chamber 62 of the insert 52 during such a transition.

As is alluded to above, the container 24 may be usable in both the first and second cooking modes. In an exemplary embodiment, convective cooking (first mode), and more specifically air frying is possible in a container (such as container 24) that is deformable for use in a pressure cooking environment (second mode). Containers in which pressure cooking occurs may deform in response to pressure conditions within the pot during cooking. A "domed" or curved shape 100 in a bottom surface 102 (see FIG. 11) of pressure pot such as container 24 may also be employed to handle pressure conditions and the deformity that may result therefrom. Accordingly, since the container 24 may also be used as an air frying chamber, exemplary embodiments of air frying components such as the insert 52 and diffuser 40 may be configured for use in pressure cooking environments. For example, the diffuser 40 may include a curved or sloped bottom surface 104 that conforms to the domed/curved/sloped shape 100 of the bottom surface 102 of the container 24. Indeed, the bottom surface 104 of the diffuser 40 may be curved or sloped to conform to a potentially domed surface of any container (again, such as container 24) used in for wet cooking modes such as but not limited to pressure, steam, slow cooking.

In accordance with the above, the insert 52 may be placed in the container 24 with food to be cooked in the first and second modes consecutively. For example, the insert 52 may be placed in the container 24 and food may be placed within the insert for cooking in a first, conductive modes such as pressure or slow cooking. The system 20 may then be switched into the second, convective mode, and the food still contained in the insert 52 contained in the container 24 can be cooked in accordance with a convection heating function. In an exemplary embedment involving pressure cooking and air frying, such a process would involve placing food in the insert 52 and placing the insert in the container 24. The secondary lid 37 would be affixed to the system 20 and pressure cooking would/could occur. Once the pressure cooking is complete, the secondary lid 37 would be removed and replaced with a closed primary lid 32. The food may then be air fried, with all the cooking occurring within the insert 52 disposed within the container 24. Of course, while food would most commonly be cooked first in a conductive/wet mode followed by a convective/dry mode, the system 20 is certainly capable of cooking food first in a convective/dry mode followed by a conductive/wet mode.

Figure 13:
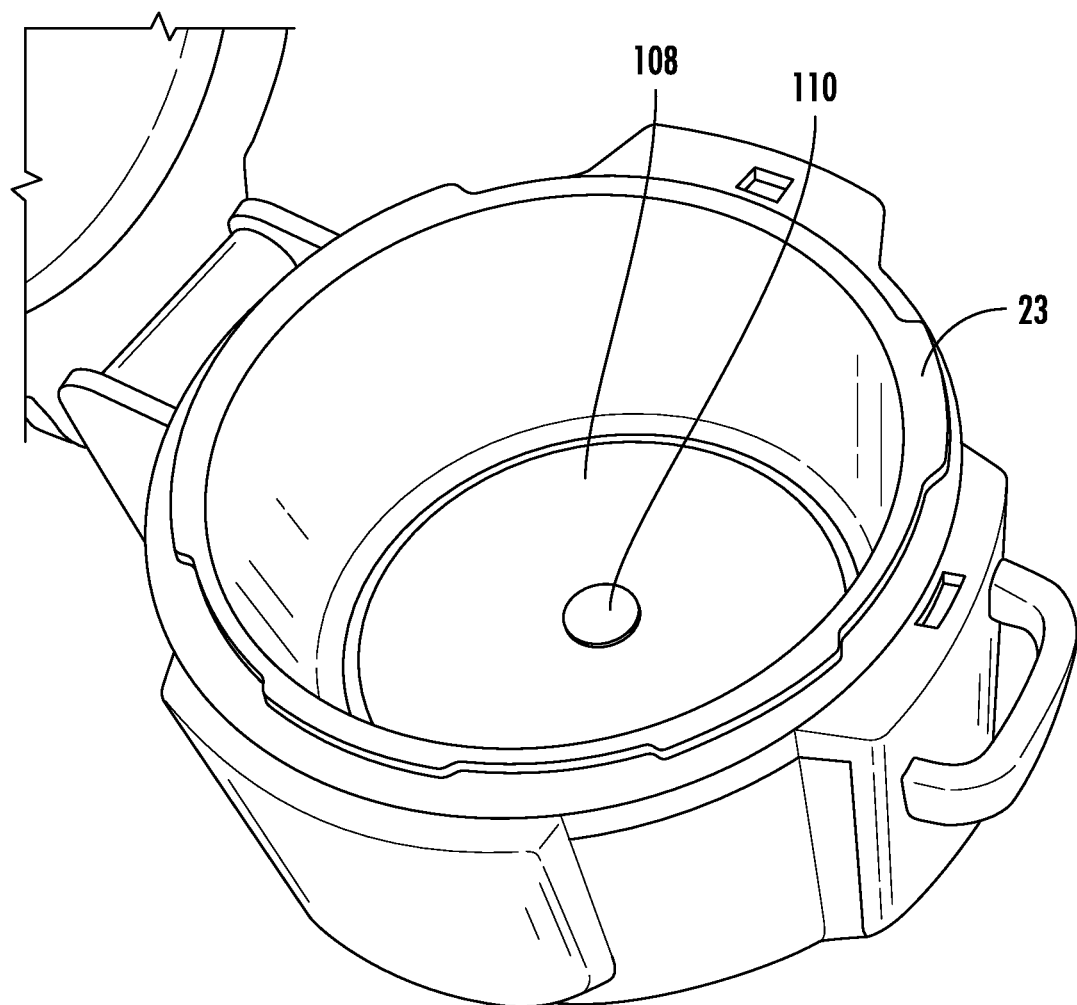
FIG. 13 is a perspective view of the cooking system having a lid in an open position according to an embodiment.

In some embodiments, it also may be useful to be able to detect presence of the container 24 in the system 20 so operation of the various cooking modes can occur effectively and safely. For example, as shown in FIG. 13 a lower surface 108 of the hollow interior 30 may support a container detection sensor 110 (such as but not limited to a depression or plunger sensor). One or more depression sensors used for container detection and disposed along the vertical extents (i.e. sides) of the liner 23, as well as one or more optical sensors anywhere in the hollow interior 30, are also contemplated.

Referring now to FIGS. 14-18, a reversible insert 112 receivable in any or all of the hollow interior 30, container 24, and insert 52. In the non-limiting exemplary embodiment shown in the Figures, the insert 112 is received in the container 24. The insert includes a food supporting body or grate 114 with a first body surface 116 and an opposing second body surface 118. The insert 112 also includes first surface legs 120 and second surface legs 122.

Figure 14:
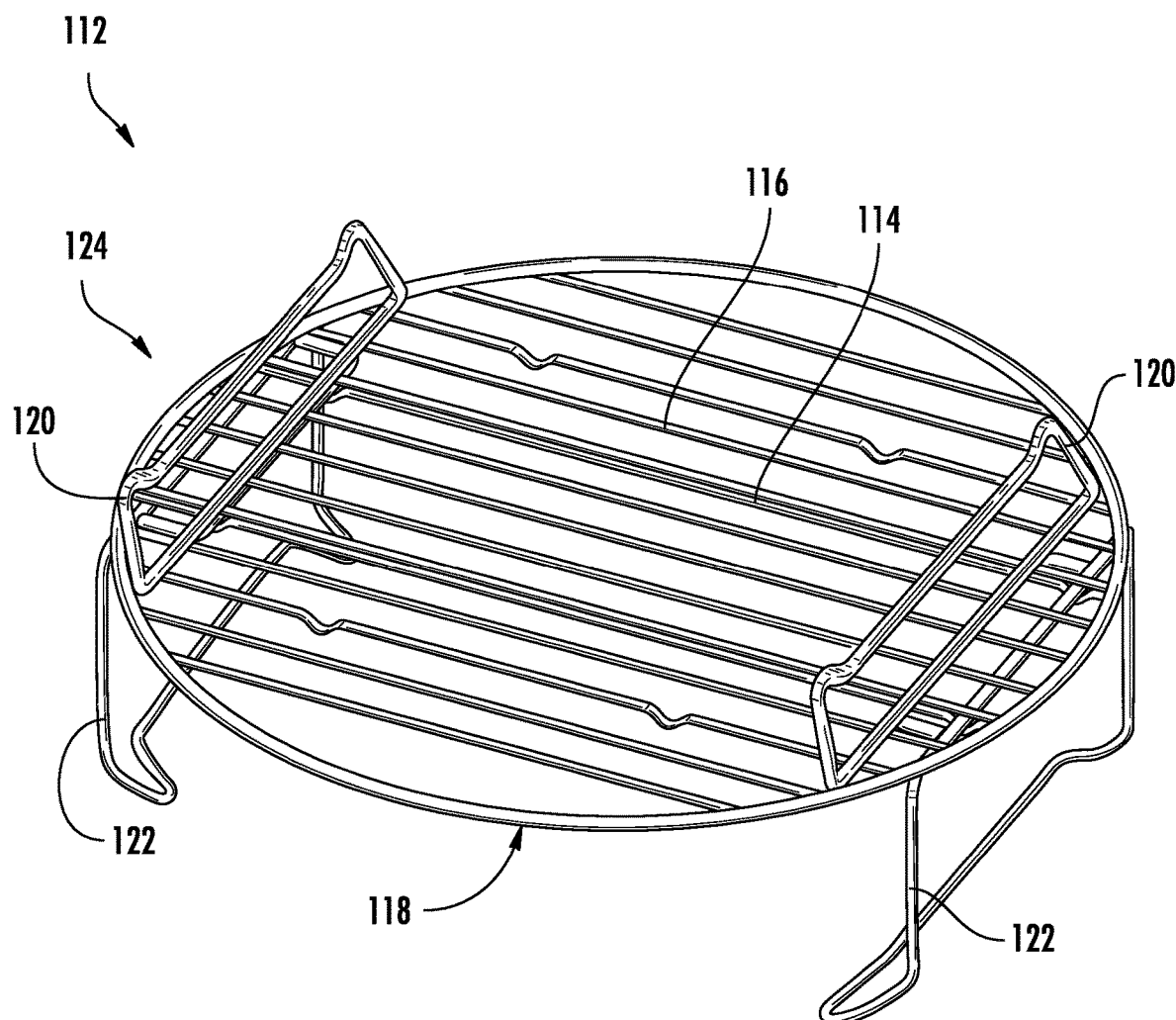
FIG. 14 is a perspective view of a cooking rack for use in a cooking system according to an embodiment.
Figure 15:
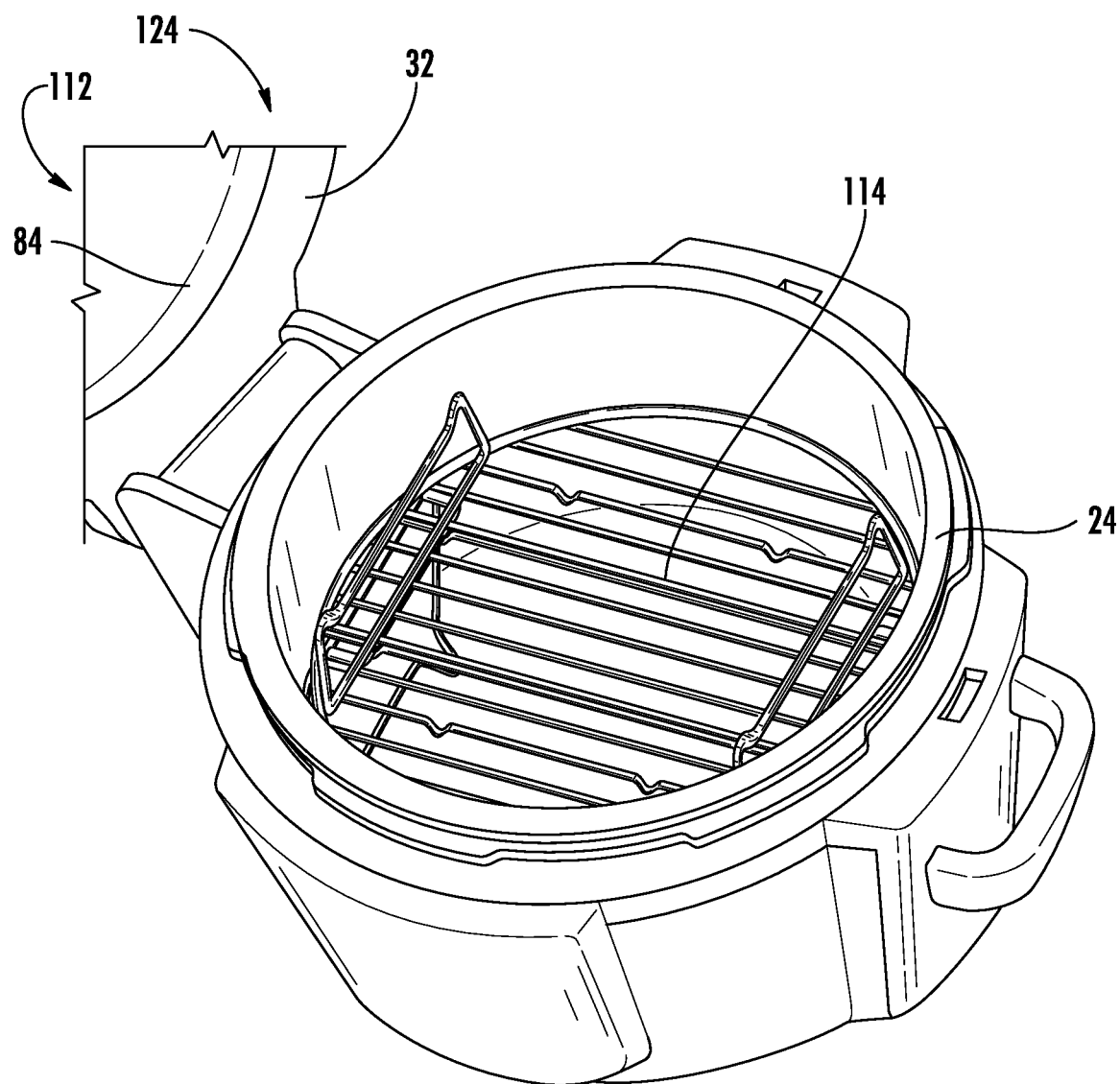
FIG. 15 is a perspective view of the cooking rack received in the cooking system according to an embodiment.
Figure 16:
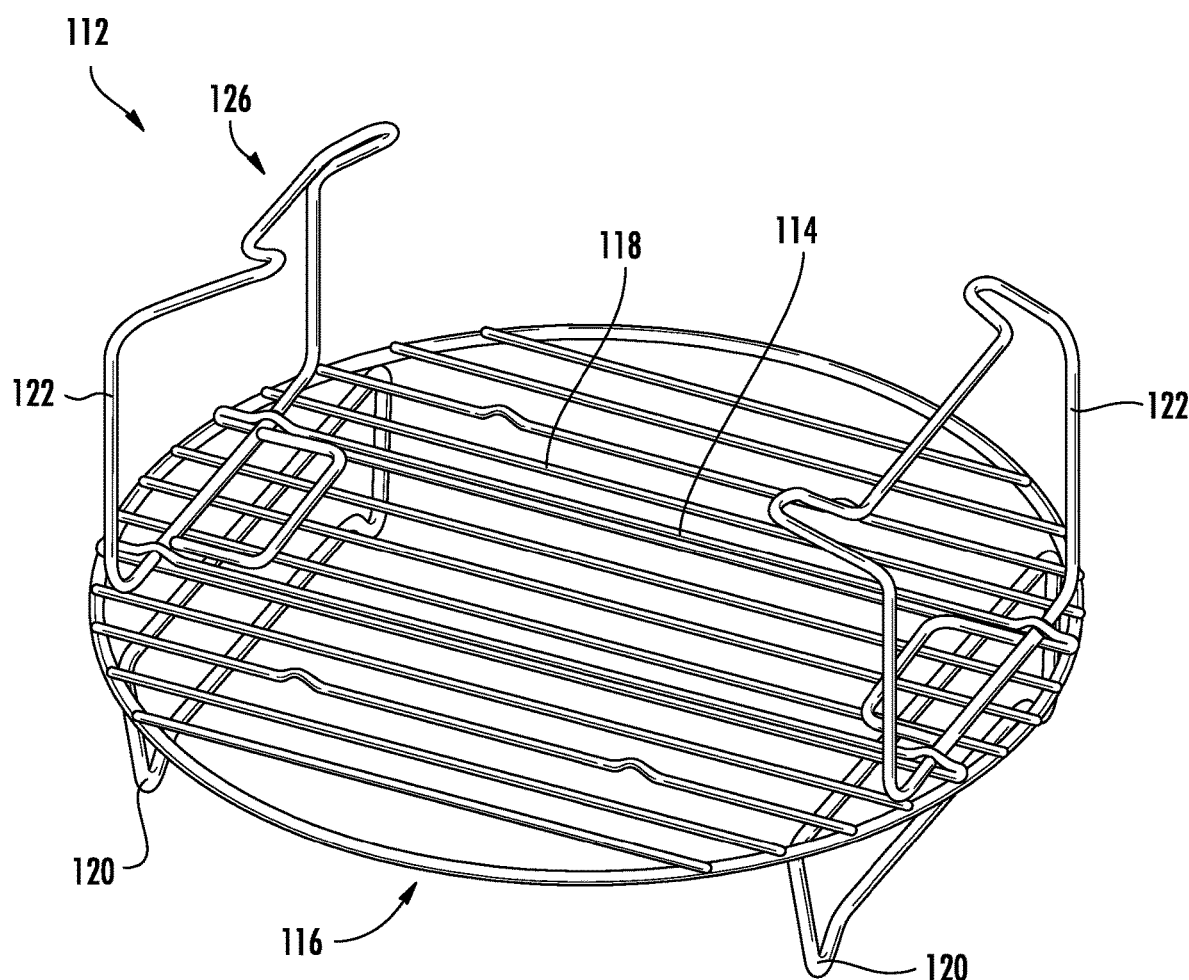
FIG. 16 is another perspective view of the cooking rack for use in the cooking system according to an embodiment.
Figure 17:
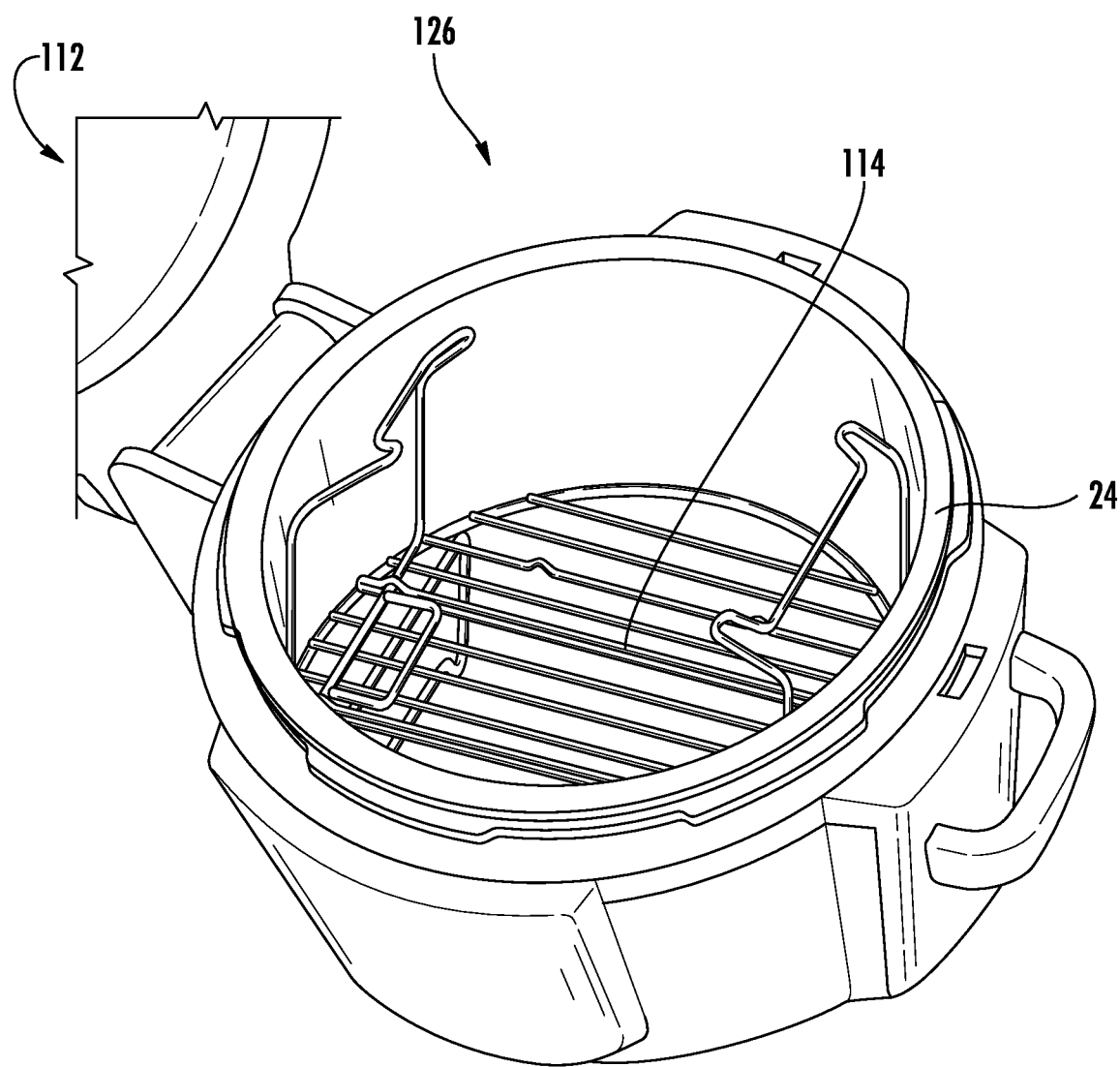
FIG. 17 is a perspective view of the cooking rack received in the cooking system according to an embodiment.

The insert 112 is reversible into two different food holding/support configurations via a 180 degree rotation. The first, greater clearance configuration 124 is best shown in FIGS. 14 and 15. The second, lesser clearance configuration 126 is best shown in FIGS. 16 and 17. As shown, the second surface legs 122 have a greater length than the first surface legs 120. This allows the grate 114 to be positioned a relatively greater distance from a surface on which the insert 112 rests in the first configuration 124 than the second configuration 126. As shown in FIG. 15, in an exemplary embodiment the insert 112 rests on the lower surface of the container 24. The first, greater clearance configuration positions the grate 114 (and any food thereon) a relatively greater distance from the first heater 82 than in the second configuration. Such positioning of the food may be beneficial in convective heating modes for a few reasons.

First, when in a broiling mode, the first configuration of the insert 112 positions the food close enough to the second heater 84 to achieve good broiling benefits. In an exemplary embodiment, in the first configuration 124 the grate 114 of the insert 112 is positionable a vertical distance from the second heating element 84 (when the lid 32 is closed) of between 1.75 and 2 inches. These distance (and distances in between and around these distances) allow for enough food space and proximity to the heat source to impart good broiling results, particularly at or around 450 degrees F. Second, when for example in the baking/roasting mode, the large clearance between the grate 114 and lower surface of the container 24 allows food to be cooked at two different levels within the container 24, which may offer various convenience and flavor benefits.

As is additionally shown, the first surface legs 120 have a lesser length than the second surface legs 122. This allows the grate 114 to be positioned a relatively lesser distance from a surface it rests on in the second configuration 126 than in the first configuration 124. As shown in FIG. 17, in an exemplary embodiment the insert 112 again rests on the lower surface of the container 24. The second, lesser clearance configuration positions the grate 114 (and any food thereon) a relatively lesser distance from the first heater 82 than in the first configuration 124. Such positioning of the food may be beneficial in conductive heating modes. For example, in the steam cooking mode, the legs 120 provide just enough clearance to position the grate 114 and food above any water and comfortably in a steam zone.

It should be noted that when in the configuration where they are not supporting the grate 114, the legs 120, 122 act as handles for the insert 112. Further, and as shown in FIG. 18, the legs 122 are rotatable from an orthogonal orientation with said food support body to a parallel orientation (the Figure actually shows the legs 122 rotated beyond parallel) with the plane of the grate 114. This allows for easier storage of the insert 112.

Figure 20:
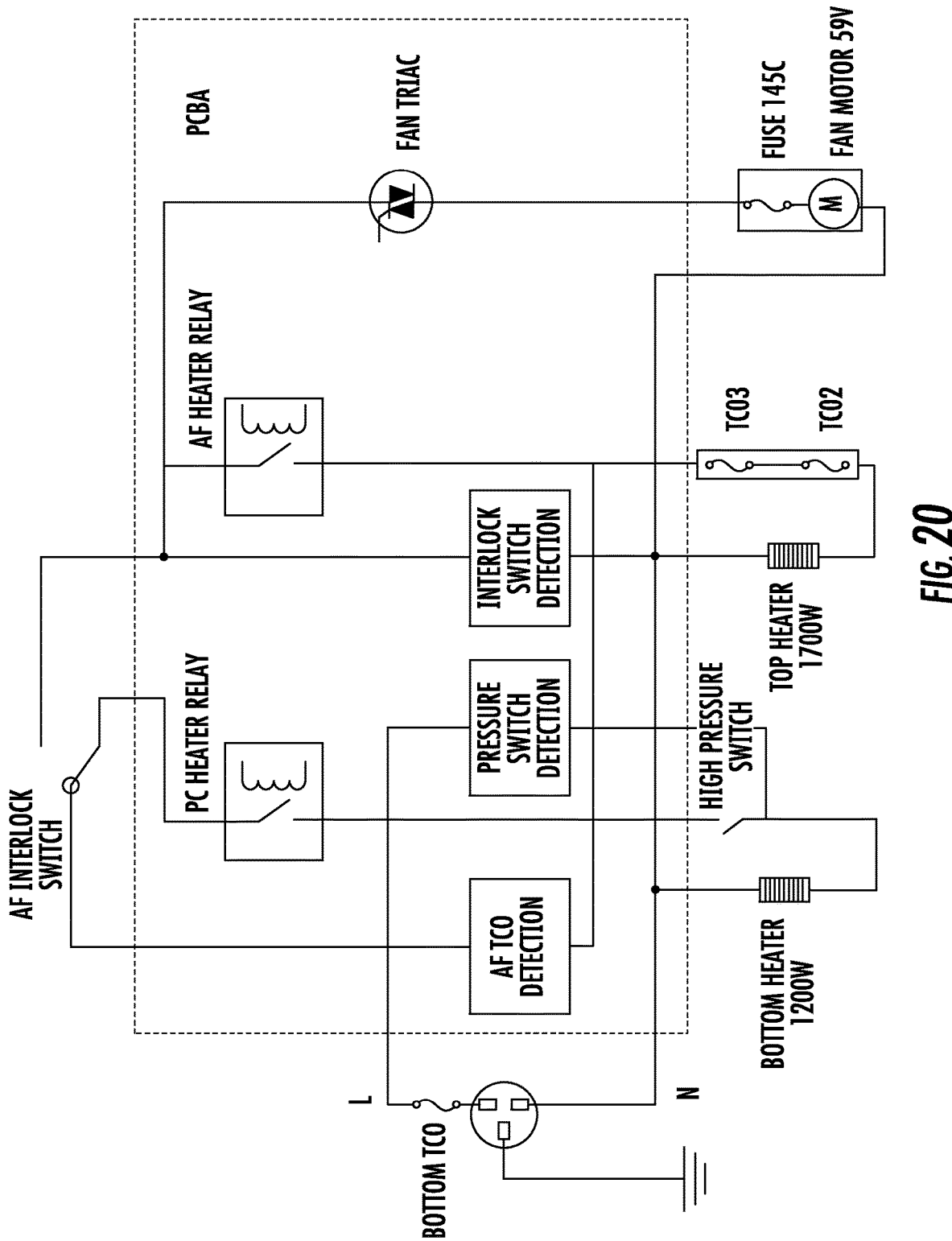
FIG. 20 is a circuit diagram for use in a cooking system according to an embodiment.
Figure 21:
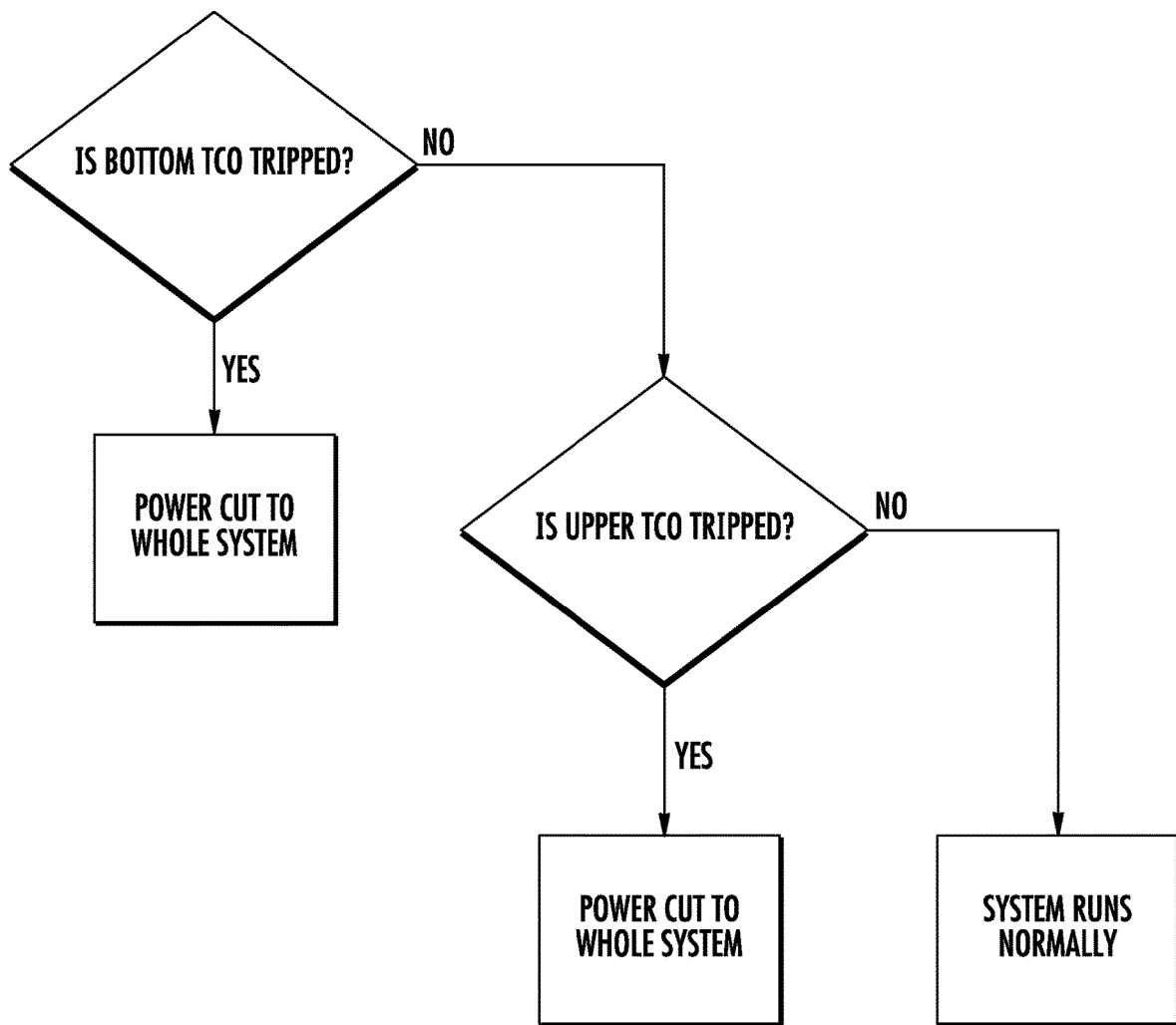
FIG. 21 is a logic diagram for use in a cooking system according to an embodiment.
Figure 22D:
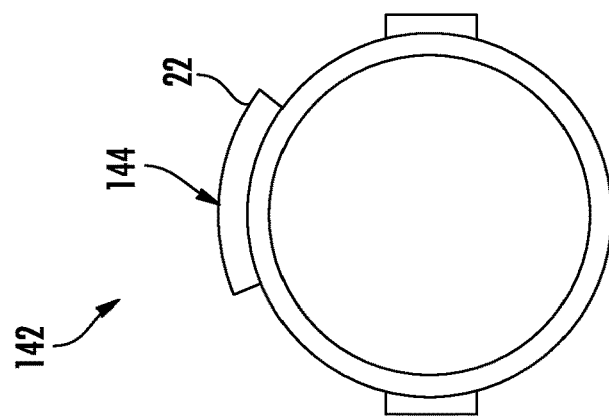
FIGS. 22A-D is an upper view of a series of lid positions in a cooking system according to an embodiment.
Figure 22C:
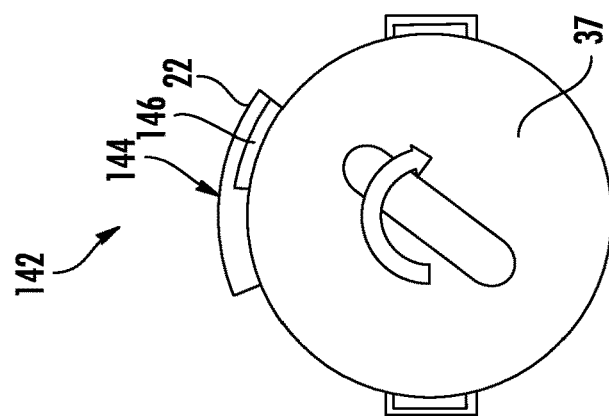
Figure 22B:
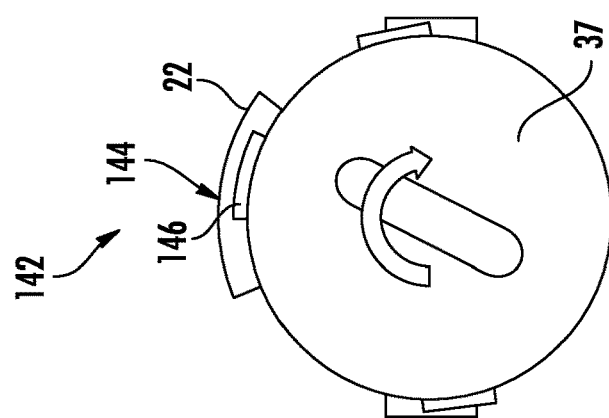
Figure 22A:
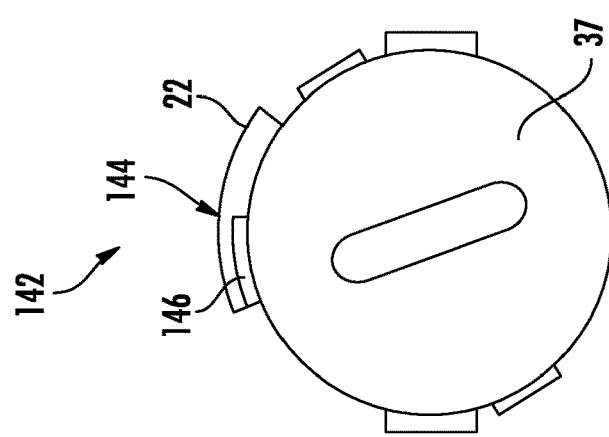

As mentioned above, and with reference again to FIG. 1A, the system 20 includes a spine 39. In an exemplary embodiment, the spine 39 houses a power/high voltage circuit board under (PCBA in the Figures) the hinge. A UI circuit board is behind the UI (not shown). Referring to FIGS. 20 and 21, the system 20 also includes a first thermal cut off (Bottom or Pressure or PC TCO/TCE) and a second thermal cut off (Upper or AF TCO/TCE). In an exemplary, non-limiting embodiment, the first thermal cut off is proximate the first heating element 82, and is triggered to terminate power thereto in response to a failure of the first heating element. Similarly, the second thermal cut off is proximate the second heating element 84, and is triggered to terminate power thereto in response to a failure of the second heating element 84. It should be noted, however, that the first thermal cut off could get hot enough to trigger a system shut down in response to overheating resulting from the second heating element 84, and the second thermal cut off could get hot enough to trigger a system shut down in response to overheating resulting from the first heating element 82.

In addition, in an exemplary embodiment, a failure in the first thermal cut off proximate the first heating element 82 will trigger the power circuit board PCBA to terminate power to the system 20 including the first heating element 82, the second heating element 84, and both the power and UI circuit boards. Similarly, a failure in the second thermal cut off proximate the second heating element 84 will trigger the power PCBA to terminate power to the system 20 including the second heating element 84, the first heating element 82, and both the power and UI circuit boards. The system 20 is thereby wired in such a way in that if any thermal cut off is triggered, power is cut to both heating elements 82, 84, rendering the system 20 inoperable. For example, if the first thermal cut off is tripped/triggered during a first mode or wet cooking function, hardware cuts power to both heating elements 82, 84, thereby prohibiting the user from using any cooking function. This circuitry, as shown in FIG. 20, creates a safer system for a user. In addition or alternatively, the controller 102 may also run software that employs a simple logic check that terminates power to both heating elements 82, 84 if either of the first or second thermal cut offs are tripped/triggered.

Failures such as but not limited to excessive temperature or excessive pressure (as detected by sensors S) may result in the tripping/triggering the first and/or second thermal cut offs discussed above. Software algorithms that correlate temperature to pressure and vice versus may also be employed by the controller 102 to detect dangerous conditions that may trip/trigger the first and/or second thermal cut offs.

With reference now to FIGS. 2, 3A, 3B, and 22A-D, a safety system employing lid detection sensors will now be discussed. A first lid detection sensor 140 is disposed proximate the hinge 38 (and is represented schematically at 140 in FIG. 3A). In an exemplary embodiment, the first sensor 140 is an actuating switch or micro switch that detects whether the primary lid 32 is open or closed. In an exemplary embodiment employing the actuating switch, a power connection to the lid heating element 84 is actually broken when the lid 32 is open. As such the lid heating element 84 (and fan 86) can only receive power to actuate convection cooking modes when the lid 32 is closed. In addition or alternatively, the controller 102 may also run software that employs a simple logic check that terminates power to the heating element 84 when the lid 32 is open.

As shown in FIGS. 22A-D, a second lid detection system 142 is shown, and includes a Reed switch/sensor 144 at a relative rear of the housing 22 and a magnet 146 disposed in a corresponding section of the lid 37. As shown in the Figures, a dropped on lid 37 places the magnet 146 within range of the Reed switch 144. When the lid 37 is in this dropped on configuration (22A), the controller 102 may employ a simple logic check that detects the Reed switch's activated condition and terminates power to the whole system 20 or at least the heating elements 82, 84. When the lid 37 is partially engaged on the housing (up to 85% rotation onto a housing bayonet in the exemplary embodiment shown in FIG. 22B), the controller 102 may again employ a simple logic check that detects the Reed switch's activated condition and terminates power to the whole system 20 or at least the heating elements 82, 84. When the lid 37 is fully engaged on the housing 22 (greater than 85% rotated onto a housing bayonet in the exemplary embodiment shown in FIG. 22C), the controller 102 may employ a simple logic check that detects the Reed switch's deactivated condition and allow power to flow normally to the system 20. Similarly, when the lid 37 is not present at all, the controller 102 may employ a simple logic check that detects the Reed switch's deactivated condition and allow power to flow normally to the system 20. However, the controller 102 may also and again employ a simple logic check that detects a closed condition of the first lid 32, and prevent power from flowing to the first heating element 82.

Indeed, when a closed condition of the first lid 32 is detected using the above referenced sensor 140, the controller 102 may deactivate at least the pressure cooking input 94 on the display 92, and in an exemplary embodiment all inputs 94 for the conduction/wet cooking functions including the pressure cooking input 94, slow cooking input 94, steam input 94, and sear/sauté input 94. Similarly, when a closed condition of the second lid 37 (FIG. 22C) is detected using the Reed switch 144, the controller 102 may deactivate all inputs 94 for the convective/dry cooking functions including the air fry/crisp mode input 94, bake/roast input 94, broil input 94, and dehydrate input 94. In both cases, deactivation of the inputs 94 may include non-function of the inputs 94 and a termination of back lighting to the inputs 94.

The cooking system 20 illustrated and described herein provides an enhanced user experience by combining the functionality of several conventional household products into a single user-friendly device.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooking system for cooking food, the cooking system being functional in a plurality of cooking modes, the cooking system comprising:
    a housing having a hollow interior;
    at least one lid movable relative to said housing;
    at least one heating element associated with one of said housing and said at least one lid;
    a rotational air movement device associated with at least one of said housing and said at least one lid,
    a controller in communication with said at least one heating element and said rotational air movement device,
    wherein during operation of said rotational air movement device, said rotational air movement device is operable by said controller to rotate at a plurality of speeds including a first non-zero rotational speed and a second non-zero rotational speed, said second rotational speed being different than said first rotational speed,
    wherein said first rotational speed or said second rotational speed of said rotational air movement device is selectable by said controller in response to a user selectable cooking mode of said plurality of cooking modes, and
    wherein said plurality of cooking modes includes a user selectable pressure cooking mode operable at a pressure of at least 40 kPa, wherein said rotational air movement device does not rotate or move air during said pressure cooking mode, and said at least one lid is positionable in a sealing arrangement with said housing during said pressure cooking mode.

2. The cooking system of claim 1, wherein said first rotational speed is faster than said second rotational speed.

3. The cooking system of claim 1, wherein said plurality of cooking modes includes a first cooking mode and a second cooking mode separate from said pressure cooking mode, and said rotational air movement device is controlled by said controller to move air through said hollow interior at a first speed in said first cooking mode and moves air through said hollow interior at a second speed in said second cooking mode.

4. The cooking system of claim 3, wherein in said first cooking mode, said cooking system is operable as at least one of an air fryer mode, a roasting/baking mode, and a broiling mode, and said rotational air movement device moves air at said first rotational speed.

5. The cooking system of claim 4, wherein in said second cooking mode, said cooking system is operable as a dehydrator, and said rotational air movement device moves air at said second rotational speed.

6. The cooking system of claim 5, wherein said second rotational speed is half as fast as said first rotational speed.

7. The cooking system of claim 5, wherein said rotational air movement device rotates at 2650 RPM at said first rotational speed and 1200 RPM at said second rotational speed.

8. The cooking system of claim 5, wherein when at said second rotational speed said rotational air movement device operates at 50% power relative to operation at said first rotational speed.

9. The cooking system of claim 1, wherein said rotational air movement device is arranged within said at least one lid.

10. The cooking system of claim 1, wherein said at least one heating element is arranged within said at least one lid.

* * * * *